(12) United States Patent
Knoblock et al.

(10) Patent No.: US 6,952,705 B2
(45) Date of Patent: Oct. 4, 2005

(54) METHOD, SYSTEM AND PROGRAM PRODUCT THAT UTILIZE A HIERARCHICAL CONCEPTUAL FRAMEWORK TO MODEL AN ENVIRONMENT CONTAINING A COLLECTION OF ITEMS

(75) Inventors: Terry Knoblock, Wylie, TX (US); Gregory G. Carlson, Plano, TX (US); Mike Golobay, Dallas, TX (US); Willis Mason, Rowlett, TX (US)

(73) Assignee: MCI, Inc., Ashburn, VA (US)

( * ) Notice: Subject to any disclaimer, the term of this patent is extended or adjusted under 35 U.S.C. 154(b) by 296 days.

(21) Appl. No.: 09/995,193

(22) Filed: Nov. 27, 2001

(65) Prior Publication Data

US 2003/0004925 A1 Jan. 2, 2003

(Under 37 CFR 1.47)

Related U.S. Application Data

(63) Continuation-in-part of application No. 09/702,184, filed on Oct. 31, 2000, now Pat. No. 6,473,762, which is a continuation of application No. 08/823,561, filed on Mar. 25, 1997, now Pat. No. 6,169,987.

(51) Int. Cl.[7] .............................................. G06F 17/30
(52) U.S. Cl. ........................... 707/103 R; 707/104.1
(58) Field of Search ........................... 707/103 R, 103, 707/103 Y, 103 Z, 104.1, 100

(56) References Cited

U.S. PATENT DOCUMENTS

| | | | |
|---|---|---|---|
| 4,031,407 A | 6/1977 | Reed ............................ 307/87 |
| 5,006,996 A | 4/1991 | Nakamura et al. ........... 700/215 |
| 5,018,148 A | 5/1991 | Patel et al. .................... 714/22 |
| 5,091,139 A | 2/1992 | Chao et al. ................... 376/216 |
| 5,113,349 A | 5/1992 | Nakamura et al. ........... 700/215 |
| 5,117,324 A | 5/1992 | Johnson, Jr. .................. 361/66 |
| 5,142,128 A | 8/1992 | Perkin et al. ................. 235/375 |
| 5,148,043 A | 9/1992 | Hirata et al. ................... 307/66 |
| 5,283,905 A | 2/1994 | Saadeh et al. ............... 713/324 |
| 5,311,562 A | 5/1994 | Palusamy et al. ........... 376/215 |
| 5,360,967 A | 11/1994 | Perkin et al. ................ 235/375 |
| 5,369,353 A | 11/1994 | Erdman ....................... 323/207 |
| 5,414,812 A * | 5/1995 | Filip et al. ............... 707/103 R |
| 5,414,861 A | 5/1995 | Horning ...................... 365/229 |
| 5,418,945 A | 5/1995 | Carter et al. ..................... 707/8 |
| 5,426,674 A | 6/1995 | Nemirovsky et al. ........ 709/247 |
| 5,444,836 A | 8/1995 | Hollingsworth et al. .... 345/634 |
| 5,446,575 A * | 8/1995 | Lysakowski, Jr. ......... 707/104.1 |
| 5,452,347 A | 9/1995 | Iglehart et al. .............. 379/199 |
| 5,459,831 A | 10/1995 | Brewer et al. .............. 345/853 |
| 5,483,108 A | 1/1996 | Girard et al. .................. 307/64 |
| 5,504,879 A * | 4/1996 | Eisenberg et al. .......... 707/100 |
| 5,511,188 A | 4/1996 | Pascucci et al. ............ 707/203 |
| 5,513,171 A | 4/1996 | Ludwiczak et al. ......... 370/254 |
| 5,515,524 A | 5/1996 | Lynch et al. .................. 703/13 |
| 5,604,892 A | 2/1997 | Nutttall et al. ................ 703/13 |
| 5,630,025 A | 5/1997 | Dolby et al. .................. 703/18 |
| 5,630,072 A | 5/1997 | Dobins ......................... 705/22 |
| 5,630,125 A * | 5/1997 | Zellweger ............... 707/103 R |
| 5,634,016 A | 5/1997 | Steadham et al. .......... 345/753 |
| 5,642,100 A | 6/1997 | Farmer ....................... 340/636 |
| 5,664,170 A | 9/1997 | Taylor ......................... 709/220 |
| 5,694,323 A | 12/1997 | Koropitzer et al. ......... 705/400 |
| 5,706,455 A | 1/1998 | Benton et al. .............. 345/853 |
| 5,721,903 A | 2/1998 | Anand et al. ................... 707/5 |

(Continued)

Primary Examiner—Greta Robinson

(57) ABSTRACT

A method, system and program product are disclosed for enabling a user to construct a conceptual hierarchical framework representing a virtual or physical environment. The framework may then be populated with a collection of items. Users may graphically and intuitively view and manipulate various subsets of the environment's space as well as items placed within the modeled environment.

70 Claims, 31 Drawing Sheets

U.S. PATENT DOCUMENTS

| | | |
|---|---|---|
| 5,758,351 A | 5/1998 | Gibson et al. ............ 707/104.1 |
| 5,764,955 A | 6/1998 | Doolan ........................ 709/223 |
| 5,774,689 A | 6/1998 | Curtis et al. ................... 703/21 |
| 5,778,357 A | 7/1998 | Kolton et al. ................... 707/2 |
| 5,778,370 A | 7/1998 | Emerson ..................... 707/100 |
| 5,786,998 A | 7/1998 | Neeson et al. ................ 701/35 |
| 5,802,144 A | 9/1998 | Laird et al. .............. 379/32.04 |
| 5,832,503 A * | 11/1998 | Malik et al. ................. 709/223 |
| 5,864,337 A | 1/1999 | Marvin ....................... 345/708 |
| 5,930,779 A | 7/1999 | Knoblock et al. ........... 705/412 |
| 5,959,275 A | 9/1999 | Hughes et al. ............... 235/375 |
| 5,991,759 A | 11/1999 | Knoblock et al. ............. 707/10 |
| 6,023,699 A | 2/2000 | Knoblock et al. ............. 707/10 |
| 6,098,050 A | 8/2000 | Knoblock et al. ............. 705/28 |
| 6,169,987 B1 | 1/2001 | Knoblock et al. ............. 707/10 |
| 6,203,699 B1 | 3/2001 | Blume et al. ........... 210/321.81 |
| 6,473,762 B1 * | 10/2002 | Knoblock et al. ........... 707/100 |

* cited by examiner

| FIG. 10C | FIG. 10F | FIG. 10I | FIG. 10L |
|---|---|---|---|
| FIG. 10D | FIG. 10G | FIG. 10J | FIG. 10M |
| FIG. 10E | FIG. 10H | FIG. 10K | FIG. 10N |

FIG. 10B

METHOD, SYSTEM AND PROGRAM PRODUCT THAT UTILIZE A HIERARCHICAL CONCEPTUAL FRAMEWORK TO MODEL AN ENVIRONMENT CONTAINING A COLLECTION OF ITEMS

CROSS-REFERENCE

The present application is a continuation-in-part of U.S. patent application Ser. No. 09/702,184, filed on Oct. 31, 2000, and entitled "System and Method to Automate Equipment Placement at Remote Sites", now U.S. Pat. No. 6,473,762, which is a continuation of U.S. patent application Ser. No. 08/823,561 entitled "System and Method to Automate Equipment Placement at Remote Sites" filed Mar. 25, 1997, now U.S. Pat. No. 6,169,987. The present application is also related to the following U.S. patents, which are assigned to the assignee of the present application and incorporated herein by reference in their entireties: U.S. Pat. Nos. 5,930,779, 5,991,759, 6,098,050, 6,169,987, and 6,023,699.

BACKGROUND OF THE INVENTION

1. Technical Field:

The present invention relates in general to data processing and in particular to a data processing system, method and program product that utilize a hierarchical conceptual framework to model an environment containing a collection of items.

2. Description of the Related Art:

Affordable technology, and in particular the availability of powerful, commercially affordable computer systems and associated data storage, has revolutionized business practices and management over the preceding decades. This revolution has affected all aspects of business, including data management in accounting, payroll, and human resources systems; business communication; business forecasting and market modeling; warehouse, supply chain and product distribution management; and facility management.

The above-referenced patents represent a significant advance in facility management by disclosing a software tool (referred to herein as SiteVu) that can be utilized not only for general site planning of an organization's physical plant, but also to specifically record, maintain and view the placement of, and information of interest associated with, specific physical assets within the physical plant. SiteVu provides these features through a hierarchical conceptual framework that enables a user to intuitively create and maintain a detailed data model of an organization's physical assets.

Although SiteVu has definite applicability to the design and management of telecommunications field sites as discussed above, the present invention recognizes that its use is by no means limited to such applications. Rather, the hierarchical conceptual framework employed by SiteVu is broadly applicable to the creation, display and management of a collection of items in a modeled environment.

SUMMARY OF THE INVENTION

The present invention provides a method, system and program product for modeling an environment containing a collection of items. In accordance with a preferred embodiment of the method of the present invention, an environmental hierarchy describing a model environment, a product catalog containing data describing a plurality of items that may be utilized to populate the modeled environment, and a configuration library containing data describing a spatial relationship between first and second items among the plurality of items in the product catalog are created. The modeled environment is then populated by storing, in a database, data representative of the spatial relationship between the environmental hierarchy and a collection of items including the first item.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

In the FIGURES, like reference numbers generally indicate identical, functionally similar, and/or structurally similar elements. The figure in which an element first appears is indicated by the leftmost digit(s) in the reference number.

DETAILED DESCRIPTION OF A PREFERRED EMBODIMENT

The present invention is directed to a data processing system, method, and program product that allow a user to construct a conceptual hierarchical framework representing a virtual or physical environment and then populate the environment with a collection of items. The present invention permits users to graphically and intuitively view and manipulate various subsets of the environment's space as well as items placed within the modeled environment. The user is also able to create and store tabular information describing the configuration of the graphical objects and the items represented by the graphical objects. The detailed description is arranged as follows:

Section I explains an exemplary embodiment of the present invention;

Section II provides an operational overview of an exemplary embodiment of the present invention;

Section III presents the architecture of the SiteVu tool suite, including an overview of the database and the software components of SiteVu;

Section IV describes an exemplary item hierarchy (i.e., an equipment rack in a telecommunications application);

Section V describes an exemplary environmental hierarchy (i.e., a site hierarchy);

Section VI describes the creation of a configured rack, including creation of a product catalog component (e.g., module, shelf or rail), creation of a shelf configuration, and the addition of modules to the shelf;

Section VII discusses the site hierarchy database;

Section VIII describes the creation of graphical objects representing components of the site hierarchy;

Section IX describes an exemplary implementation of the present invention in a computer system;

Section X provides a detailed discussion of an exemplary site hierarchy;

Section XI describes a number of additional exemplary applications of the present invention; and Section XII is a brief conclusion.

I. Exemplary Embodiment

The present invention is described herein with reference to an exemplary embodiment in which a software application suite named SiteVu is executed by a data processing system having an input device and display to provide all of the features of the present invention. The description in such terms is provided for convenience only and is not intended to limit the present invention. In addition, the present invention is principally described herein as applied to the telecommunications industry. However, as made clear by the range of exemplary applications set forth in Section XI, the present invention is not limited to application within the telecommunications industry, but is instead applicable to other industries and environments. In fact, after reading the following description, other embodiments and applications of the present invention will become apparent to persons skilled in the relevant art(s).

II. Operational Environment

Figure 1A:
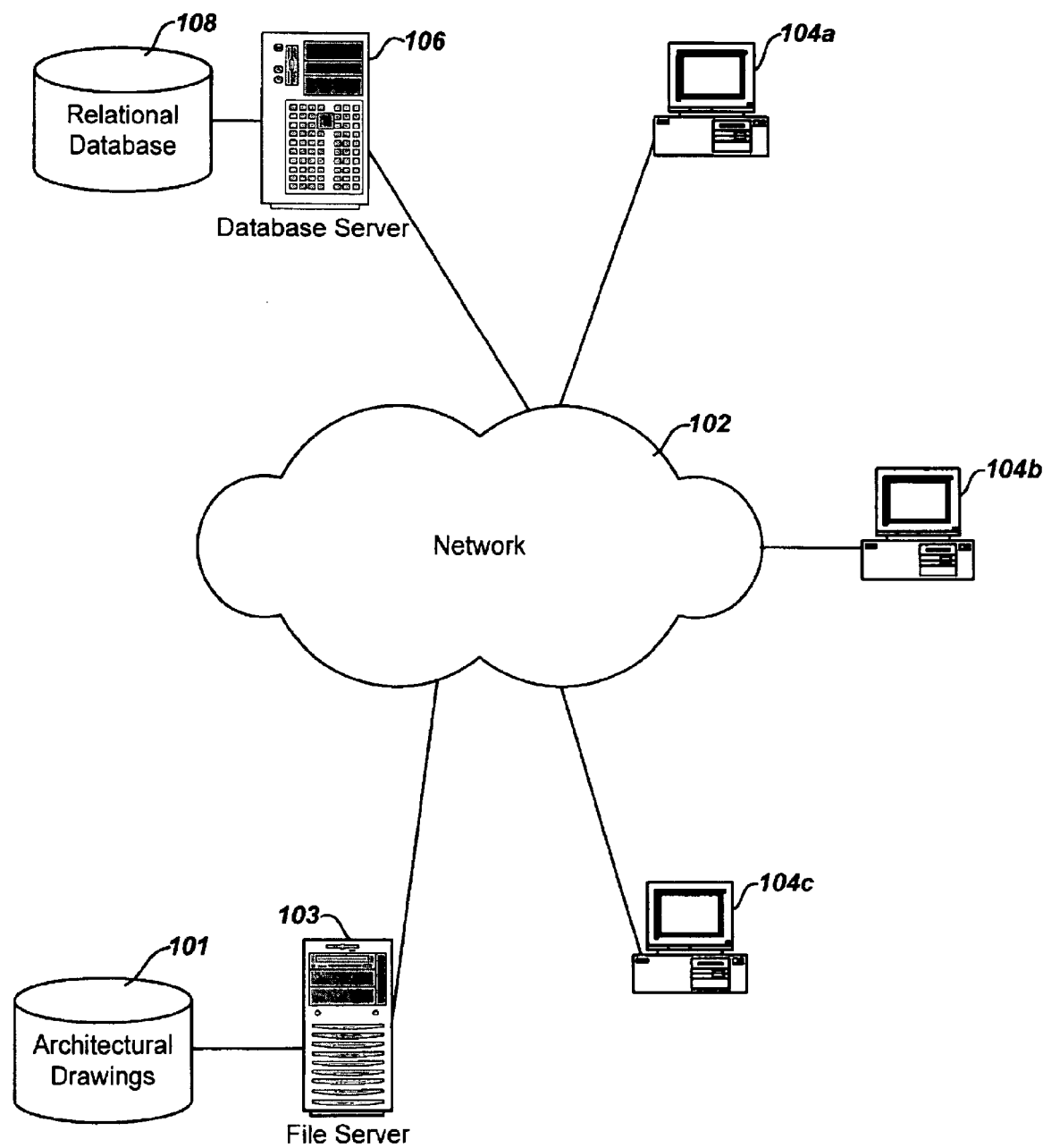
FIG. 1A is a block diagram depicting an operational environment according to a preferred embodiment of the present invention.

FIG. 1A is a block diagram depicting a typical operational environment according to a preferred embodiment of the present invention. A network 102 is depicted in the center of FIG. 1A. Network 102 represents any type of computer and/or telecommunications network or combination thereof, which can be used to couple a plurality of workstations 104a–104c (collectively "104") with a relational database 108. In this example, each workstation 104 is a general-purpose computer system that executes software (referred to herein as SiteVu) that causes computer systems 104 to perform the functions described herein.

In some embodiments of the present invention, network 102 can be a company wide intranet. In other embodiments, local area networks (LANs), or wide area networks (WANs), such as multiple LANs linked together with bridges, routers or the like, can be used as network 102. In addition, network 102 can include switched networks and other forms of common carrier transmission lines and equipment that can link remote computers, such as the remote workstations 104, to relational database 108.

Also depicted in FIG. 1A are file server log 103 and a storage device 101 storing architectural drawings. In a preferred embodiment, each computer system 104 executes software that performs computer-aided drafting and design (CADD) functions. As described below, the CADD software is controlled by the SiteVu program in a preferred embodiment of the present invention. In this example, architectural drawings may be stored on local storage devices in each of workstations 104 or in a central file server, such as file server 103. This aspect of the present invention is described below.

In this example, relational database 108 is coupled to a database server 106. Relational database 108 can be implemented, for example, with an Oracle relational database, supplied by Oracle Corporation. Further, Microsoft Windows® (available from Microsoft Corporation of Redmond, Wash.) can be used as the operating system for computer systems 104 used to execute the SiteVu suite (including the SiteVu placement tool) and the CADD programs. Finally, in a preferred embodiment, the CADD program used is Microstation CADD, manufactured by Bentley Systems, Inc.

III. SiteVu Architecture

Figure 1B:
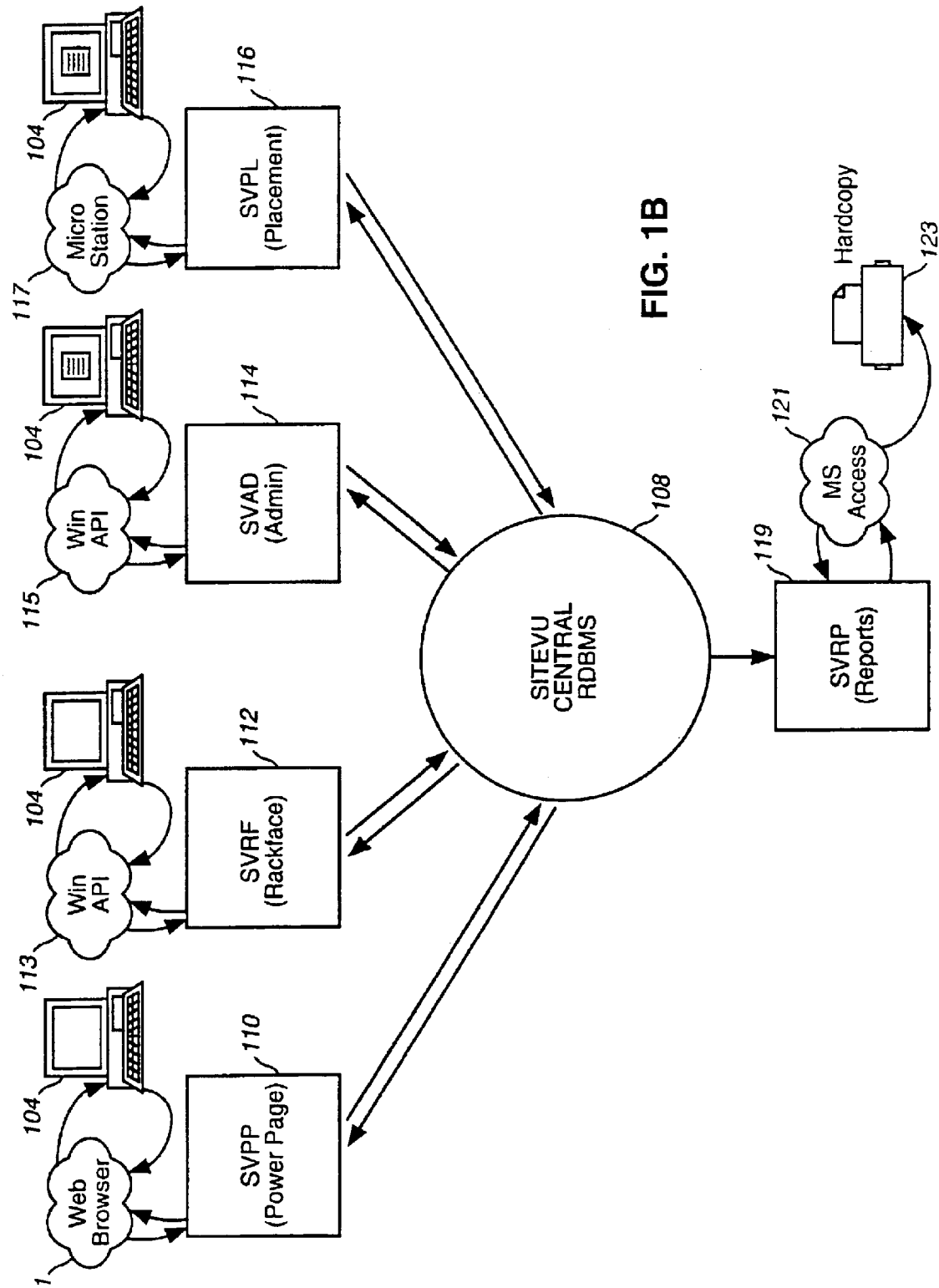
FIGS. 1B–1G are block diagrams depicting various functional components according to a preferred embodiment of the present invention.
Figure 1C:
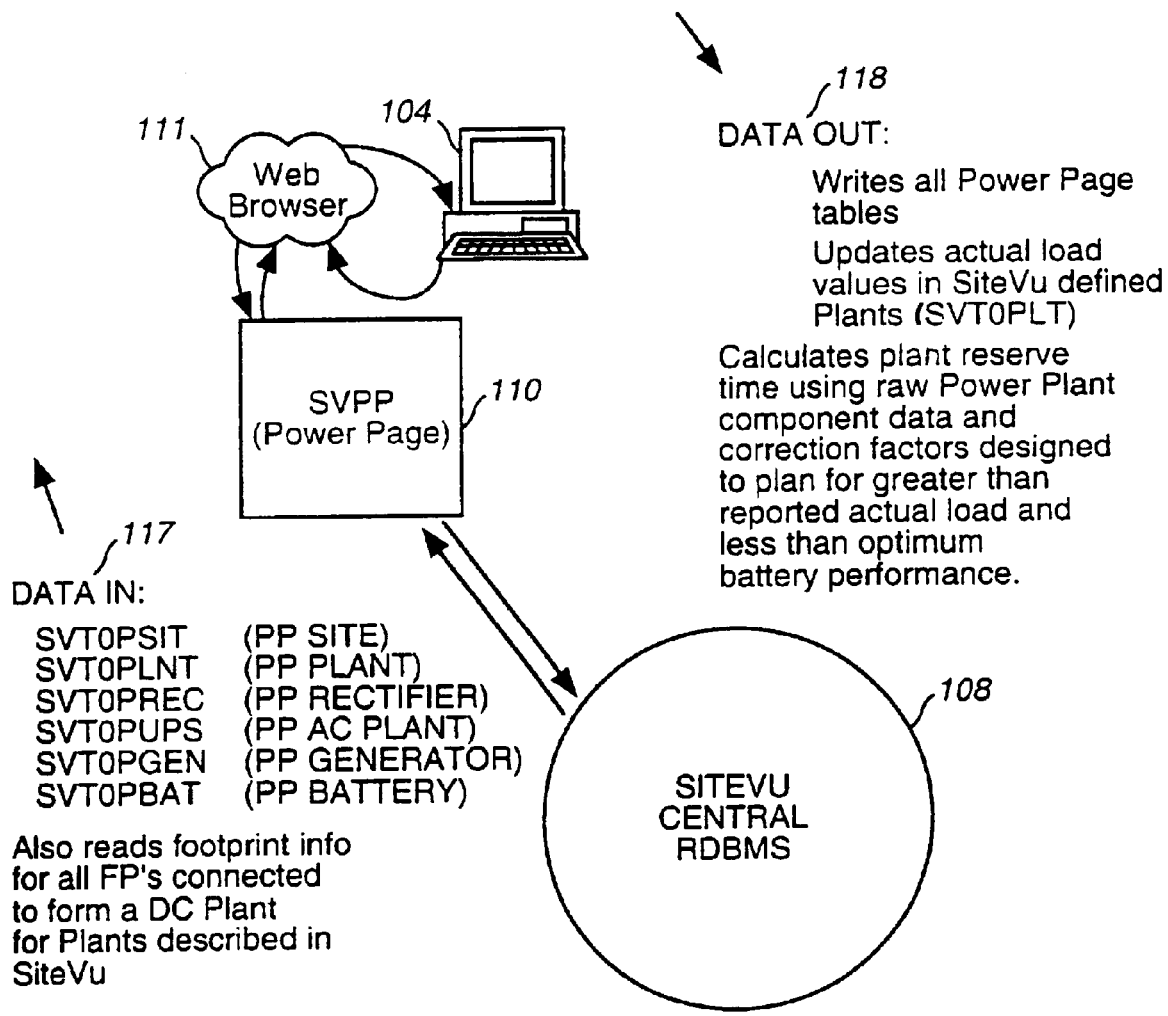
Figure 1D:
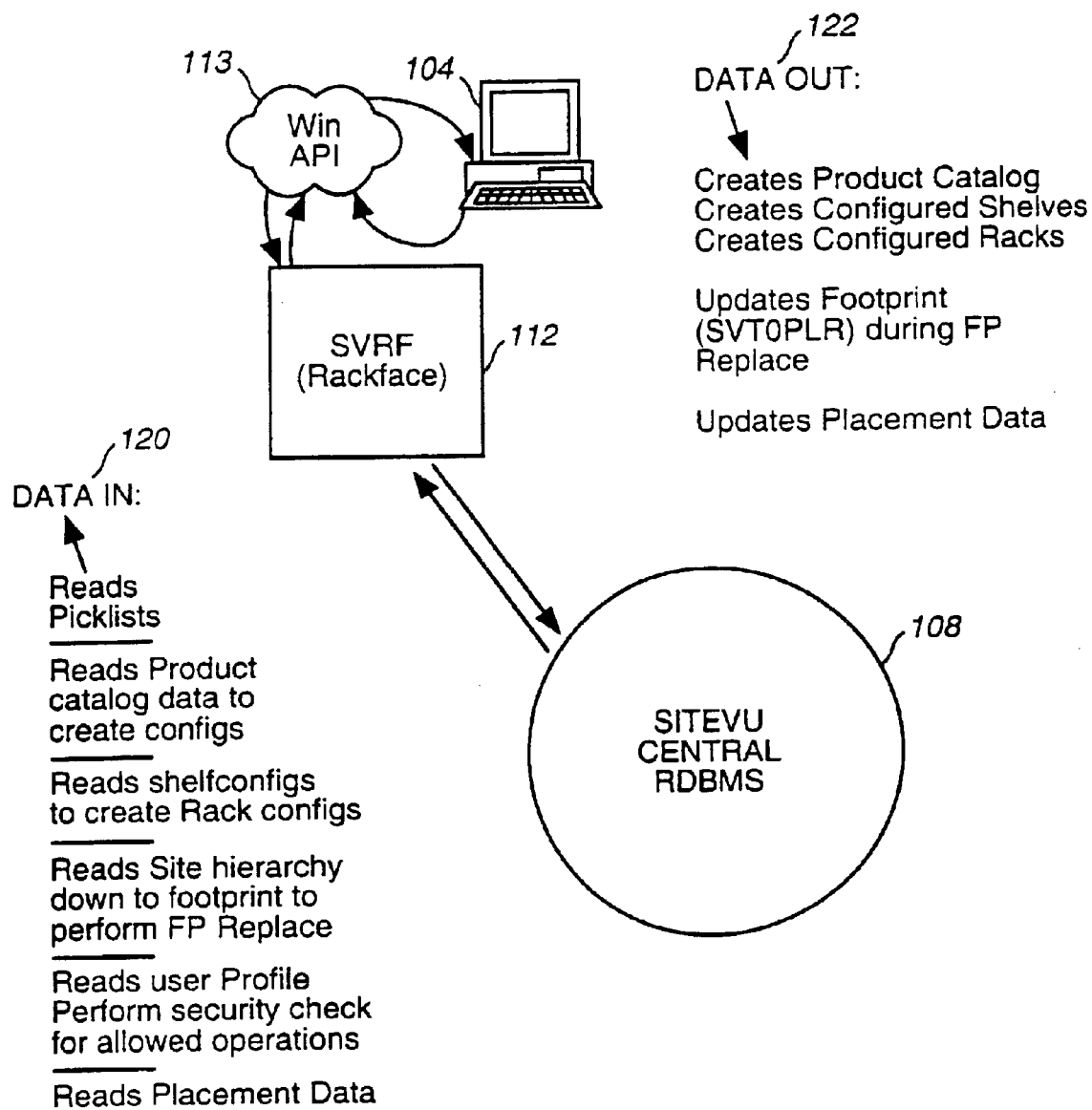
Figure 1E:
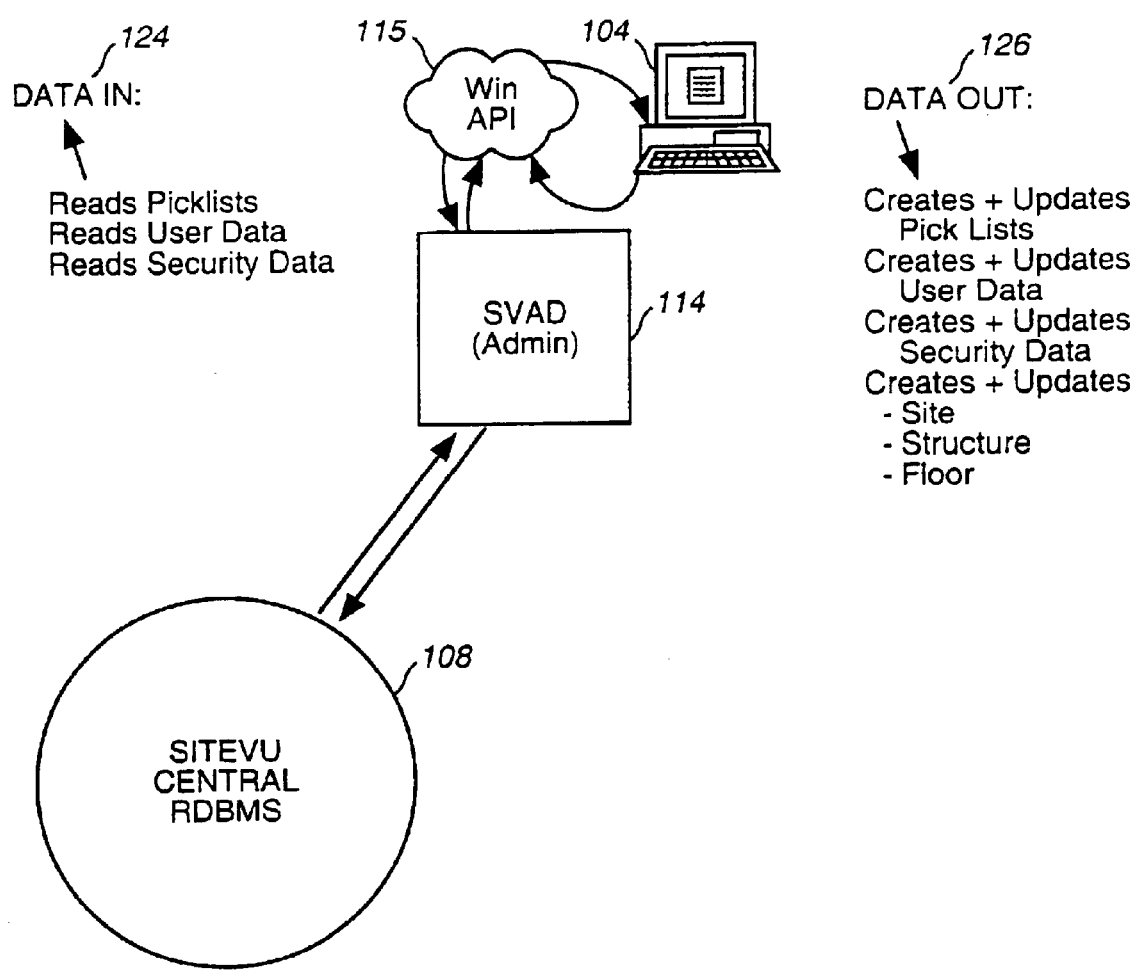
Figure 1F:
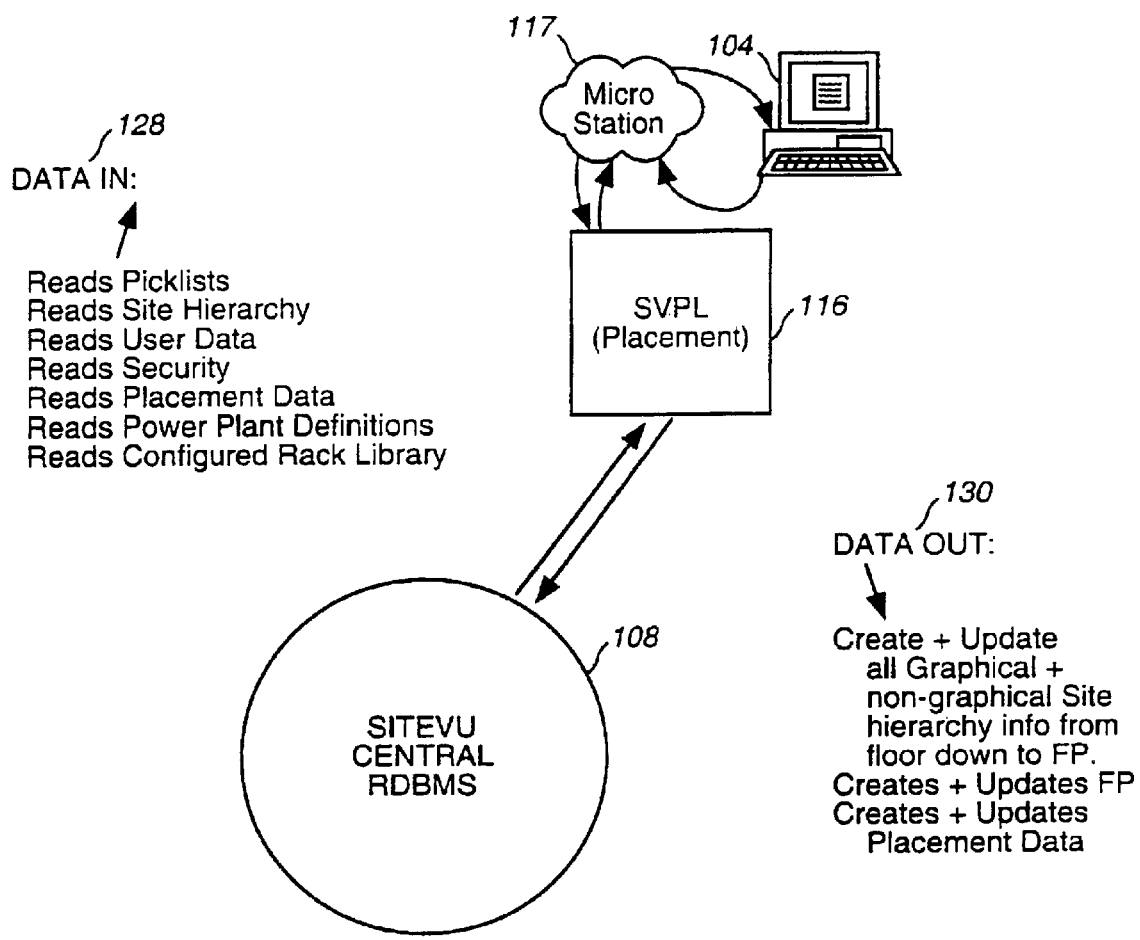
Figure 1G:
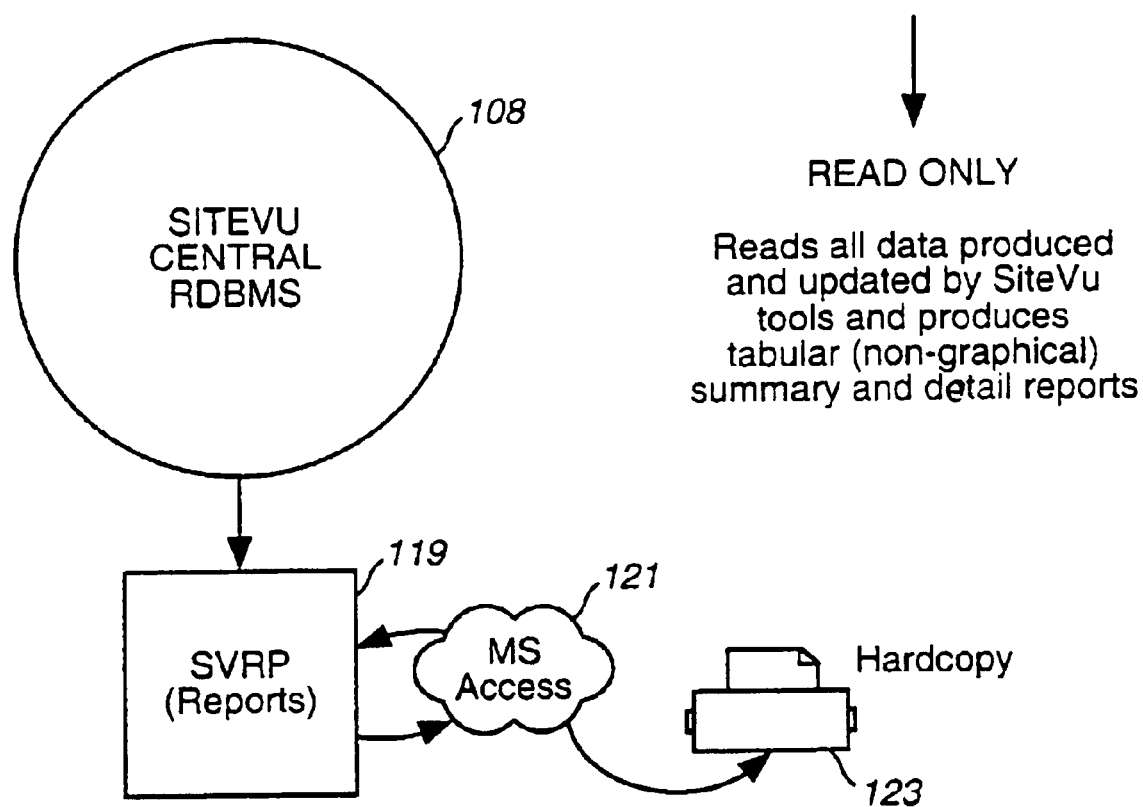
Figure 1H:
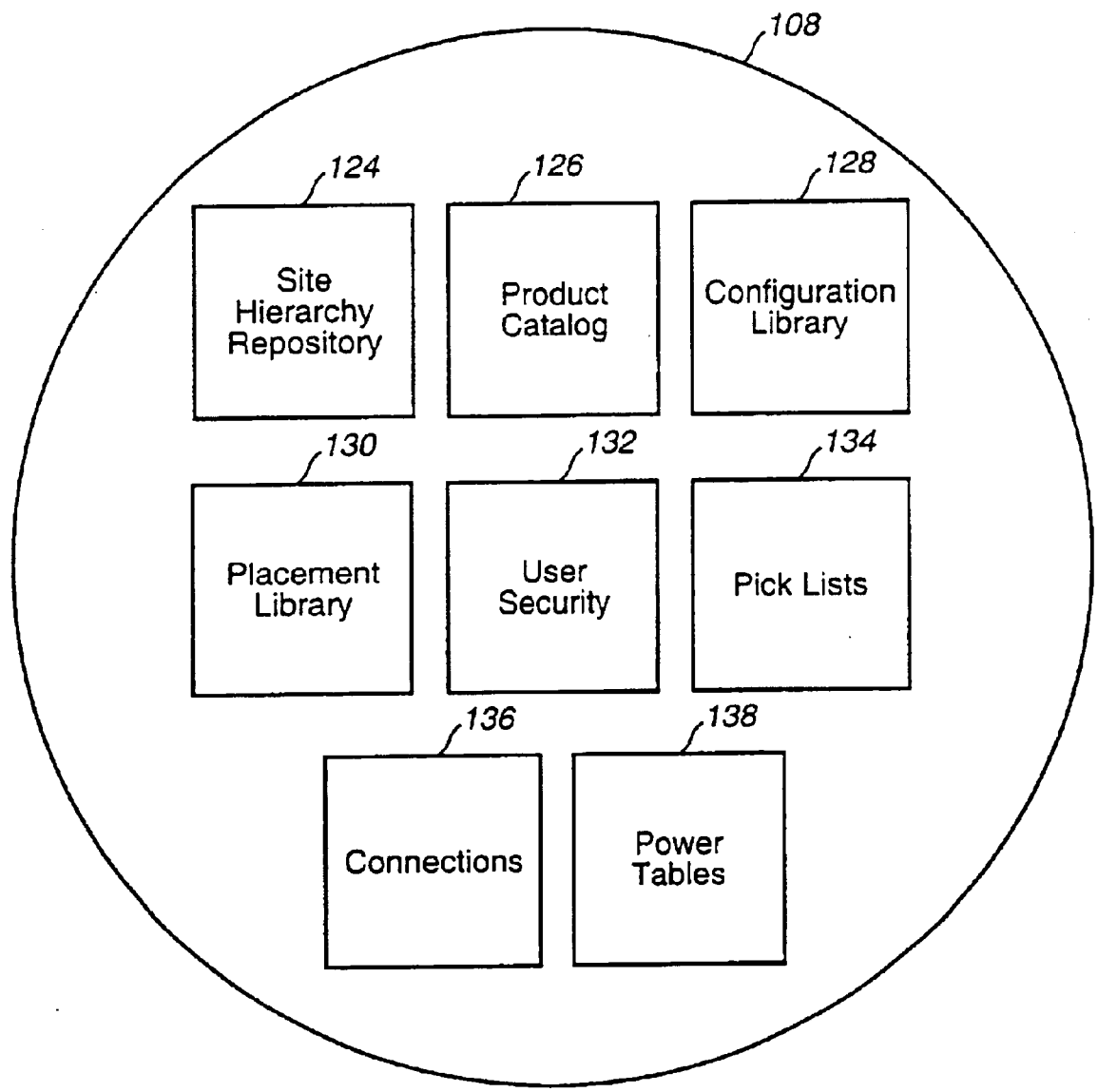
FIG. 1H is a block diagram depicting the components of a database according to a preferred embodiment of the present invention.

FIGS. 1B–1H depict an example of an architecture of the SiteVu program and associated database, according to a preferred embodiment of the present invention. Specifically, FIG. 1H illustrates logical database components, and FIGS. 1B–1G depict exemplary SiteVu components and their associated inputs and outputs.

A. Logical Database Components

Referring first to FIG. 1H, the logical components of database 108 are depicted according to a preferred embodiment of the present invention. Specifically, in this example, database 108 comprises a site hierarchy repository 124; a product catalog 126; a configuration library 128; a placement library 130; user security 132; pick lists 134; connections 136; and power tables 138. A more detailed description of a database 108 for telecommunications applications is subsequently described below in section VIII with reference to FIGS. 10A–10N.

B. SiteVu Components

Referring now to FIGS. 1B–1G exemplary SiteVu components and their associated inputs and outputs are illustrated.

1. Overview of the Components

As indicated in FIG. 1B, SiteVu central database 108 is preferably a relational database management system. The SiteVu tool (FIG. 1B) comprises the following components: SiteVu Power Pages (SVPP) 110; SiteVu Rackface tool (SVRF) 112; SiteVu Administrative tool (SVAD) 114; SiteVu Placement tool (SVPL) 116, and SiteVu Report Generator (SVRP) 119.

2. Power Page Tool

As shown in FIG. 1C, power page 110 reads data from and stores data in database 108. Power page 110 provides power estimates for remote field sites. In a preferred embodiment, a web browser 111 is used to input data into power page 110 from workstation 104 and to output data from power page 110 to workstation 104.

3. The Rackface Tool

As depicted in FIG. 1D, rackface tool 112 reads data from and stores data in database 108. Rackface tool 112 is used to define components for product catalog 126. Further, rackface tool 112 is used to define configured shelves using empty shelves and modules from product catalog 126 and store configured shelves in the configuration library 128. In addition, rackface tool 112 is used to define configured racks from rails and configured shelves from the product catalog 126 and configuration library 128, respectively. Such configured racks (also referred to as racks), are stored in configuration library 128.

In addition, rackface tool 112 is used to operate on footprints. As stated, footprints are racks that have been placed in remote sites via placement tool 116 (described below). Specifically, in a preferred embodiment, rackface tool 112 is used to display information about footprints and to replace one footprint with another footprint, as described below.

In a preferred embodiment, rackface tool 112 is implemented using the Microsoft Windows operating system. Thus, Windows Application Programming Interface 113 is used to implement the functions provided by the rackface tool 112 on a workstation 104.

FIG. 1D depicts various types of data used by rackface tool 112, according to a preferred embodiment of the present invention. As indicated by the data-in list 120, rackface tool 112 reads pick lists 134 from database 108. As described in further detail below, a pick list is a database table that comprises a list of valid values for particular data fields within database 108. Preferably, pick list tables are used during a data entry process to provide users with a drop-down list box, or the like, comprising textual representations of predefined values that can be specified for particular data fields. Note that the term "pick list" is used herein to describe a pick list table in database 108. However, the term is also used herein to describe the drop-down list box that is associated with a pick list table and used during a data entry process, as described above.

In addition, rackface tool 112 reads data from the product catalog 126 to create shelf configurations that are stored in the configuration library 128. Further, configured shelf data from configuration library 128 is used to create rack configurations that are also stored in configuration library 128. Site hierarchy data are read from the site hierarchy repository 124 and used to replace generic footprints with manufacturer-specific footprints. Further, placement data are read from the placement library and used to display footprint information and replace generic and manufacturer-specific footprints, as described below.

User and security data 132 are read by rackface tool 112 to determine access rights and the like for particular users. In addition, placement data are read from the placement library 130 when rackface tool 112 replaces generic footprints, as described below.

Examples of data output from rackface tool 112, as indicated by data-out list 122, include product catalog data, configured shelves data and configured rack data. For example, rackface tool 112 is used to create components for product catalog 126. An example of a process that can be used to create components in product catalog 126 is described below with reference to FIG. 6.

Similarly, rackface tool 112 is used to create entries in the configuration library 128. An example of a process that can be used to create data entries for configuration library 128 is described below with reference to FIGS. 4A, 4B and 6.

Another example of data output from rackface tool 112 includes data used to update placement library 130. For example, placement library 130 is updated when a generic footprint is replaced with a manufacturer-specific footprint, as described below.

4. Administrative Tool

As shown in FIG. 1E, administrative tool 114 reads data from and stores data in database 108. Administrative tool 114 is used to create and update pick lists 134, user security data 132, and site hierarchy repository 124. In a preferred embodiment, administrative tool 114 is implemented using the Windows operating system. Thus, Windows Application Programming Interface 115 is used to implement the functions provided by administration tool 114 on a workstation 104.

FIG. 1E depicts various types of data used by administrative tool 114 according to a preferred embodiment of the present invention. As indicated by data-in list 120, administrative tool 114 reads pick lists 114 and user security data 132 from database 108.

As indicated by data-out list 126, administrative tool 114 creates and updates pick lists 134 and user security data 132. In addition, this tool can be used to create part of the site hierarchy that is stored in site hierarchy repository 124, as described below. Specifically, the sites, buildings (or structures) and the non-graphical portion of the floor level hierarchies, if any, can be created utilizing administrative tool 114.

5. Placement Tool

As indicated by FIG. 1F, placement tool 116 reads data from and stores data to database 108. Specifically, placement tool 116 can be used to create footprints (i.e., equipment placed on the floor space) by placing racks in remote sites. Such data are stored in placement library 130. In a preferred embodiment, placement tool 116 is also implemented using the Windows operating system. In addition, graphics are provided by a CADD program, such as Microstation CADD 117, as previously described.

FIG. 1F depicts the various types of data used by placement tool 116, according ling to a preferred embodiment of the present invention. As indicated by data-in list 128, placement tool reads pick lists 134, user and security data 132, site hierarchy data 124, placement data 130, configured rack data 128, and power plant definition data 138 from database 108.

As indicated by data-out list 130, placement tool 116 uses a site hierarchy (e.g., from a site down to a floor) established by administrative tool 114 to create graphical and database representations of remote sites, buildings, floor, zones, rows (specifically, row segments), and footprints. Placement tool 116 can also be used to update both the graphical representations and the database data associated with these objects. Therefore, the tool can be used to update site hierarchy data 124, configuration data 128, pick list data 134, and placement data 130.

6. Report Generator

As indicated in FIG. 1G, report generator 119 reads data from database 108 to generate reports. In the illustrated embodiment, report generator 119 is implemented using Microsoft Access 121. Reports can be printed on a printer 123.

IV. Equipment Rack

Figure 2:
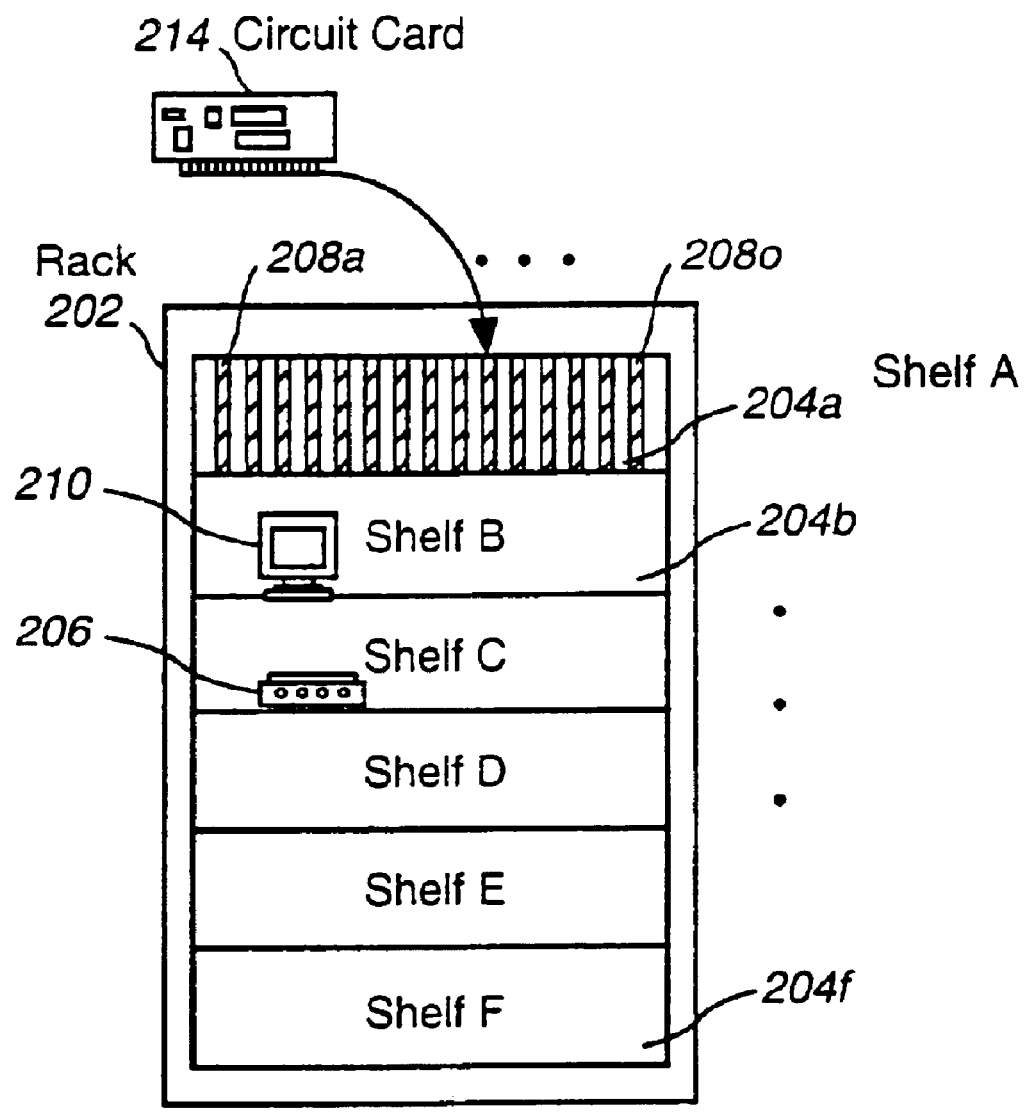
FIG. 2 is a block diagram depicting a rack, shelves and modules forming a portion of an item hierarchy in one application of the present invention.

As noted above, in telecommunications applications of SiteVu, network equipment to be managed within remote sites is typically arranged and mounted in equipment racks. FIG. 2 is an illustration depicting a typical equipment rack 202. Equipment rack 202 comprises a plurality of shelves 204a–204f (generally 204). In this example, shelf 204a comprises a plurality of vertically positioned slots 208a–208o (generally 208). Typically circuit cards, such as circuit card 214, are installed in slots 208.

As described below with reference to FIGS. 4A and 4B, data related to particular modules that can be used to configure shelves 208, according to a preferred embodiment of the present invention, are stored in product catalog 126. For example, circuit card 214 is an example of a type of module that is preferably represented in product catalog 126. Other examples of modules can be represented in product catalog 126 are workstation 210 and modem 206. As shown in FIG. 2, modules 206, 210 and 214 belong to the configuration of shelves 208, according to a preferred embodiment of the present invention.

V. Environmental Hierarchy

Figure 3:
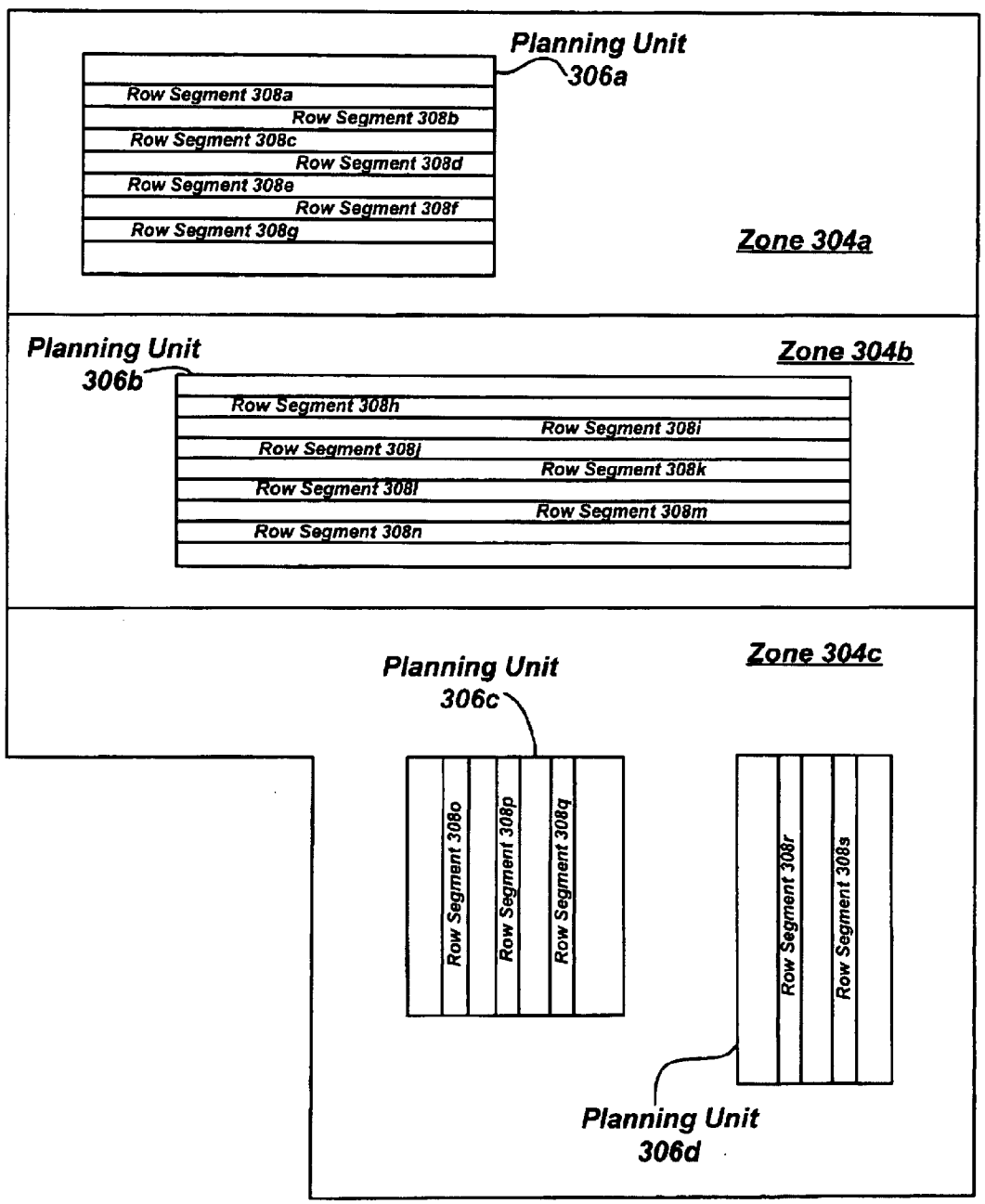
FIG. 3 is a block diagram depicting a graphical representation of a site hierarchy in one application of the present invention.

FIG. 3 is a block diagram that graphically illustrates an example of an environmental hierarchy (in this case site hierarchy) that can be utilized to represent a virtual or physical environment, as previously described. The site hierarchy shown in FIG. 3 comprises a floor (e.g., of a building) 302, three zones 304a–304c (collectively, "304") within floor 302, four planning units 306a–306d (collectively, "306") within various zones 304, and a plurality of row segments 308a–308s (collectively, "308") within each planning unit 306. As previously described, each site hierarchy level shown in FIG. 3 is preferably represented as a polygonal graphical shape that completely encloses the lower site hierarchy level(s), if any, contained therein.

In the illustrated exemplary embodiment, zones typically represent physical locations in which equipment of a particular class is placed. In a preferred embodiment, racks cannot be placed unless the equipment class of the rack matches the equipment class of the zone in which the rack is being placed. This restriction can be overridden, however, by a user with "superuser" permissions.

In this example, planning units 306 are specified so that multiple users can define row segments 308, in the same zone 304, at the same time. In a preferred embodiment, database 108 is shared by multiple users. However, in order to maintain data integrity, certain precautions must be taken. In this example, when a user is in the process of defining rows and placing row segments 308, via placement tool 116, as described below, other users are prevented from accessing certain portions of site hierarchy repository 124. In particular, the site hierarchy level immediately above the row level being defined is preferably locked. Because of this locking, planning units 306 are implemented in the site hierarchy between row levels 308 and zone levels 304. As a result, planning unit 306 is locked from other users instead of the zone level 304. In this manner, several users can work simultaneously to define row segments 308 within the same zone 304.

Further, in this example, footprints can only be created in row segments 308. As described below, a physical row in a site may comprise one or more row segments 308. In the simple example shown in FIG. 3, there is a one-to-one correspondence between physical rows and row segments 308. However, a site hierarchy level called a row segment 308 is used in a preferred embodiment of the present invention to prevent users from placing racks in areas that have physical obstructions. For example, suppose a physical obstruction, such as a building support column, is present within a particular row in a field site. In this case, the physical row is represented by two row segments that are placed to avoid the obstruction. In this fashion, since racks can only be placed within row segments 308, a user cannot inadvertently place a rack in the same position as the obstruction.

As noted above, an implementation of the present invention provides a means for defining components, including modules, shelves and rails, which are stored in product catalog 126. Preferably, detailed information pertaining to each component within the product catalog 126 is defined during a data entry process.

VI. Creating Configured Racks From Product Catalog Components

A. Creating a Product Catalog Item

Figure 6:
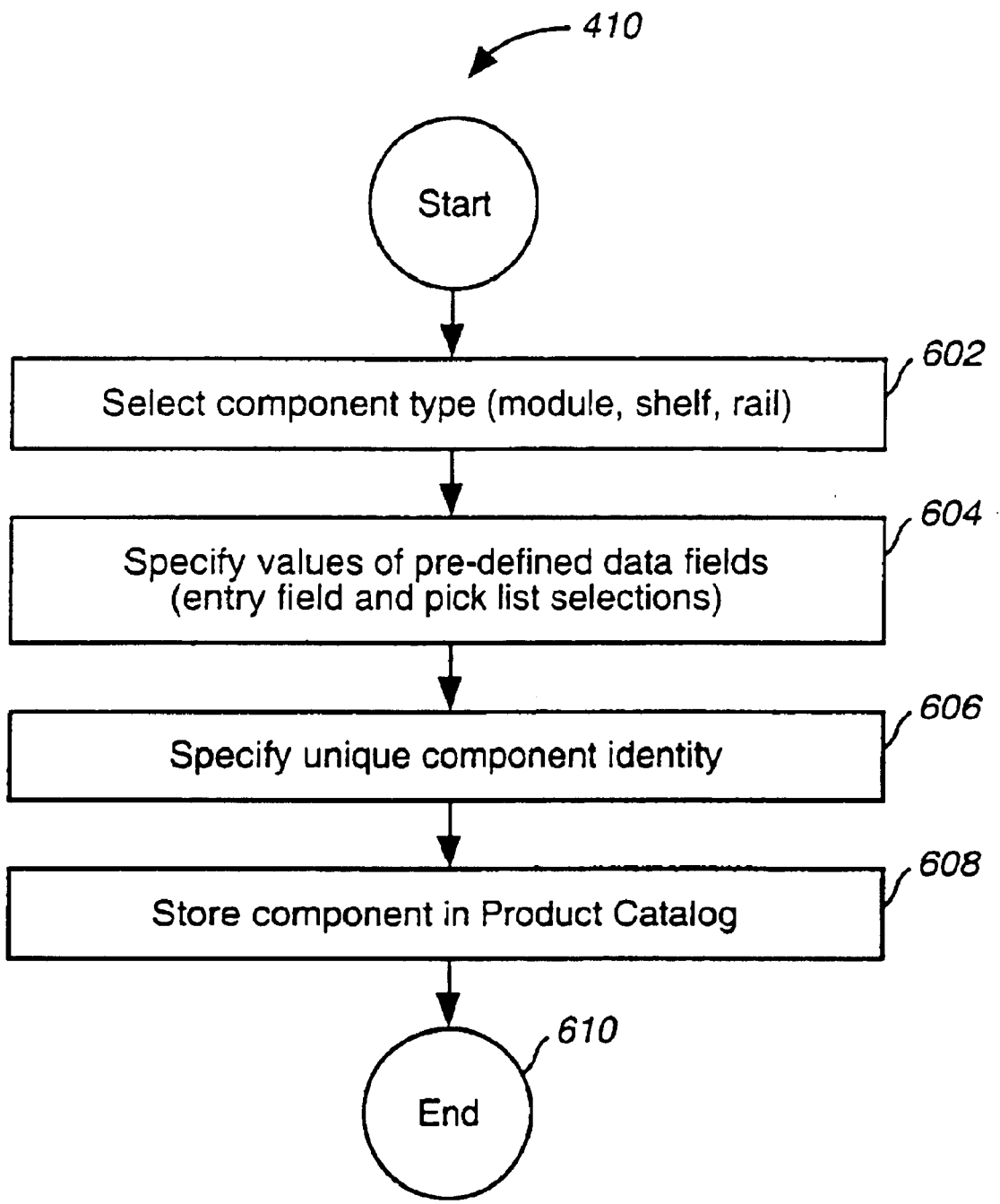
FIG. 6 is a flowchart depicting a process that can be used to create components in the product catalog, according to a preferred embodiment of the present invention.

FIG. 6 is a flowchart depicting an example of a data entry process that can be used to create items in product catalog 126 according to a preferred embodiment of the present invention. Specifically, in a preferred embodiment, this process is performed via rackface tool 112 of SiteVu. The process begins with step 602. In step 602, a user selects the component type. In this example, component types include modules, shelves and racks. Once a component type is selected, control passes to step 604. In step 604, the user specifies values for each attribute presented in a predefined list of attributes that are applicable to the selected component type. Preferably, a different predefined list of attributes is presented for each component type. Thus, a particular list of attributes is presented to the user, depending on the type of component selected in step 602. Generally, values for attributes are specified by either typing data directly into data entry fields or by selecting one or more predefined items from a pick list associated with the data attribute. It should also be noted that enhanced flexibility is provided by supporting definition of component attributes by a user. The user may also create appropriate predefined attribute values and constraints for attribute values.

Examples of attributes that can be specified in step 604 include identifying attributes, physical attributes, electrical and connection attributes and status attributes. Identifying attributes include, for example, manufacturer's name, manufacturer's model number, service provider's identifier, bar code identifier, manufacturer's part number, manufacturer's description, face label, equipment class code and equipment subclass code.

Physical attributes generally include height, width, depth, and weight. Typical electrical attributes include voltage type, a voltage quantity, current and current quantity. Further, in a preferred embodiment, additional data fields are included that indicate whether or not the attributes have been completely specified.

In step 606, the user specifies a unique identifier for the newly created component. Next, step 608 indicates the component is stored in product catalog 126. The process ends with step 610.

B. Creating a Shelf Configuration

Figure 4A:
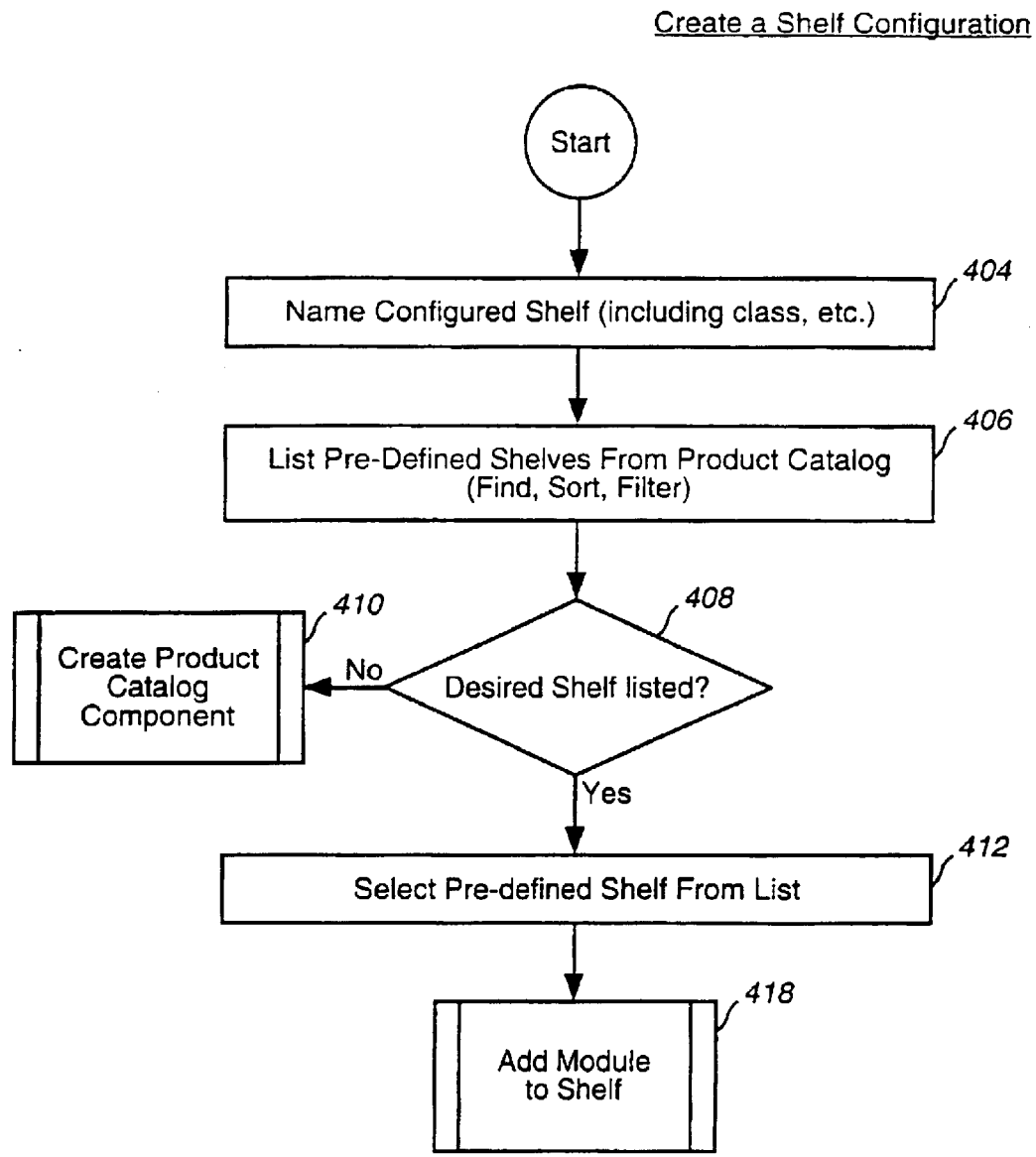
FIGS. 4A and 4B together form a flowchart of a process for creating a configured shelf, according to a preferred embodiment of the present invention.

FIG. 4A is a flowchart depicting a process that can be used to create a shelf configuration, according to a preferred embodiment of the present invention. Specifically, this process is performed by rackface tool 112, according to a preferred embodiment of the present invention.

The process begins with step 401. In step 404, the user specifies a unique name for the new shelf configuration. Typically, this name must be unique in database 108. In addition, values are specified for required fields. For example, in a preferred embodiment, required fields include a manufacturer, an equipment class and an equipment subclass. Note that in a preferred embodiment, a value for manufacturer or "generic" is used for generic racks as previously described.

Next, in step 406, a pick list comprising a list of predefined components from product catalog 126 is displayed to the user. Thus, components that have been created according to the process depicted in FIG. 6 are listed in step 406.

Specifically, in this example, a list of shelf components is presented to the user. In a preferred embodiment, sort, find and filter options are provided to assist the user in finding a particular component listed in product catalog 126. In any case, the user is prompted to select a particular shelf from the pick list presented in step 406.

Next, as step 408 indicates, if a desired shelf cannot be found in product catalog 126, control passes to step 410. This can occur for example, if a user desires to use a particular shelf that has not yet been created via the data entry process depicted in FIG. 6. Accordingly, the user has the option to create a new product catalog component as indicated by step 410. Process steps that can be used to create a product catalog component 410 are presented in FIG. 6, as previously described.

On the other hand, as indicated by step 408, if the pick list in step 406 contains the desired shelf component, the user selects the shelf component in step 412. Control then passes to step 418. In step 418, the user adds modules to the selected shelf.

C. Adding Modules to a Shelf

Figure 4B:
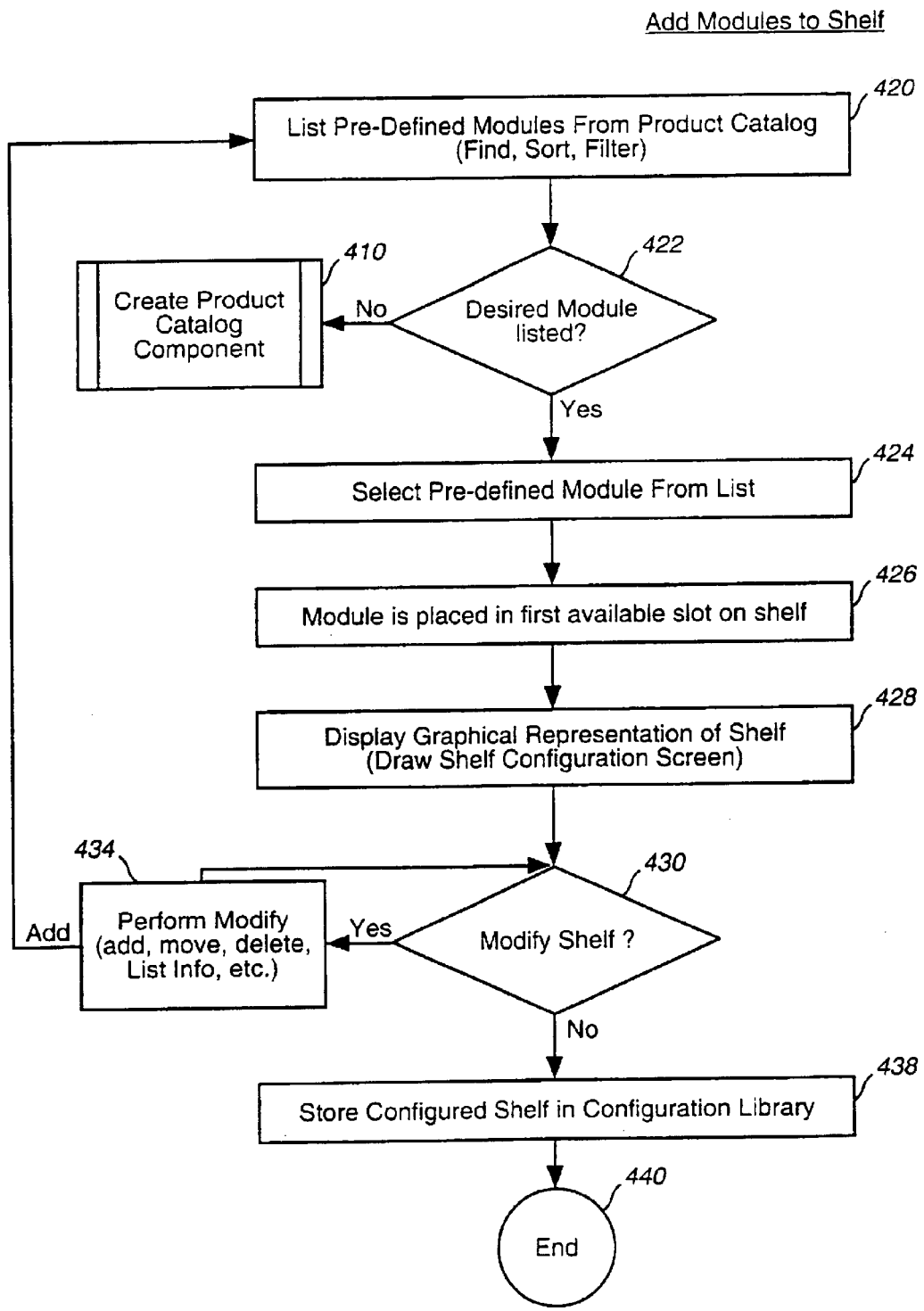

A process that can be used to add modules to a selected shelf is presented in FIG. 4B. The process begins with step 420. In step 420 the user is presented with a pick list that contains a list of predefined modules from product catalog 126. In a preferred embodiment, sort, find and filter options are provided to assist the user in finding a particular module from product catalog 126. Examples of predefined module types include circuit cards 214, computer terminals 210, and other equipment, such as modem 206. Modules are components that are generally installed on shelves 208.

As step 422 indicates, if the desired module is included in the list presented in step 420 control passes to step 424, where the user selects the module. If not, once again the user has the option to create a product catalog component, as indicated by step 410.

After a module has been selected in step 424, control passes to step 426. In step 426, the selected module is placed in the first available slot 208 on the configured shelf 204. Next, as step 428 indicates, the user is presented with a graphical representation of the shelf and the module as selected from steps 412 and 424, respectively. Control then passes to step 430. In step 430, the user has the option to modify the shelf. As step 434 indicates, this includes for example, adding, moving and deleting modules. In addition, the user can list information about the configured shelf. As indicated by step 434, if the user chooses to add more modules to the shelf, control passes to step 420, and steps 420–430 are repeated.

As stated above, in a preferred embodiment, users edit a configured shelf in step 434 by directly manipulating graphical representations of the selected modules from step 428. For example, in one implementation, users "drag" graphical representations of the selected modules to particular locations within the graphical representation of the selected shelf. Preferably, a mouse or other pointing device is used to accomplish this task.

After the user has completed modifying the shelf, control passes to step 438. In step 438, the configured shelf is stored in configuration library 128, and the process ends at step 440. In a preferred embodiment, the user also has the option to store the shelf as a "work-in-progress" to be completed later. In addition, other status such as "pending approval," "standard," or "special" can be specified. Preferably, only configured shelves with a status of "approved standard" (i.e., standard configured shelves that have been approved) or "special" can be used in a configured rack. After one or more shelves have been configured and stored in the configuration library 128, according to the process in FIG. 4A, the configured shelves can be used to create configured racks.

D. Creating a Configured Rack

Figure 5:
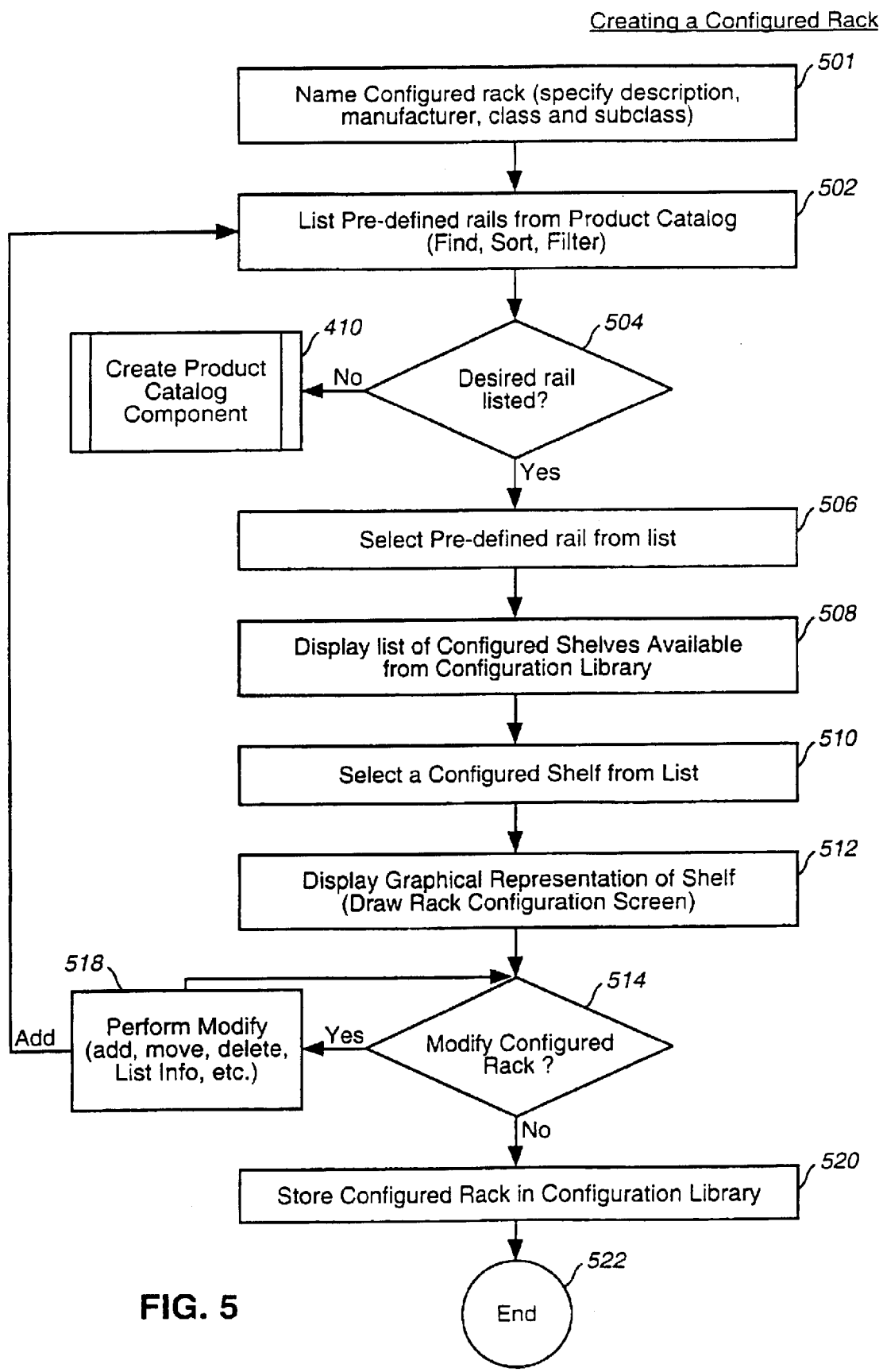
FIG. 5 is a flowchart depicting a process that can be used to create a configured rack in the item hierarchy of a telecommunications environment, according to a preferred embodiment of the present invention.

FIG. 5 is a flowchart illustrating a process that can be used to create a configured rack according to a preferred embodiment of the present invention. The process begins with step 501. In step 501, the user specifies a name for the configured rack. In addition, required fields such as a description, a manufacturer, a class and a subclass are preferably specified in step 501. In step 502, a list of predefined rails from product catalog 126 is presented to the user. In a preferred embodiment, sort, find and filter options are provided to assist the user in finding a particular rail within product catalog 126. In any case, the user is prompted to select a rail from the pick list presented in step 502. As step 504 indicates, if the desired rail is included in the list presented in step 504, control passes to step 506, where the user selects the rail. If not, once again the user has the option to create a rail for the product catalog 126 as indicated by step 410.

If a rail is selected in step 506, control passes to step 508. In step 508, the user is presented with a list of the available configured shelves from configuration library 128. In a preferred embodiment, only shelves that are compatible with the selected rail are presented. Further, as previously noted, in a preferred embodiment, only configured shelves having a status of "approved standard" or "special" will be presented in the list in step 508. Note that the configured shelves presented in the pick list in step 508 are shelves that have been configured according to the process depicted in FIGS. 4A and 4B, as previously described. In step 510, the user selects a configured shelf from the pick list presented in step 508.

In step 512, a graphical representation of the selected shelf and rail is presented to the user. This graphical representation is presented to allow the user to directly manipulate and modify the configured rack as described below with reference to step 518. In step 514, the user has the option to modify the rack. As step 518 indicates, this includes for example, adding, moving and deleting shelves. In addition, the user can list information about the configured rack. As indicated by step 518, if the user wishes to add additional shelves to the rack, control passes to step 508, and steps 508–514 are repeated.

As stated above, in a preferred embodiment, users modify a configured rack in step 518 by directly manipulating the graphical representations of the selected shelves from step 512. For example, in one implementation, users "drag" graphical representations of the selected shelves to particular locations within the graphical representation of the selected rail. After racks have been configured, for example, by using the process depicted by the flowchart in FIG. 5, the racks can be placed within a site. The explanation of how an environment hierarchy (e.g., a site hierarchy) is built and how graphical objects (such as racks) are placed within the environmental hierarchy is presented in sections VIII and X below.

VII. Database

A. Overall View of the Database

Figure 10A:
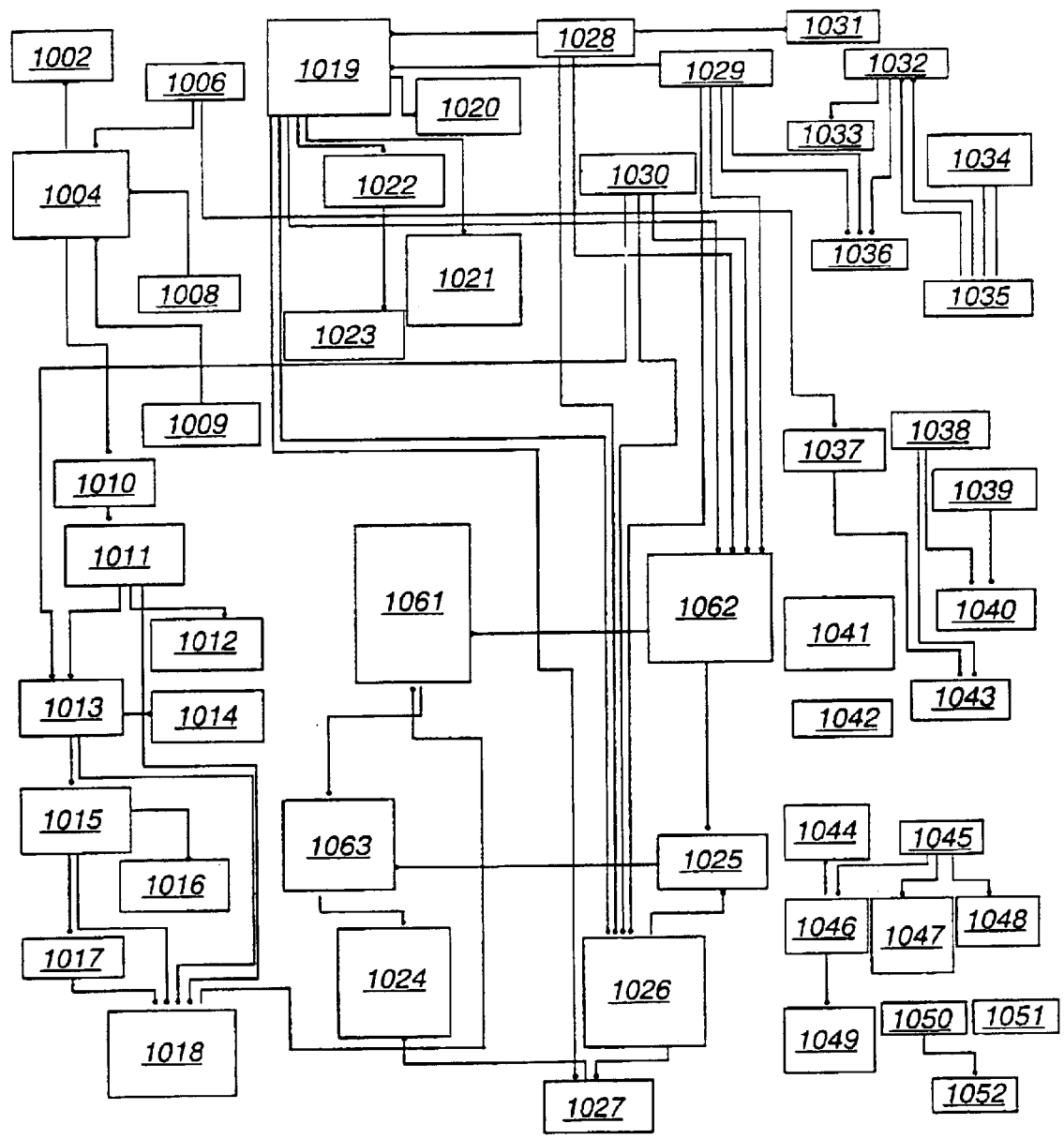
FIGS. 10A–10N are block diagrams illustrating a plurality of database tables that can be used to implement the database depicted in FIG. 1A, according to a preferred embodiment of the present invention.

FIG. 10A is a block diagram illustrating a plurality of database tables that can be used to implement database 108 in a telecommunications application according to a preferred embodiment of the present invention. In this exemplary application of a preferred embodiment, a relational database is used to implement database 108. However, in other embodiments, different types of databases can be used. An expanded version of the block diagram depicted in FIG. 10A is also depicted in FIGS. 10C–10N. FIG. 10B shows how FIGS. 10C–10N are related to each other to form the block diagram depicted in FIG. 10A.

B. Remote Sites, Power Plants, Responsible Departments, and States

Figure 10C:
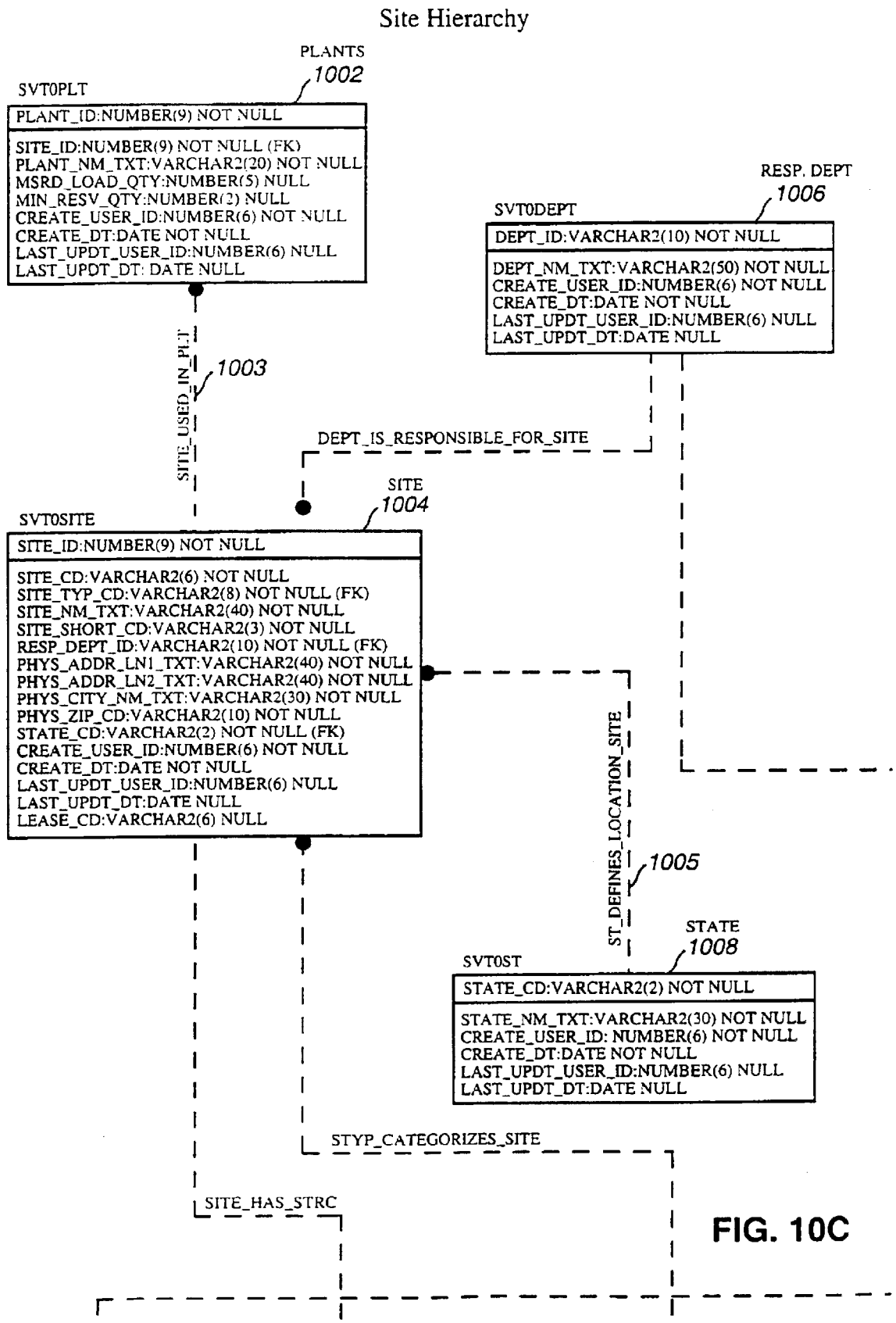

Referring now to FIG. 10C, there are illustrated a number of boxes that each represent a specific database table. Accordingly, each database table comprises the names of specific data fields that are defined for each table according to a preferred embodiment of the present invention. For example, table 1004 represents remote sites in a portion of database 108 referred to above as site hierarchy repository 124.

In this example, the name of each data field is descriptive of the type of data it represents. For example, the first three data fields in site table 1004 are named SITE ID, SITE_CD and SITE_TYP_CD, respectively. These three data fields hold information related to a site identification number, a site code and a site-type code for each site stored in site table 1004. As such, for the most part, by reading the descriptive names of the data fields illustrated in FIGS. 10C–10N, the function and purpose of each data field will be apparent to those skilled in the relevant arts.

Typically, data fields in a relational database 108 are conceptualized as columns in a database table. Likewise, data entries stored therein are conceptualized as rows in a database table. Thus, the term row is used herein to describe a single data entry within a database table. Accordingly, the term row and the term entry are synonymous. For example, a single row (or entry) in the site database table 1004 represents data describing the details of a single remote site. A complete description of the remote site comprises specific values for each of the data fields associated with database table 1004. However, it is generally not necessary to provide values for every data field associated with a database table. This choice generally depends on each specific implementation of the present invention, which will typically define data fields as being either required or optional.

The lines interconnecting database tables shown in FIGS. 10C–10N represent relationships among tables. It should be noted that for the most part, the database tables shown in FIGS. 10C–10N are self-explanatory to those skilled in the relevant art(s). Accordingly, after reading the brief description below and examining FIGS. 10C–10N, it would be apparent to those skilled in the relevant art(s) how to implement database 108 for various application of SiteVu.

As stated, interconnections between database tables shown in FIGS. 10C–10N represent relationships among the tables in database 108. For example, a line 1003 is shown connecting site table 1004 to plant table 1002. In this example, plant table 1002 represents power plants that are installed in each site. The circle at the end of line 1003 represents a one-to-many relationship between the rows of site table 1004 and the rows of plant table 1006. Accordingly, each entry in the site table 1004 may be associated with more than one entry in plant table 1006. In other words, each site may have more than one power plant installed therein.

Tables 1006 and 1008 represents pick list tables for specific data fields within site table 1004. Specifically, pick list tables 1006 are associated with data fields used to define a responsible department and a geographical state for a particular site listed in the table 1004. In this example, pick list tables comprise a list of valid values that are used to fill in particular data fields. A pick list table, such as the pick list table 1008, is used to assist in the data entry process. Typically, a pick list table is associated with one or more data fields. For example, pick list table 1008 is associated with a data field STATE_CD within table 1004 (as depicted by dotted line 1005). Preferably, pick list tables are used during data entry to provide users with a drop-down list box, or the like, comprising textual representations of predefined values that can be specified for the row or rows, associated with the pick list table.

Accordingly, using the example described above, a pick list comprising states containing remote sites is presented to the user during a data entry phase. Preferably, after the user selects an item from the pick list (in this case the name of a state), the associated value is automatically stored in the associated row within the database table. Typically, in such cases, users are restricted to values contained in the pick list tables. That is, for such data fields that have pick lists associated with them, values other than those contained in the pick list maybe considered invalid. However, this choice depends on particular implementations of the present invention.

C. Sites Types, Structures (Buildings), Floors, and Zones

Figure 10D:
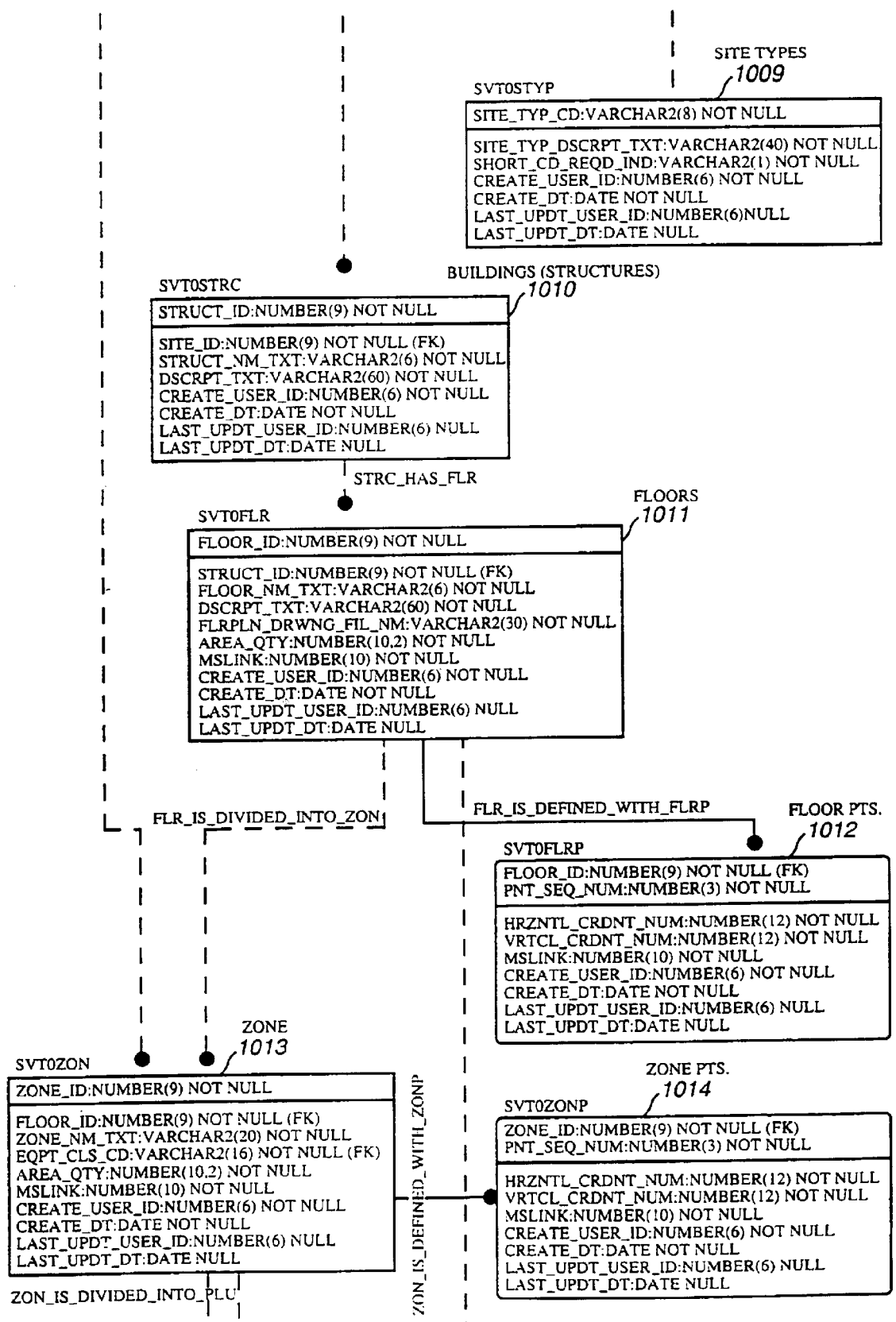

Referring now to FIG. 10D, table 1009 is a pick list table associated with the site table 1004 for providing valid values for the data field used to store site types. Table 1010 represents structures or buildings within sites. Typically, each site (represented by a single entry or row in the site table 1004) comprises multiple buildings that are each represented by a single entry in the building table 1010. Therefore, building table 1010 typically comprises multiple rows for each row in site table 1004.

Table 1011 represents floors within structures represented by table 1010. Typically, floor table 1011 comprises multiple entries for each entry in structure table 1010. Table 1012 represents floor points for the floors represented by floor table 1010. This information is used in a preferred embodiment of the present invention for rendering graphical representations of floors, as described above. In one embodiment, each entry in the floor point table 1012 contains the x-y coordinates of a portion of a polygon that is used to graphically represent the associated floor. Typically, floor point table 1012 comprises multiple rows for each entry in floor table 1011.

Table 1013 represents zones within floors represented by floor table 1011. Typically, zone table 1013 comprises multiple entries for each entry in floor table 1011. Table 1014 represents zone points for the zones represented by zone table 1013. This information is used in a preferred embodiment of the present invention for rendering graphical representations of zones. In one embodiment, each row in zone point table 1014 contains x-y coordinates for a portion of a polygon that is used to graphically represent the associated zone. Typically, zone point table 1014 comprises multiple entries for each entry in zone table 1013.

D. Planning Units, Rows, and Row Segments

Figure 10E:
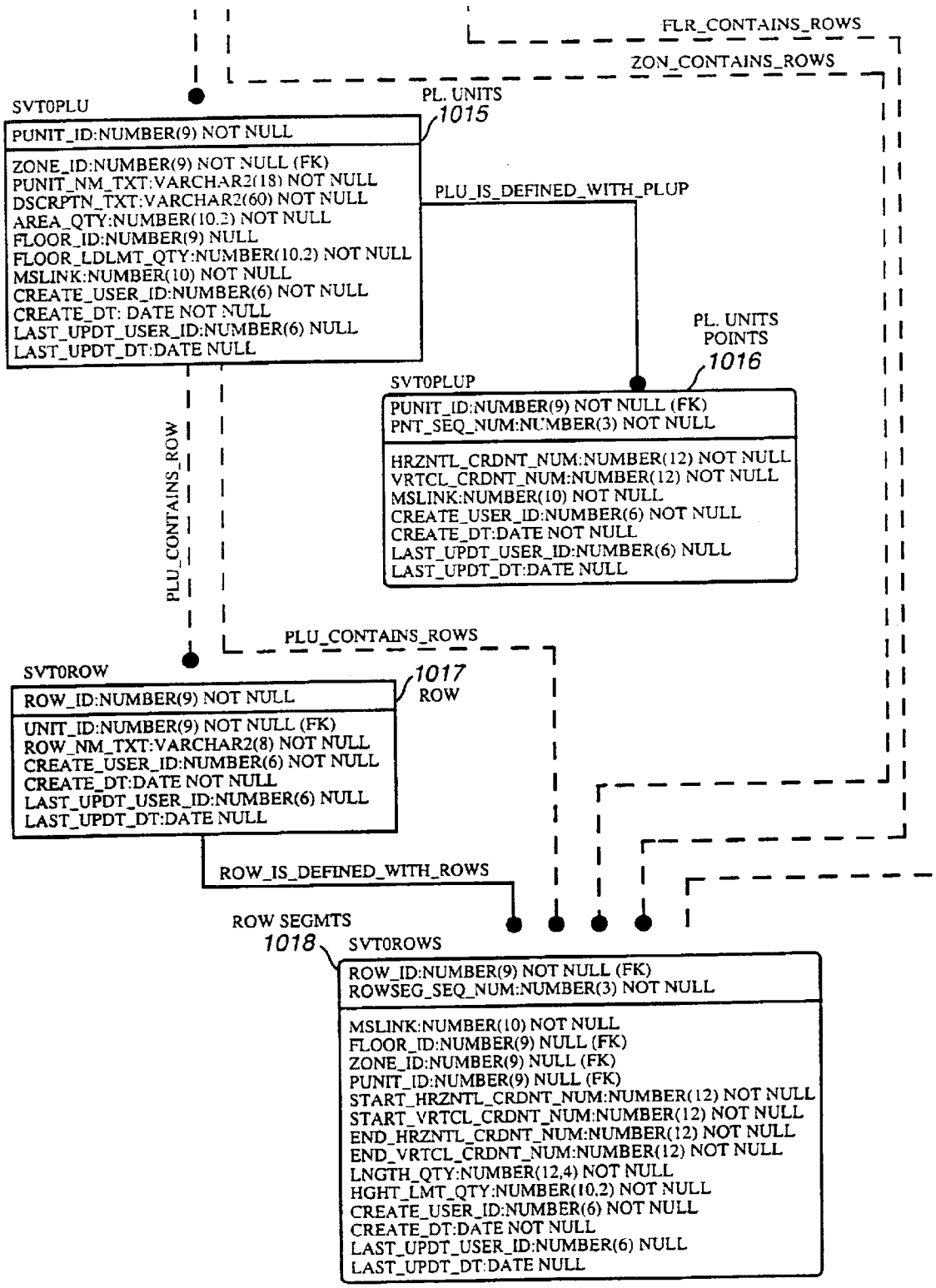

Referring now to FIG. 10E, table 1015 represents planning units within zones represented by zone table 1013. Typically, planning unit table 1015 comprises multiple entries for each entry in zone table 1013. Table 1016 represents points for planning unit table 1015. This information is typically used for rendering graphical representations of planning units. In one embodiment, each row in planning unit point table 1016 contains x-y coordinates for a portion of a polygon that is used to graphically represent the associated planning unit. Typically, planning unit point table 1016 contains multiple entries for each entry in the planning unit table 1015.

Table 1017 represents rows within planning units. Typically, row table 1017 comprises multiple entries for each entry in planning unit table 1015. Table 1018 represents row segments within rows. Typically, row segment table 1018 comprises multiple entries for each entry in the row table 1017. As will be shown below, configured racks are placed within row segments.

E. Product Catalogs, Shelves, Cards (Modules) and Rails

Figure 10F:
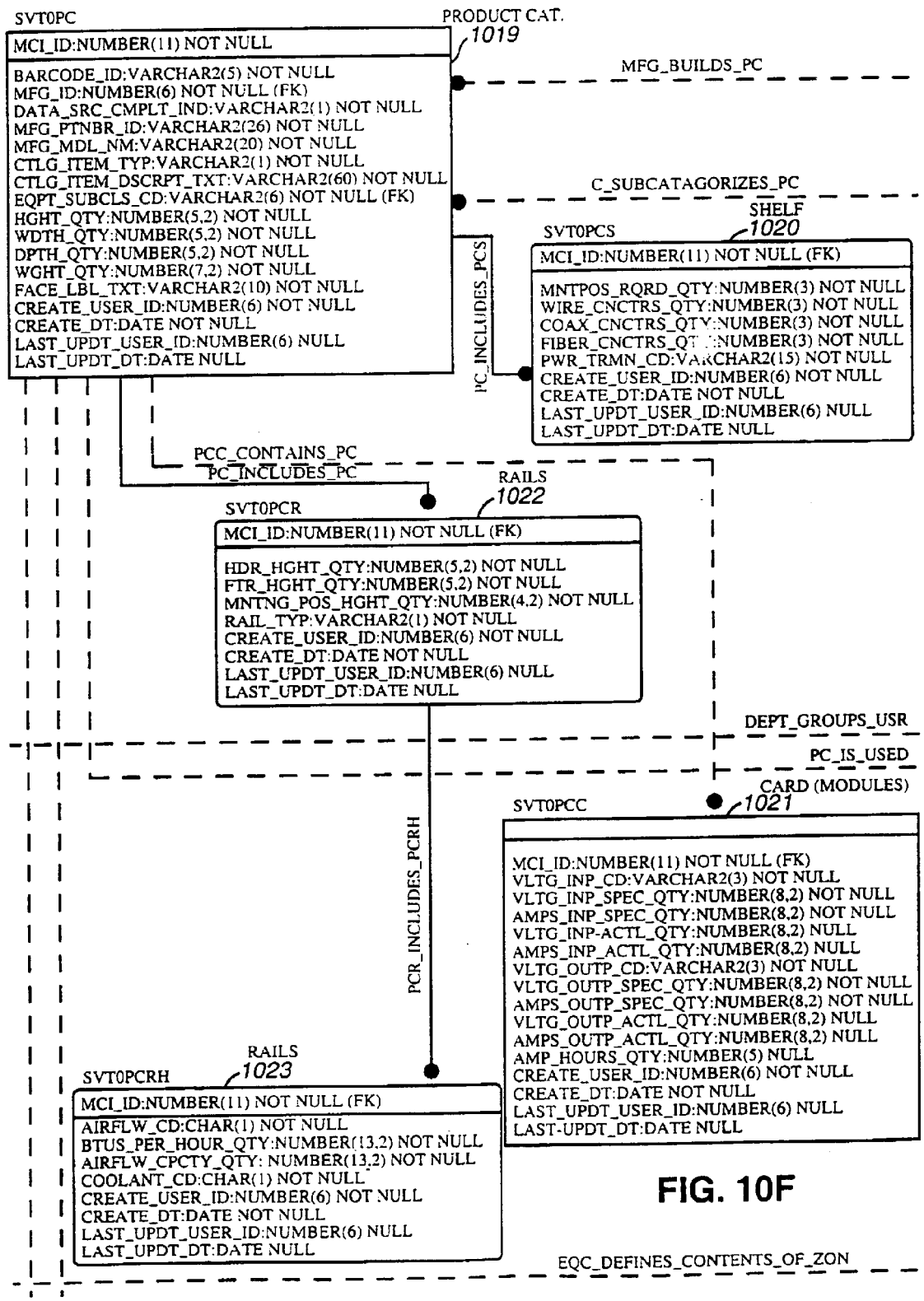

Referring now to FIG. 10F, a number of tables 1019–1023 are depicted that form a portion of database 108 referred to herein as product catalog 126. Specifically, table 1019 represents components, such as modules, shelves and racks, as previously described. Data fields within the product catalog table 1019 preferably contain detailed information about each component stored therein, such as a part number, a classification, and physical dimensions of the component. In a preferred embodiment, information common to all types of components is stored in product catalog table 1019, and information specific to predefined component types are stored in database tables 1020–1023.

For example, shelf table 1020 represents additional information particular to shelf components, such as the quantity of wire, coaxial and fiber connectors. Card table 1021 represents additional information particular to cards or module components. In this example, information such as actual and nominal electrical and power input and output requirements are stored in shelf table 1020.

Likewise, rail table 1022 represents additional information particular to racks, such as the dimensions of the rack header and rack footer areas. In addition, the HVAC rack table 1023 represents additional information about HVAC (heating, ventilation and air conditioning) racks. In this example, such additional information includes quantities for airflow, BTUs per hour, airflow capacity and coolant specifications.

Figure 10G:
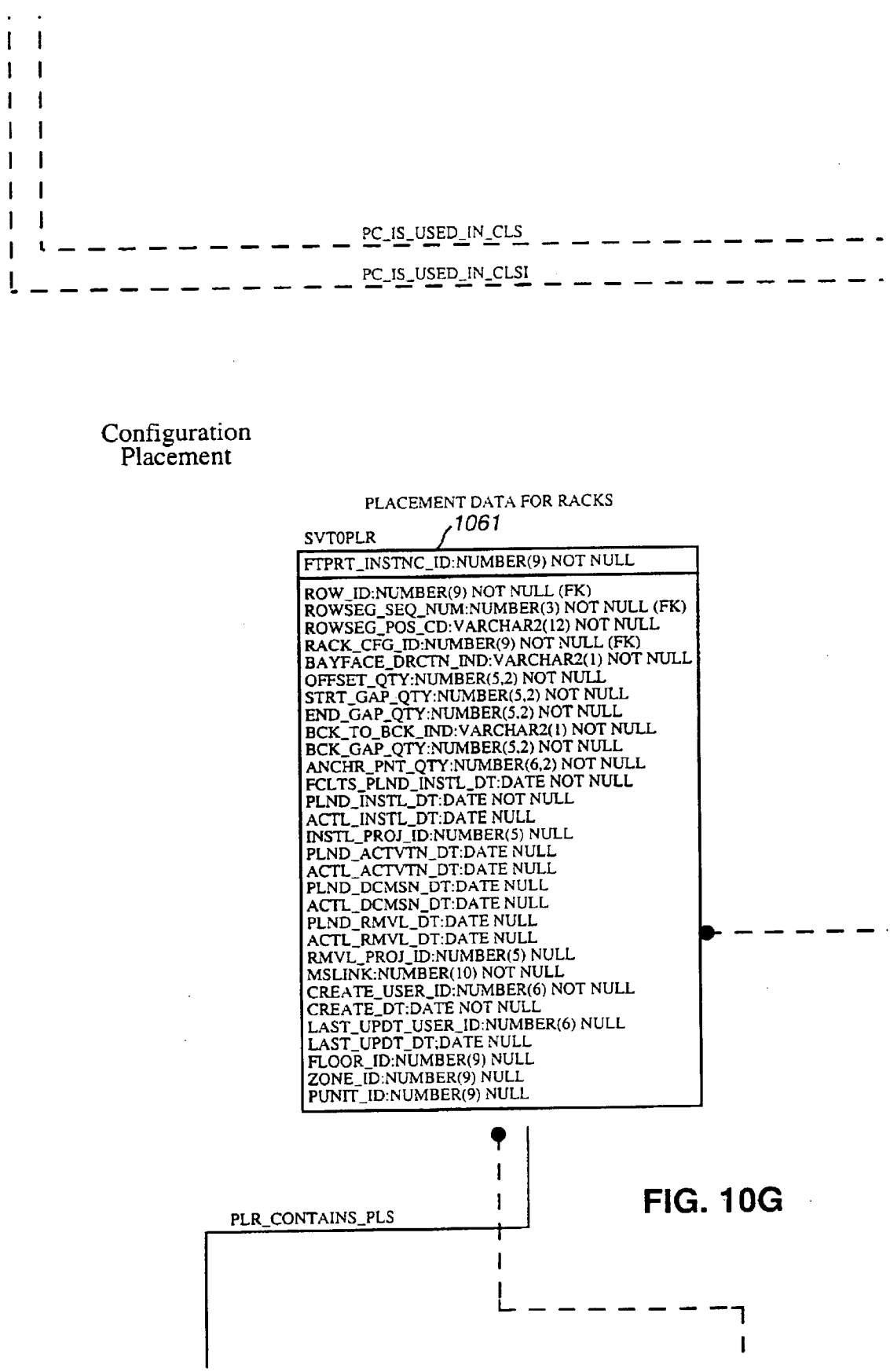
Figure 10H:
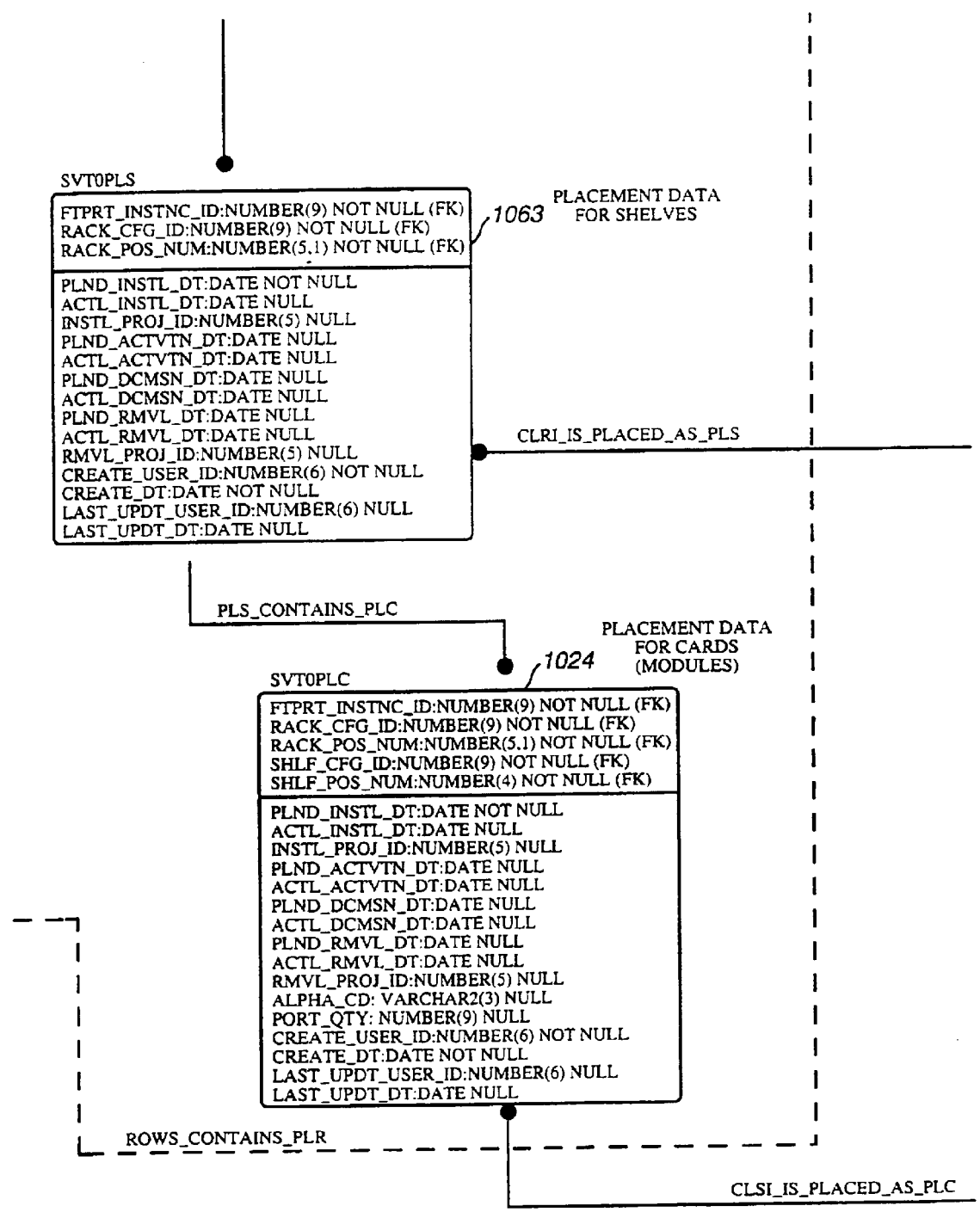

F. Placement Data for Racks Shelves, and Cards (Modules) and Configuration Racks Tables depicted in FIGS. 10G, 10H, 10J, and 10K represent portions of the database 108 referred to herein as configuration library 128 and portions of the database used to store footprint information as described above. Specifically, the portion of database 108 referred to herein as configuration library 128 is primarily represented by configured racks table 1062 (FIG. 10J) and configured shelves table 1026 (FIG. 10K).

As shown by interconnecting lines, both the configured racks and the configured shelves table 1062 and 1026, respectively, are related to product catalog table 1019. Specifically, as previously stated, configured racks and configured shelves include components (e.g. modules, shelves and racks), from product catalog 1019 that have been interrelated. In a preferred embodiment, the interrelationships for configured racks and shelves are defined utilizing rackface tool 112.

Configured rack item table 1025 (FIG. 10K) represents individual rack positions used to hold shelves, for each rack defined in configured rack table 1062. In a preferred embodiment, configured shelves that are installed in particular rack positions are defined by configured shelves table 1026. Accordingly, each entry in configured shelves table 1026 can correspond with a single entry in configured rack item table 1025. Note, however, that entries within configured shelves table 1026 can be associated with multiple entries in configured rack item table 1025. This would be the case, for example, if the same configured shelf is used in multiple rack positions in a single rack or used in multiple racks.

Configured shelves item table 1027 (FIG. 10K) represents individual shelf positions that are used to hold modules for each shelf defined in configured shelves table 1026. In a preferred embodiment, modules that are installed in particular shelf positions are defined by product catalog table 1019. Accordingly, each entry in product catalog table 1019 can correspond with an entry in configured shelf item table 1027. It should be noted, however, that in a preferred embodiment, each entry within product catalog 1019 is typically associated with multiple entries in configured shelf item table 1027.

A particularly novel and advantageous feature of a preferred embodiment of the present invention is provided by placement library 130. Specifically, placement library 130 contains placement data for racks table 1061 (FIG. 10G), placement data for cards table 1024 (FIG. 10H), and placement data for shelves table 1063 (FIG. 10H). Placement data for racks table 1061 is used to place configured racks from configured racks table 1062 in particular row segments within row segment table 1018. In this example, one or more racks can be placed in a particular row segment. This feature is preferably implemented by creating a footprint using a placement tool 116 as previously described above.

Preferably, specific data fields within the placement data for racks table 1061 are used for planning purposes. Such data fields are used to define specific time-related events, such as planned and actual installation, activation, decommission and removal dates. This allows site planners to view data related to the configuration and placement of equipment in remote sites on a time-dependent basis. Moreover, in a preferred embodiment of the present invention such information is provided at the rack, shelf and module level.

As described above, placement data for rack tables 1061 provides such time-dependent data for field equipment at the rack level. Similarly, placement data for shelves table 1063 provides such time-dependent data for field equipment at the shelf level. Likewise, placement data for modules table 1024 provides time-dependent data for field equipment at the module level. Using this feature of the present invention, site planners and other groups can view data related to field sites on a time-dependent basis. Preferably, each card (or module), shelf and rack that is placed within a remote site will have associated planned and actual installation, activation, decommission and removal dates. In this manner, users for example, can view the configuration and placement of equipment within remote field sites at a particular past, present or future date.

G. Additional Pick List Tables

Figure 10I:
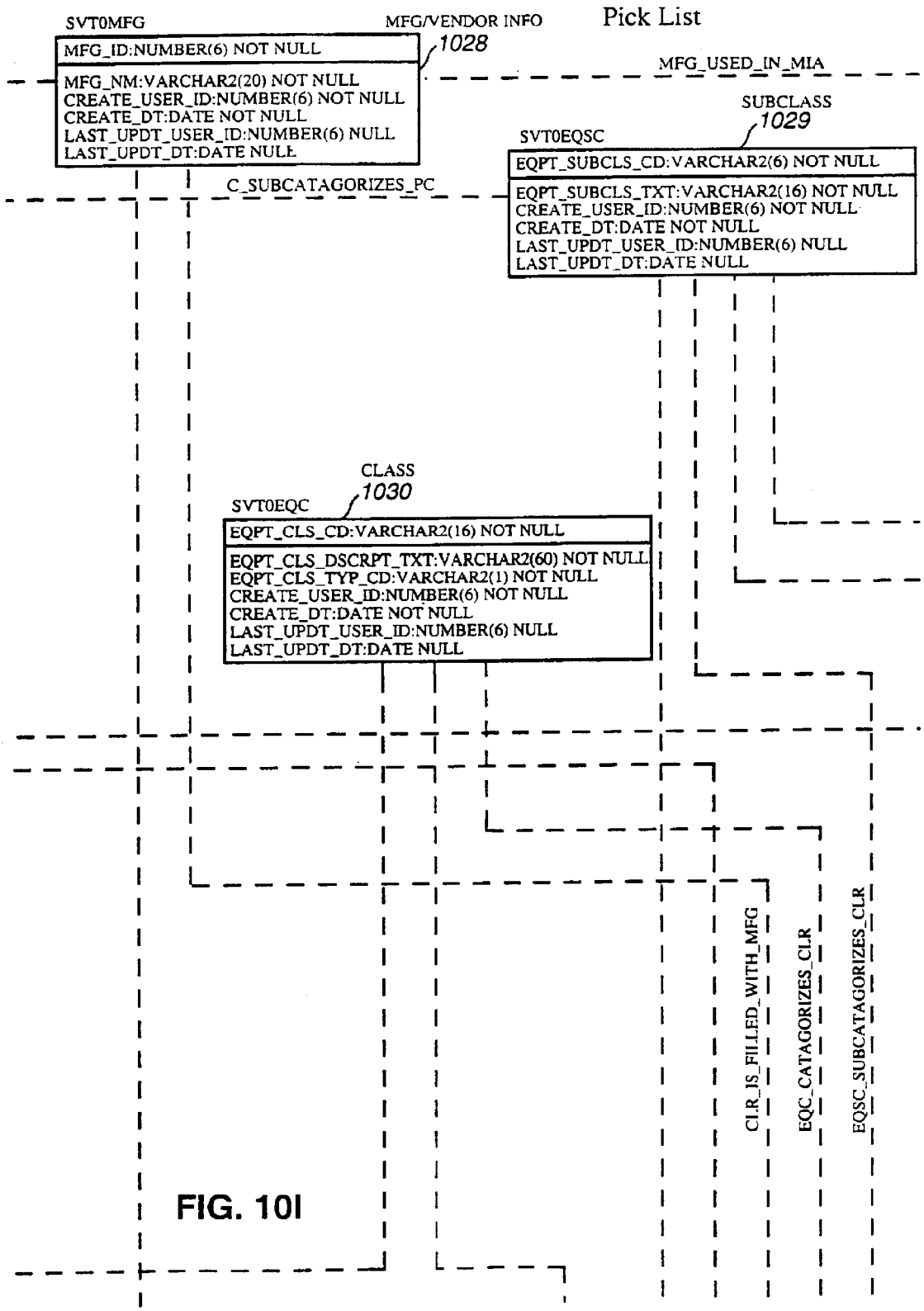
Figure 10J:
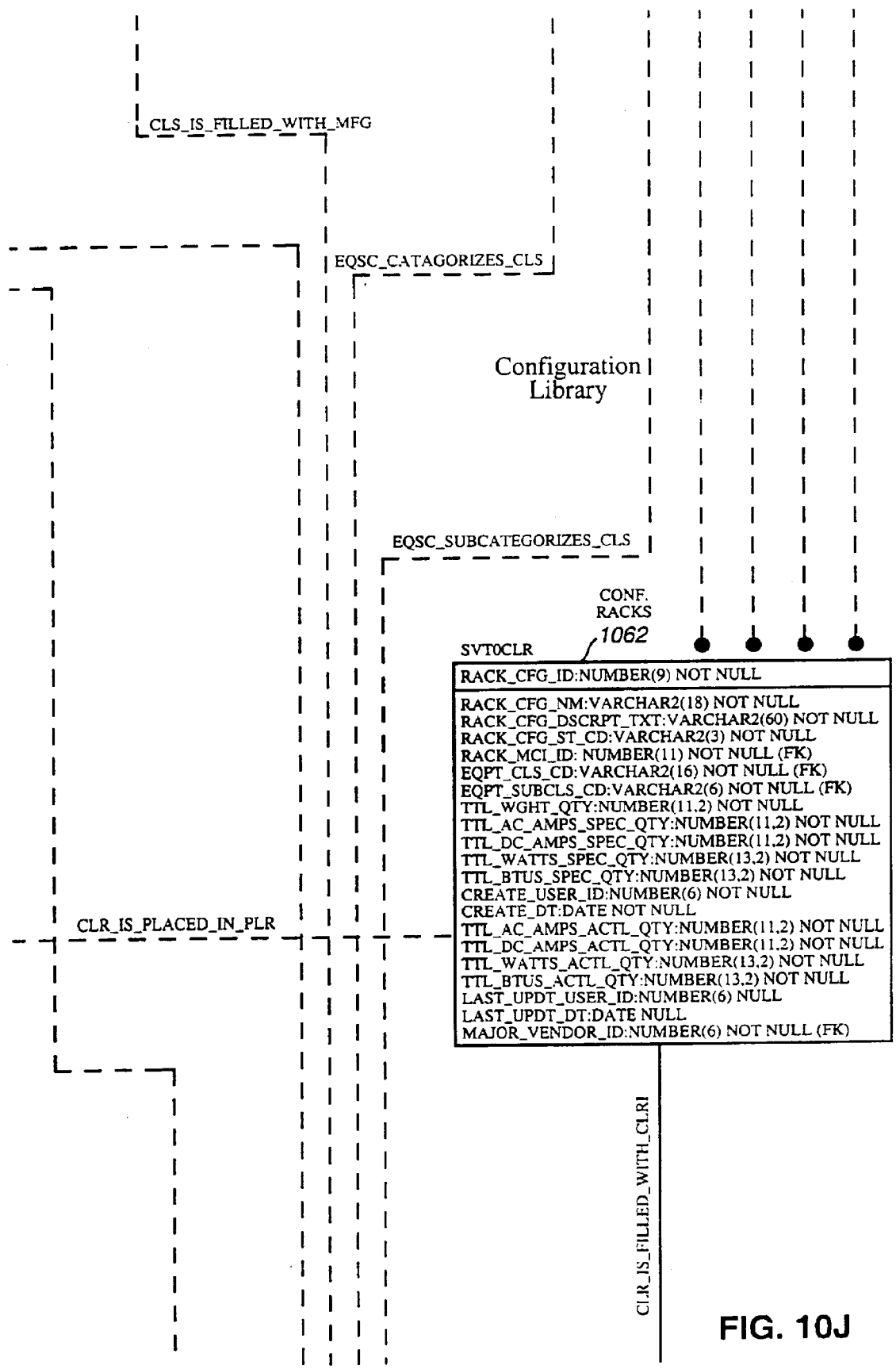
Figure 10K:
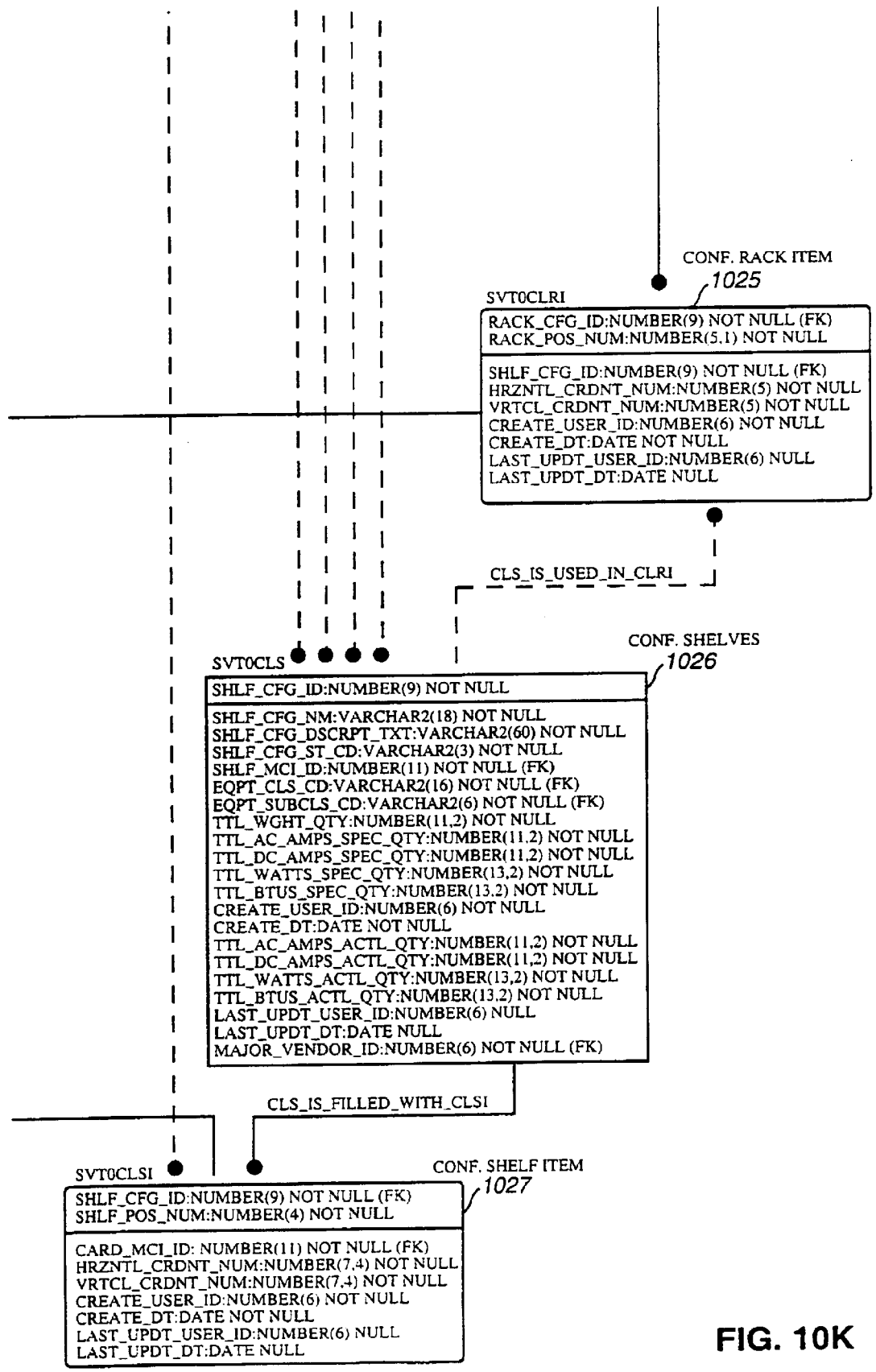

FIG. 10I comprises additional pick list tables from pick list 134 within database 108. Specifically, vendor information pick list table 1028 comprises valid values used to describe predefined manufacturers. In this example, vendor information pick list table 1028 is associated with product catalog table 1019, configuration racks table 1062 and the configuration shelves table 1026. Similarly, class pick list table 1030 is used to store predefined values describing equipment classes. In this example, class pick list table 1030 is associated with the zone table 1013, configuration shelves table 1026, configuration racks table 1062. Likewise, sub-class pick list table 1029 comprises predefined valid values used to describe equipment sub-classes. In this example, sub-class pick list table 1029 is associated with product catalog 1019, configuration shelves table 1026, and configuration racks table 1062. In addition, in this example, pick list tables 1028, 1029 and 1030 are associated with connection tables 136, as described below with reference to FIG. 10L.

H. Connection Tables

Figure 10L:
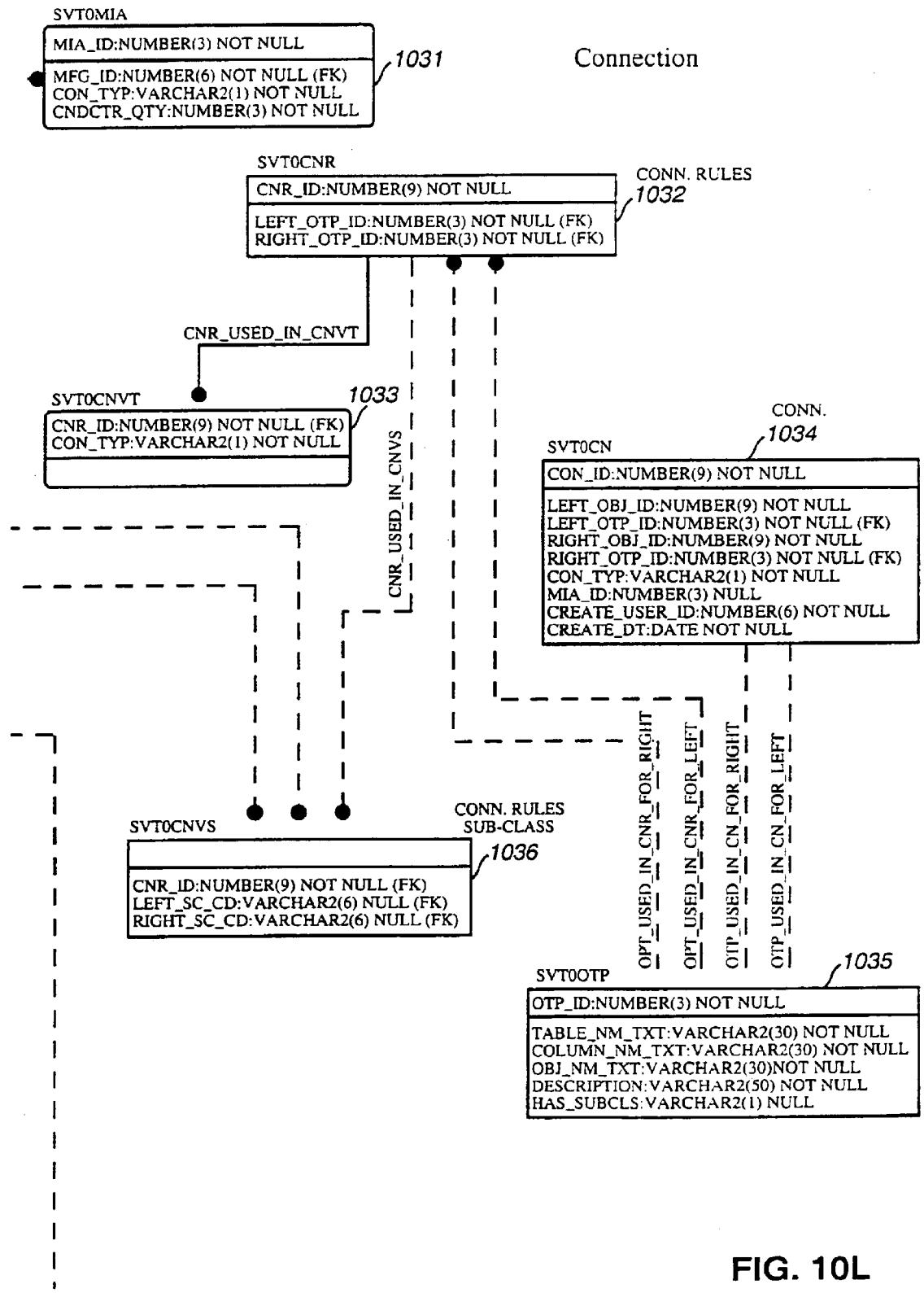

FIG. 10L depicts an embodiment of connection portion 136 of database 108. Specifically, connection tables 1031–1035 are used to logically or physically connect one database entity with another database entity without providing the details of the connection. For example, connection portion 136 of database 108 can be used to provide a logical connection between a power plant site hierarchy level and a particular footprint that draws power therefrom. In another example, connection portion 136 of the database 108 can be used to provide a physical connection between a main power distribution bay and a particular footprint. Connection tables 1031–1035 are used in a preferred embodiment to define rules for connecting objects within database 108 to one another. For example, connection rules table 1032 defines what types of objects can be connected together. Similarly, the connection rules sub-class table 1036 defines what sub-classes of equipment can be connected together. Connection table 1034 is used to define what objects are connected together.

I. User Security Tables

Figure 10M:
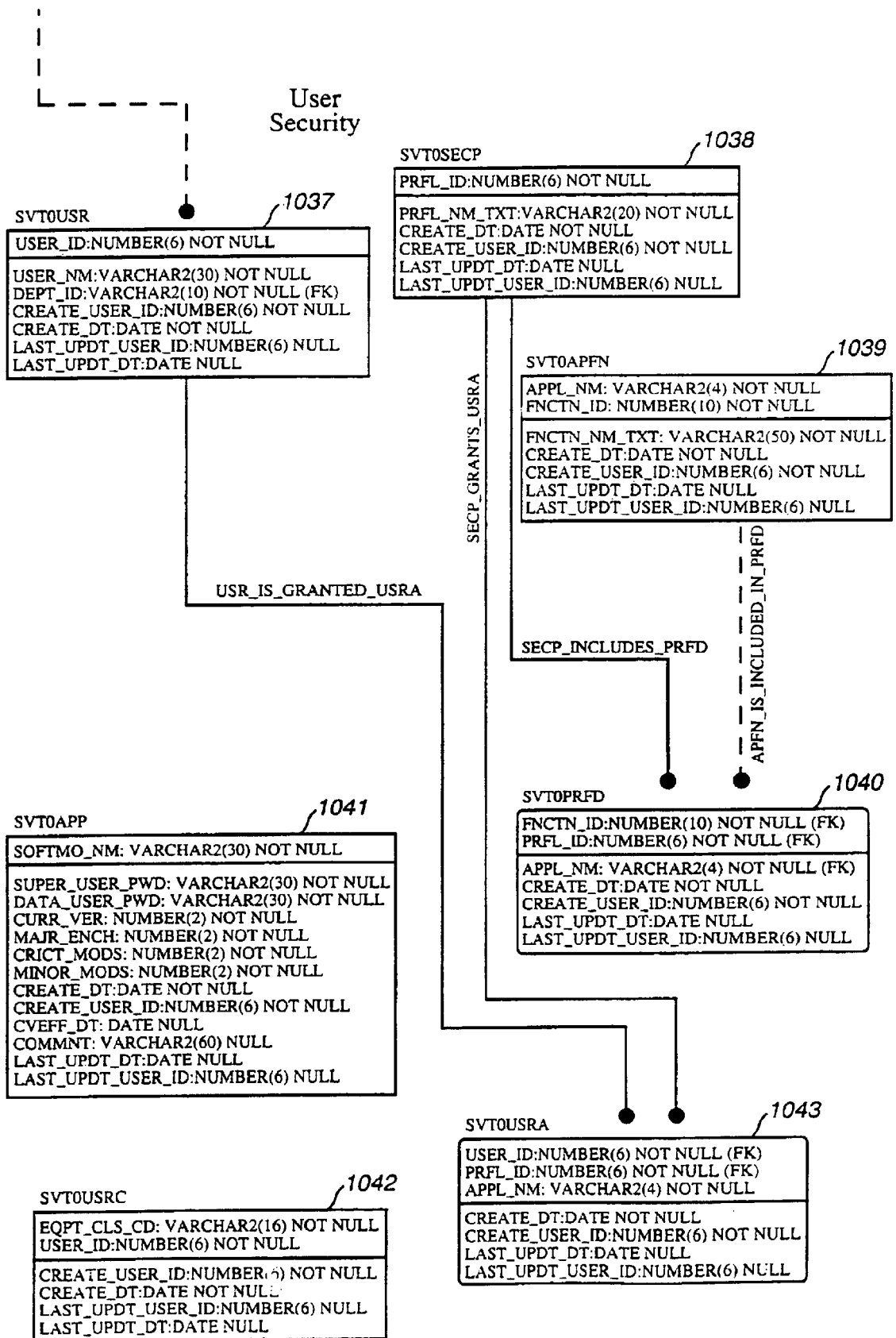
Figure 10N:
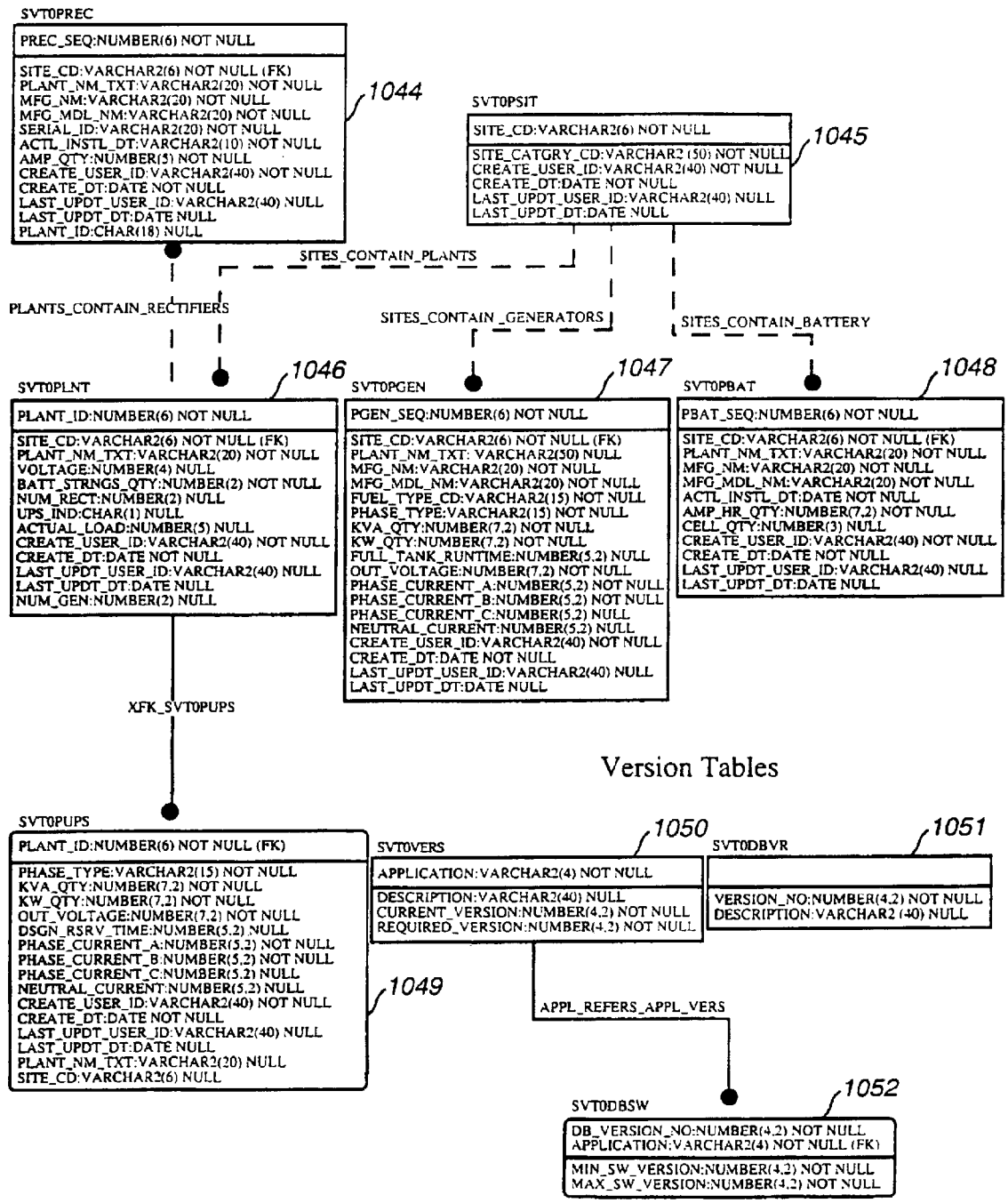

FIG. 10M illustrates user security tables 1037–1043, which form user security portion 132 of database 108. Tables 1037–1043 are preferably used to control database access and the access to specific functions within SiteVu based on user identification. In the depicted embodiment, tables 1037–1043 describe which functions particular users are allowed to performs. For example, in one embodiment, only users with a transmission rating are permitted to place transmission equipment in remote sites. Such control may be implemented with user security tables 1037–1043. The power tables portion 138 of database 108, which comprises tables 1044–1052 shown in FIG. 10N, are used for power planning as described below.

VIII. Creating Graphical Objects to Represent Levels of an Environmental Hierarchy A. Definition of a Footprint A footprint is the union of an object, such as a configured rack described above, and a specific location on the floor space. In other words, a footprint refers to the space or area occupied by a configured rack at a site. As will become apparent from the discussion presented below, the primary purpose of placement tool 116 is to create a plan, e.g. a five-year plan, that describes a physical and environmental map of configured racks at a given site. The primary product of the placement tool 116 is the placement of footprints on the floor space.

B. The Administrative Tool Function in Establishing a Hierarchy

Referring to FIG. 1E, in the preferred embodiment, administrative tool 114 is software written in C++ that runs on a Windows® operating system and uses a Windows Application Programming Interface 115 to implement its functions on workstation 104. Before the placement of any graphical objects, such as floor graphical objects, zone graphical objects, planning unit graphical objects, row segment graphical objects, and footprint graphical objects, it is necessary to use administrative tool 114 to establish a base site-structure-floor hierarchy in database 108. In this manner, at least a minimum amount of non-graphical (tabular) information must be established regarding the site-structure-floor hierarchy before any structures can be graphically represented. For example, in one embodiment the user must name a site (if the site does not exist), name a structure within the site, and name a floor within the structure. Administrative tool 114 (1) creates site table 1004, structure table 1010, and floor table 1011 in database 108, as shown in FIGS. 10C and 10D, and (2) fills in the first fields for these tables, corresponding to the names of the tables, as described in Sections X.A, X.B and X.C. The user can also fill in numerous other database fields, as described in these sections.

In addition, while using administrative tool 114, the user can associate with a site-structure-floor an accompanying architectural (also known as civil) drawing. An architectural drawing provides the architectural layout of the floor from a plan (top) view, including the existence of columns that support the building, fire escapes, air vents, doorways and other entrances. In addition, the architectural drawings detail the location of power cables and HVAC units. Referring to section X.C.4, the name of the file containing the architectural drawing is stored in floor table 1011, as shown in FIG. 10D.

C. Placement Tool Functional Overview

In the preferred embodiment, placement tool 116 is implemented as application software running on a Windows operating system. In a preferred embodiment, placement tool 116 is implemented using the Microstation Development Language (MDL). MDL is a high-level host language that Microstation incorporates for developing programs that interface with the CADD functions provided by the Microstation CADD program. For example, to allow a user to trace out a floor, or a zone, or some other type of graphical object, placement tool 116 submits a corresponding MDL command to instruct Microstation 117 to allow the user to render a graphical representation of the traced object on the display or other device.

In addition, placement tool 116 comprises software written for interfacing with database 108. Hence, when a graphical object is created and drawn by Microstation 117, placement tool 116 can update database 108 with specific information pertaining to the dimensions of the graphical object. For example, when a user creates or updates the graphical representation of a floor, placement tool 116 creates or updates non-graphical (logical) information in floor points table 1012, which is described in section X.D and shown in FIG. 10D. Therefore, the graphical information is stored in non-graphical (tabular) form, which is used to recreate the graphical representation of that information, so that a user can bring up and modify the floor at a future date.

In addition, placement tool 116 allows the user to add numerous other pieces of information to database 108 that are generally not represented graphically. For example, as discussed in section X.C.6, floor table 1011 (shown in FIG. 10D) stores the date the floor object was created, the user who created the floor object, the last user who updated the floor object, and the last date the floor object was updated. As described below, all information in the site hierarchy is readily accessible to the user while using placement tool 116.

There are also functions performed by the placement tool 116 that combine the function of CADD program 117 and database 108. For example, when a user uses the mouse to graphically layout a floor, placement tool 116 uses Microstation 117 to calculate the area of the floor and further uses database 108 to store this information. As described in section X.C.5, this information is stored in floor table 1011 as area quantity field 1011f. The details of placement tool 116 will become more apparent from the detailed discussion below.

D. Creation of Graphical Objects

Figure 7:
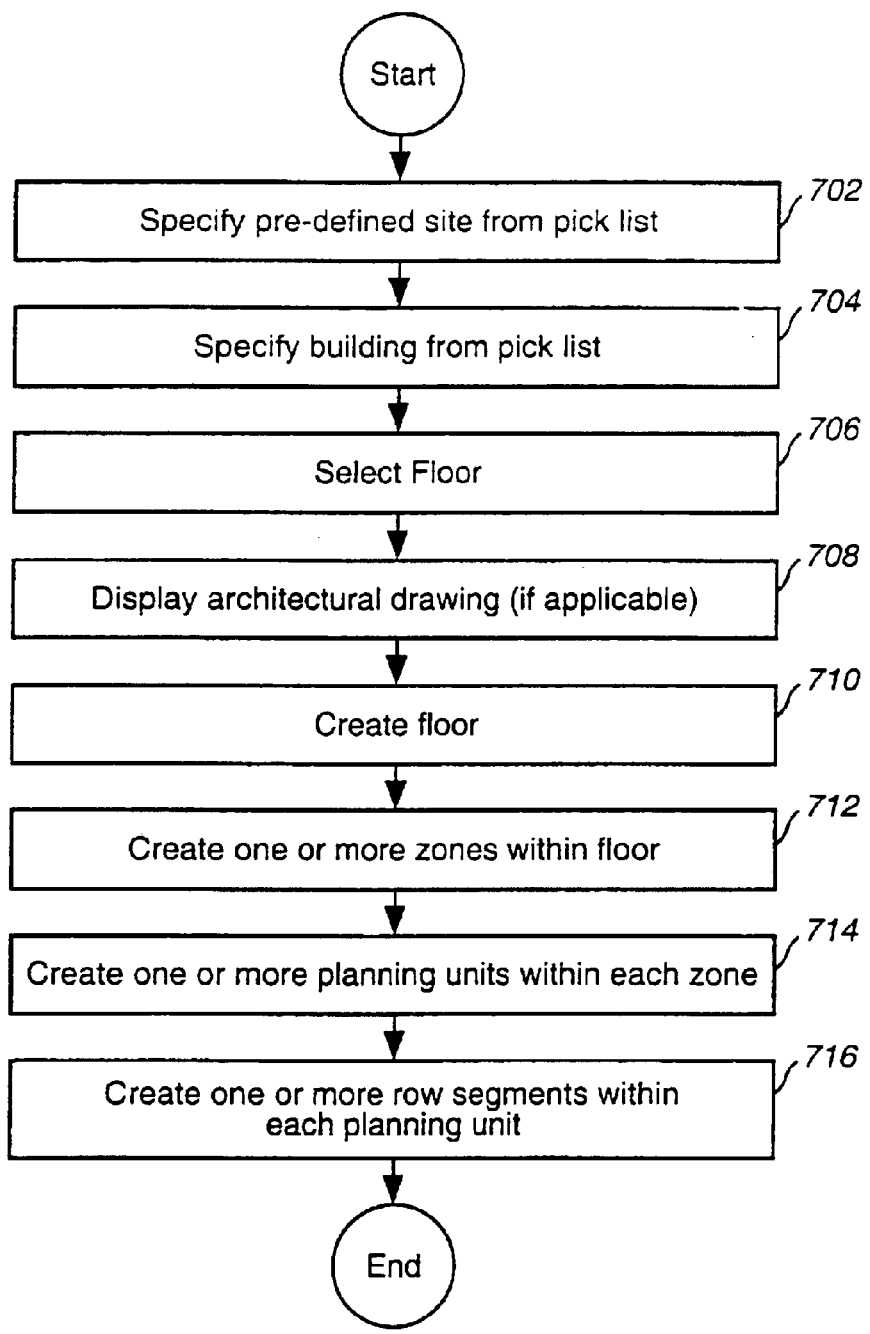
FIG. 7 is a flowchart depicting a process that can be used to create an environmental hierarchy, according to a preferred embodiment of the present invention.

FIG. 7 is a flowchart illustrating a process that can be used to define the graphical portions of a site hierarchy, according to a preferred embodiment of the present invention. This process is performed by placement tool 116 according to a preferred embodiment of the present invention.

1. Selecting a Site

The process begins with step 702. In step 702, a user specifies a predefined site. This is preferably accomplished by selecting a site from a pick list of sites that have been defined via the administrative tool 114. The data related to the site is stored by administrative tool 114 in site hierarchy repository 124 of database 108. The data is specifically stored in site table 1004, as shown in FIG. 10C and explained in section X.A.

In should be noted that placement tool 116 can provide a security feature to prevent unauthorized individuals from creating and updating any type of graphical or non-graphical information. For example, when a user desires to add a graphical object to a site and selects a site from the pick list of sites, placement tool 116 can ensure that the user is authorized to access information about the site, for example, by matching a user's department with the department responsible for the site. Use of the security measure is also available for determining whether an individual is authorized to create or update any other level in the hierarchy as well. For example, should a user desire to create a new floor object (as described below), placement tool 116 can require the user to be an authorized facilities planner responsible for creating the initial graphical site hierarchy. The placement tool 116 can also be configured to permit or deny users the ability to use certain functions of the tool. These functions are described below in detail.

2. Selecting a Structure

After a site is selected in step 702, control passes to step 704. In step 704, the user specifies a particular building. Again, this is preferably accomplished by having the user select a particular building that corresponds with the particular site selected from step 702, according to the site hierarchy repository 124. The data are stored in structure table 1010, as shown in FIG. 10D and explained in section X.B.

3. Selecting a Floor

After a building is selected in step 704, control passes to step 706. In step 706, the user selects a particular floor corresponding to the building selected in step 704. Again, this is preferably accomplished by having the user select a floor that corresponds with the particular building selected from step 704, according to the site hierarchy repository 124. The data are specifically stored in floor table 1011, as shown in FIG. 10D and explained in section X.C. Control then passes to step 708.

4. Displaying an Architectural Drawing

In a preferred embodiment, as indicated by step 708, the user is presented with a graphical display of an architectural drawing of the floor that is selected in step 706. The architectural drawing is used as a guide to assist the user with creation of the site hierarchy. Preferably, the CADD software (e.g., Microstation 117) renders the architectural drawing of the floor. For example, in a preferred embodiment, after the user selects a particular floor, placement tool 116 reads the name of the architectural drawing from floor plan drawing file name field 1011e, which is a field of floor table 1011, as described in section X.C.4 and shown in FIG. 10D. Placement tool 116 then directs CADD program 117 to display the architectural drawing corresponding with the name fetched from database 108.

It should be noted, however, that the use of architectural drawings as a guide and backdrop is optional. Users can define the floor, zones, planning units, rows and row segment, as described with reference to the steps below, without the use of an architectural drawing. For example, if the structure is a simple shed for storing telecommunications equipment such as light wave regenerators, the use of an architectural drawing may be unnecessary for a facility planner who desires to create a floor object. However, if the structure is a large brick-and-mortar (e.g., conventional building) facility for storing many rows of computing equipment, a facility planner can find the architectural drawing quite helpful. The architectural drawing can provide the facilities planner with necessary information, including the locations of columns that support the building, fire escapes, air vents, doorways and other entrances, power cables for providing electricity, and HVAC units, etc. The architectural drawing is also useful for the facilities planner for "tracing out" a useable floor space, as explained below.

5. Placing a Floor Object

As step 710 indicates, the user places a floor, which simply means that the user creates the graphical floor object in the site-structure-floor hierarchy. In the preferred embodiment, whether or not the architectural drawing is displayed, the user uses an input device (such as a mouse) to trace out a usable area in the floor space. The user, who is most likely a facilities planner, attempts to maximize the usable floor space to be allocated for placing equipment, while concurrently determining real-life limiting factors, such as the location of power cables for supplying power to the equipment, supplying sufficient ventilation to equipment, and providing ready human access to the equipment with sufficient entrance ways.

When the user traces out the usable space, placement tool 116 directs Microstation CADD 117 to show the floor space to the user graphically. In addition, placement tool 116 stores the traced out floor space in a non-graphical format as a sequence of points in database 108, specifically in floor points table 1012, described in section X.D and shown in FIG. 10D.

Placement tool 116 performs other important functions as well. It directs Microstation CADD 117 to calculate the area of the usable floor space and stores it in database 108, specifically in the area quantity field 1011f, described in section X.C.4 and shown in FIG. 10D. Placement tool 116 also stores the identification of the user and the date the user created the floor object in database 108, as described in section X.C.6 and also shown in FIG. 10D. Placement tool 116 also provides the user the ability to store additional information regarding the floor object or even to change existing information regarding the floor object, including the remaining fields of floor table 1011, as described in section X.C.

6. Placing a Zone Object

As step 712 indicates, the user places a zone (i.e., places a zone object in the site hierarchy), which is the next level in the hierarchy. Zones provide an important functional distinction between classes of equipment, meaning that a facilities planner can restrict a zone to one class of several possible classes of equipment. The classes available are restricted only by the imagination of the facilities planner. In some applications, a facilities planner may provide very narrowly tailored zones such as restrictions between particular pieces of telecommunications equipment, while in other applications a facilities planner can distinguish between widely tailored classes such as between computer racks and pieces of furniture. At this level, the ability of the facilities planner to provide a proper balance between providing a maximum amount of usable floor space and taking into consideration limiting real-life considerations pertaining to the architecture of the building are even more important. As a crude example, if a facilities planner has to place furniture equipment in furniture equipment zones and functioning processors in processor zones, the planner would be concerned with providing adequate power supplies to the latter and not the former. Consequently, the processor zones can be located within adequate reach of power supply cables. The allowed class of equipment is stored in equipment class code field 1013*d* of zone table 1013, which is described in section X.E.4 and shown in FIG. 10D. It should be noted that in a preferred embodiment the class of equipment must be a permitted class, as defined and stored in table 1030 (FIG. 10I); otherwise, the class is not permitted.

As with floor objects, the user traces out zones using placement tool 116, which in turn directs Microstation CADD 117 to display the zones on the display of workstation 104. Placement tool 116 stores the traced out zone space in a non-graphical format as a sequence of points in database 108, specifically in zone points table 1014, described in section X.F and shown in FIG. 10D.

Placement tool 116 directs Microstation CADD 117 to calculate the area of the usable zone space and stores the area in database 108, specifically in the area quantity field 1013*e*, described in section X.E.4 and shown in FIG. 10D. Placement tool 116 stores the identification of the user and the date the user created the zone object in database 108, as described in section X.E.6 and also shown in FIG. 10D. Placement tool 116 also provides the user the ability to store additional information regarding the zone object or even to change existing information regarding the zone object, including the remaining fields of zone table 1013, as described in section X.E.

7. Placing a Planning Unit Object

As step 714 indicates, the user places a planning unit (i.e., places a planning unit object in the hierarchy), which is the next level in the hierarchy. In a preferred embodiment, planning units provide the opportunity for more than one facility planner to place row segments in a given zone. In this embodiment, when a user is in the process of defining rows and placing row segments 308, via the placement tool, other users are prevented from accessing certain portions of site hierarchy repository 124. In particular, when users are defining rows, the site hierarchy level just above the row level must be locked. Thus, a site hierarchy level of planning unit 306 is used between row level 308 and zone level 304. Accordingly, planning unit 306 is locked from other users instead of zone level 304. In this manner, several users can work simultaneously to define row segments 308 within the same zone 304. Planning units are optional, however, and as a result a zone need not contain more than one planning unit.

As with other objects, the user traces out planning units using placement tool 116, which in turn directs Microstation CADD 117 to display the planning units on the display of workstation 104. Placement tool 116 stores the traced out planning unit space in a non-graphical format as a sequence of points in database 108, specifically in the planning unit points table 1016, described in section X.H and shown in FIG. 10E.

Preferably, placement tool 116 is used so that the user can identify the maximum amount of weight a floor can withstand, specifically in the floor load limit quantity field 1015*g*, described in section X.G and shown in FIG. 10E. In this manner, it is possible to prevent floor damage by preventing the placement of equipment weighing more than a given amount in a planning unit. Placement tool 116 directs Microstation CADD 117 to calculate the area of the planning unit and stores it in database 108, specifically in the area quantity field 1015*e*, described in section X.G.4 and shown in FIG. 10E. Placement tool 116 stores the identification of the user and the date the user created the planning unit object in database 108, as described in section X.G.6 and also shown in FIG. 10E. Placement tool 116 also provides the user the ability to store additional information regarding the planning unit object or even to change existing information regarding the planning unit object, including the remaining fields of planning unit table 1015, as described in section X.G.

8. Placing a Row and Row Segment Object

As step 716 indicates, the user places a row in the hierarchy. A row is a designation of a physical row. Rows are not represented graphically, but are instead represented logically (non-graphically). The reason for this is that physical rows may be discontinuous because of physical separations between the row, such as support columns. As described in section X.I and shown in FIG. 10E, placement tool 116 stores in database 108 an identification for the row, a textual name of the row, which can simply be a number, and information relating to who created the row and when the row was created.

The user can place a row segment object, which is the next level in the graphical hierarchy. The row segment, as its name implies, breaks up the physical row into segments so that one or more row segments comprise a physical row.

As with the other objects, the user traces out row segments using placement tool 116, which in turn directs Microstation CADD 117 to display the row segments on the display of workstation 104. Placement tool 116 stores the traced out row segment space in a non-graphical format as a sequence of points in database 108, specifically in the row segment table 1018, described in section X.J and shown in FIG. 10E.

The user can identify, via placement tool 116, the maximum height of equipment placed in a row segment in the height limit quantity field 1018*l*, described in section X.J and shown in FIG. 10E. Placement tool 116 directs Microstation CADD 117 to calculate the length of the row segment and stores it in length quantity field 1018*k*, which is described in section X.J.7. Placement tool 116 also stores the identification of the user and the date the user created the row segment object in database 108, as described in section X.J.9. Placement tool 116 also provides the user the ability to store additional information regarding the row segment object or even to change existing information regarding the row segment object, including the remaining fields of row segment table 1018, as described in section X.J.

9. Placing a Footprint

After the site, structure, floor, zone, planning unit, row and row segments have been established in the hierarchy, the user can place a footprint, which is the union of a piece of physical equipment with floor space. Footprints represent the lowest level of the site hierarchy and provide the greatest level of detail.

Figure 8:
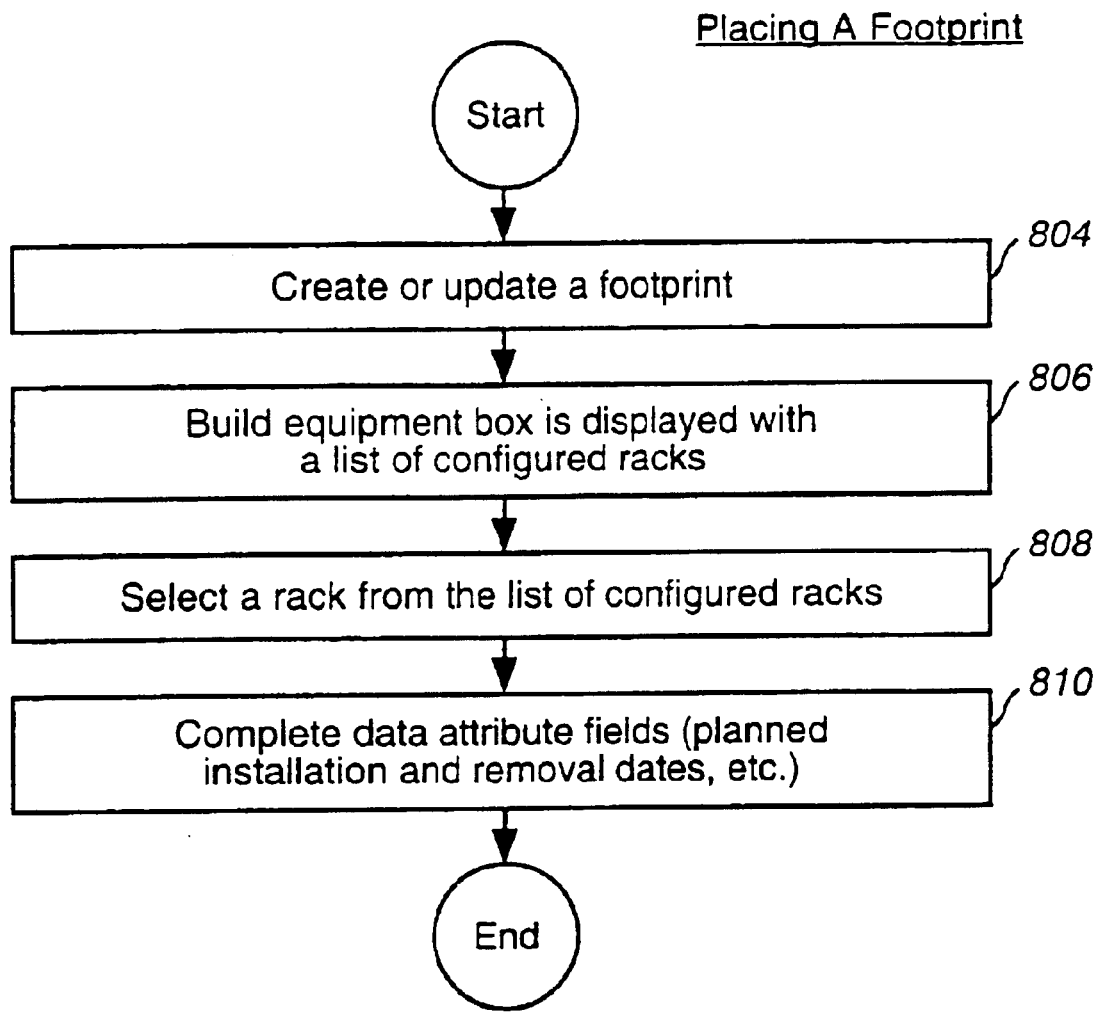
FIG. 8 is a flowchart depicting a process that can be used for uniting an item from the product catalog with a level of the environmental hierarchy to create a footprint, according to a preferred embodiment of the present invention.

FIG. 8 is a flowchart illustrating a process that can be used for placing footprints, according to a preferred embodiment of the present invention. The process begins with step 802. In step 804 the user (1) creates a footprint, if a footprint does not already exist, or alternatively (2) updates a footprint, if a footprint already exists. A user can place either a generic footprint or a specific footprint.

A generic footprint is a placeholder for a footprint that will likely later be designated a specific footprint. A generic footprint is a footprint for a configured rack that has an unspecified manufacturer's identification field. For example, the manufacturer's identification field (found in product catalog table 1019, shown in FIG. 10F) for the configured rack (found in configured rack table 1062, shown in FIG. 10J) can be set to "generic." On the other hand, a specific footprint is a footprint for a configured rack that specifies a valid manufacturer's identification field. U.S. Pat. No. 6,098,050 referenced above provides a detailed discussion of generic and specific footprints.

Placement tool 116 automatically determines the size of the footprint that Microstation 117 is directed to display. As described below in detail, placement tool 116 provides the user a list of configured racks from which to choose. When a user selects a configured rack that is to be placed, placement tool 116 accesses the configured racks table 1062 (FIG. 10J), which in turn accesses other tables (e.g., product catalog table 1019 of FIG. 10F and configured shelves table 1026 in FIG. 10K) to determine the dimensions of the footprint that is to be placed.

If an existing footprint is being updated, most likely by an individual having placement responsibility at a facility, the user can first fetch all of the graphical objects that are higher in level. For example, the user can select a site, followed by a building (or structure), followed by a floor 302, followed by a zone 304, and followed by a planning unit 306. Placement tool 116 also allows the user to bring up all these levels simultaneously when the user performs a "fetch all" function.

Preferably, the user is provided with an option to display particular site hierarchies or all site hierarchies that are defined for a particular floor. In addition, in a preferred embodiment, once the site hierarchies are graphically displayed, the user can directly zoom-in to a particular portion of the graphical representation and select a particular row therein. Accordingly, the steps of selecting a zone and planning unit, as specified above are effectively bypassed using this method. However, many other methods can also be used without departing from the spirit and principle of the present invention.

In any case, once a particular row is identified, control passes to step 806. In step 806 a build equipment pick list is presented to the user. This pick list comprises a list of configured racks 202, as described above with reference to FIG. 5. The configured racks are stored in the configured racks table 1062 in FIG. 10J and are referenced in rack configuration identification field 1061e, which is described in section X.K.5 and shown in FIG. 10G. In addition, as previously described, generic racks can also be displayed in the equipment pick list. The user selects a rack from the list of racks presented in step 806. Preferably, a configured rack can be a rack holding electrical equipment as particularly laid out in FIG. 2 or instead any other physical object, such as a piece of furniture, as will be appreciated by those of ordinary skill. The user is provided great flexibility in how the configured racks fields are filled out in configured racks table 1062.

Next, in step 808, the user places the selected configured rack from step 806 in a particular location within the row selected in step 804. At this point, placement tool 116 stores the identity of the configured rack in the rack configuration identification field 1061e. Again, this is preferably accomplished by directly manipulating a graphical representation of the rack on top of the graphical representation of the selected row segment.

Once the rack is placed in step 808, control passes to step 810. In step 810 the user specifies particular values for attributes that are associated with footprints. As mentioned, the footprint can be a generic footprint or a manufacturer specific footprint. As described in section X.K and shown in FIG. 10G, there are many fields that a user can specify for the equipment occupying the footprint, including how the equipment is configured, the envelope of distances surrounding the equipment, and numerous dates. Examples of important dates are when the facilities planners plan to install the equipment, when an individual responsible for installation plans to install the equipment, the actual installation date, when the equipment will be turned on (for equipment requiring a power supply), when the equipment will be decommissioned, etc. Section X.K provides a detailed explanation of the footprint fields in great detail. The user can also update the values in the footprint fields at any time after the values are initially established. The footprint fields can also be viewed or deleted, as described below in further detail.

E. Fetching Objects

After placement tool 116 has directed Microstation 117 to create graphical objects, these objects are stored as non-graphical data in database 108. Any time a user desires to view a previously created object, the user uses the fetch command to view one or more layers of the hierarchy. For example, after identifying the floor (located at a particular building at a particular site), the user can ask placement tool 116 to fetch the floor object, followed by the zone objects, followed by the planning unit objects, followed by the row segment objects, followed by the footprint objects. Here, the placement tool 116 reads the appropriate tabular representation of graphical points from database 108 and uses Microstation 117 to draw the objects on the workstation output device. In one embodiment, the user uses the "fetch all" function to have the placement tool display all of the graphical objects on a floor. As recognized by those of ordinary skill, placement tool 116 can recall the graphical objects in any order, as desired for an application.

F. Deleting Objects

Placement tool 116 permits the user to quickly and easily delete any graphical object, including floor objects, zone objects, planning unit objects, row segment objects, and footprint objects. Placement tool 116 erases the graphical points from the appropriate points tables in database 108 and provides appropriate commands to Microstation CADD 117 to eliminate the on-screen display of an object for the user. In one embodiment, placement tool 116 can prevent a user from deleting a graphical object if an ancestral graphical object is present. For example, a user can be forbidden from deleting a row segment if a row segment is occupied with footprints.

G. Object Detail

Placement tool 116 permits the user to obtain specific details for any object. As shown throughout section X, there is a tremendous amount of information stored for the objects of the hierarchy (e.g., the hierarchy of site, structure, floor, zone, planning unit, row, row segment, and footprint) in the tables shown in FIGS. 10C–10E, 10G and 10J. Much of this information is in the form of tabular (non-graphical) data, which is not necessarily presented graphically, but can have enormous importance to an organization. For example, a user may desire to view the planned installation date for a piece of equipment occupying a given footprint. When a user selects the object detail function, placement tool 116 can immediately read any desired information from database 108 and use Microstation CADD 117 to output the information to the viewer's display. For the above example, placement tool 116 reads planned installation date 1061n (described in section X.K, and shown in FIG. 10G) and displays the information for the user.

H. Object Locate

Placement tool 116 permits user to quickly and easily locate objects by keying in on specific information stored as tabular information in database 108. For example, placement tool 108 can almost instantaneously allow the user to determine all footprints storing a particular type of equipment, such as an M13 multiplexer. When a user selects the object locate function, placement tool 116 can immediately read any desired information from database 108 and use Microstation CADD 117 to show the graphical objects associated with the desired information on the viewer's display. This information can be provided to the user in a report, using the report generator tool 119 shown in FIG. 1G.

I. Power Plant Associations

Placement tool 116 allows the user to associate a specific source of power, called a power plant, with a footprint. The user can use an input device, such as a mouse, to easily effect the association on the workstation 104. The main portions of the above description of footprint placement refers to the placement of "power consuming footprints," i.e., the placement of footprints of power consuming devices, such as multiplexers, for example. However, placement tool 116 also permits the user to place "power producing" footprints. For example, in one embodiment a describe plant function allows a user to graphically select footprints representing, for example, batteries and rectifiers, for inclusion in a power plant's power producing footprint definition. Since both power producing and power consuming footprints are associated with the power plant definition (plants table 1002 of FIG. 10C), an appropriate power association is established there between.

Plants table 1002 (FIG. 10C) lists the power plants available at a site. Plants table 1002 includes a unique serial number for identification (PLANT_ID), the name of the site associated with the plant (SITE_ID), a name field (PLANT NM_TXT) that stores a plant name (e.g., "battery_1"), the measured load quantity of power (MSRD_LOAD_QTY) and the minimum reserve quantity of power (MIN_RESV_QTY). Placement tool 116 can read these power plant definitions.

Before a connection can be established between a power plant and a footprint, however, it must be determined whether the desired connection is a valid connection. The connection tables shown in FIG. 10L are used make this determination. Connection table 1034 is used to determine the type of connections between the left object and the right object, which are to be connected together, by determining the connection rules. For example, the left object can be the plant, and the right object can be the footprint. Connection rules table 1032, which has a pointer to the left object type (LEFT_OTP_ID) and a pointer to the right object type (RIGHT_OTP_ID), is used in combination with tables 1033, 1035 and 1036 to determine whether the connection type is allowed. Table 1033 describes the types of connections allowed, including for example physical connections such as power, data, and alarm connections, as well as logical connections. The connection rules sub-class table provides subclasses of object types, such as the subclass of battery type plants. In this manner, placement tool 116 provides a mechanism to check whether the connection is valid.

J. Changing Views

Placement tool 116 permits the user to obtain specific information about objects in graphical form as well. Here, placement tool 116 applies a graphical filter to the objects displayed, specifically applying a graphical filter to the non-graphical information stored in database 108. For example, suppose a user is viewing a floor plan and desires to know which footprints will be occupied by M13 multiplexers five years in the future. After using the fetch object command to locate these footprint graphical objects, placement tool 116 can be used to display only these desired footprints. (When the footprint is created, placement tool 116 can, for example, use footprint date fields 1061m–1061y and footprint identification field 1061a to uniquely distinguish M13 multiplexers existing five years in the future by a specific color.) In this manner, placement tool 116 can provide detail on any graphical object in the hierarchy in a graphical format.

K. Other Microstation Functions

For the advanced CADD user, placement tool 116 permits the user direct access to any desired CADD functions, bypassing the more user-friendly functions of the placement tool itself.

IX. Exemplary Implementation of the Invention

The present invention may be implemented using hardware, software or a combination thereof and may be implemented in a computer system or other processing system. In fact, in one embodiment, the invention is directed toward a computer system capable of carrying out the functionality described herein.

Figure 9:
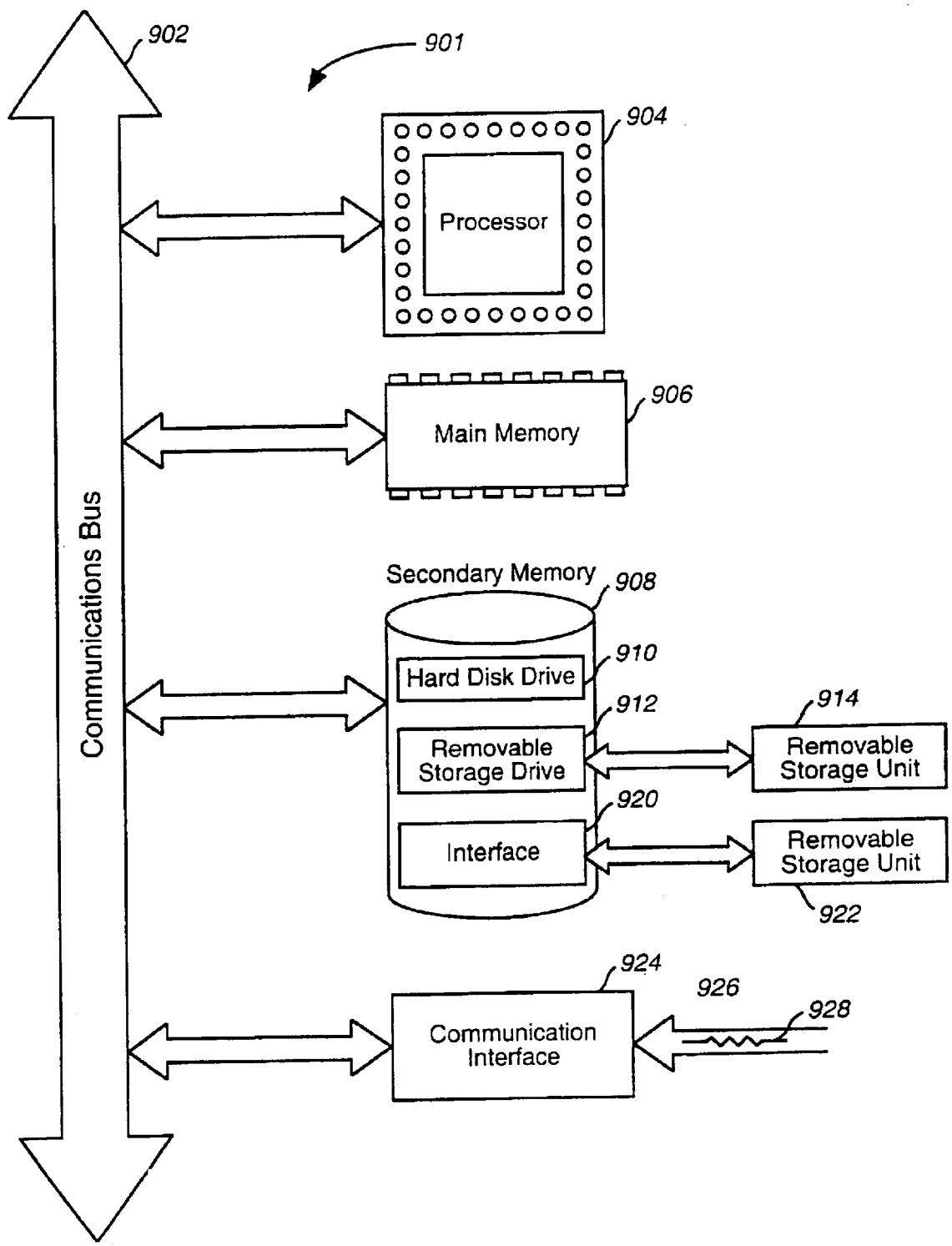
FIG. 9 is a block diagram of a computer useful for implementing components of the present invention.

An exemplary computer system 901 is shown in FIG. 9. The computer system 901 includes one or more processors, such as processor 904. Processor 904 is connected to a communication bus 902. Various software embodiments are described in terms of this exemplary computer system. After reading this description, it will become apparent to a person skilled in the relevant art how to implement the invention using other computer systems and/or computer architectures.

Computer system 902 also includes a main memory 906, preferably random access memory (RAM), and can also include a secondary memory 908. The secondary memory 908 can include, for example, a hard disk drive 910 and/or a removable storage drive 912, representing a floppy disk drive, a magnetic tape drive, an optical disk drive, etc. Removable storage drive 912 reads from and/or writes to a removable storage unit 914 in a well-known manner. Removable storage unit 914 represents a floppy disk, magnetic tape, optical disk, etc., which is read by and written to by removable storage drive 912. As will be appreciated, removable storage unit 914 includes a computer usable storage medium having stored therein computer software and/or data.

In alternative embodiments, secondary memory 908 may include other similar means for allowing computer programs or other instructions to be loaded into computer system 901. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 that allow software and data to be transferred from the removable storage unit 922 to computer system 901.

Computer system 901 can also include a communications interface 924. Communications interface 924 allows software and data to be transferred between computer system 901 and external devices. Examples of communications interface 924 can include a modem, a network interface (such as an Ethernet card), a communications port, a PCMCIA slot and card, etc. Software and data transferred via communications interface 924 are in the form of signals, which can be electronic, electromagnetic, optical or other signals capable of being received by communications interface 924. These signals 926 are provided to communications interface via a channel 928. Channel 928 carries signals 926 and can be implemented using wire or cable, fiber optics, a phone line, a cellular phone link, an RF link and/or other communications channels. In this document, the terms "computer program medium" and "computer usable medium" are used to generally refer to media such as removable storage device 912, a hard disk installed in hard disk drive 910, and signals 926. These computer program products are means for providing software to computer system 901.

Computer programs (also called computer control logic) are stored in main memory and/or secondary memory 908. Computer programs can also be received via communications interface 924. Such computer programs, when executed, enable computer system 901 to perform the features of the present invention as discussed herein. In particular, the computer programs, when executed, enable processor 904 to perform the features of the present invention. Accordingly, such computer programs represent controllers of the computer system 901.

In an embodiment where the invention is implemented using software, the software may be stored in a computer program product and loaded into computer system 901 using removable storage drive 912, hard drive 910 or communications interface 924. The control logic (software), when executed by the processor 904, causes processor 904 to perform the functions of the invention as described herein. In another embodiment, the invention is implemented primarily in hardware using, for example, hardware components such as application specific integrated circuits (ASICs). Implementation of the hardware state machine able to perform the functions described herein will be apparent to persons skilled in the relevant art(s).

In yet other embodiments, the invention may be implemented using a combination of both hardware and software.

X. Detailed View of Environmental Hierarchy

In this section, the layers of an exemplary environmental hierarchy from the site down to the footprint (located in database 108) are described in detail. Database 108 stores non-graphical (logical) data, which are used to interrelate the data tables. These data are also viewable to users in a tabular form. Database 108 also stores graphical data, which is used to illustrate graphically the levels of the hierarchy as shown in FIG. 3.

A. Sites

As depicted in FIG. 10C, site table 1004 represents a site. A site is the physical location (e.g., the Dallas-Fort Worth site) where one or more buildings that store equipment, such as racks, are located. Site designates the highest logical layer in the conceptual framework provided by the exemplary environmental hierarchy. As shown in FIG. 10C, sites have the following associated fields.

1. Site identification 1004a is the unique serial number that identifies a site.
2. Site code 1004b is a 6-character identification for the site.
3. Site type code 1004c is a code that identifies the type of the site, as determined by site type table 1009 (FIG. 10D). These are the valid types of sites that the system will allow for input into site type code 1004c. Information cannot be entered for a site unless it is a valid site. Where there is a direct connection from one table into another table, as here, (e.g., site type code 1004c) the term is referred to as a "foreign key" (FK) into another table.
4. Site name text 1004d is a name for the site, i.e., for colloquial, every day usage (e.g., the "Dallas-Fort Worth site").
5. Site short code 1004e is a three-character site code that provides an alternative method of referring to the site.
6. Responsible department identification 1004f is a 10-character identification that designates a department responsible for the site. In a large organization, different departments of the organization may be responsible for different sites. This field is a foreign key into the responsible department table 1006.
7. Physical address lines 1004g, 1004h, physical city name 1004i, physical zip code 1004j, and physical state code 1004k are fields used to store the complete address of the site. Physical state code 1004k is a foreign key into state table 1008, where valid state codes are stored.
8. Create user identification 1004l, create date 1004m, last update identification 1004n, and last update date 1004o are fields that respectively identify (1) the user that entered the record into the database, (2) the date the user inserted the identification, (3) the last user who updated the record, and (4) the last date the record was updated.
9. Lease code 1004p identifies whether the site is leased or owned by the organization.

B. Structures

As depicted in FIG. 10D, structure table 1010 represents a physical structure, which is also referred to herein as a building or a facility. A facility can be a brick-and-mortar building that houses many different types of equipment, or instead a specialized building, such as a telecommunications shelter. As recognized by those of ordinary skill, the function of the structure is not limited by the invention. Examples of specialized structures in the telecommunications industry are a telecommunications shelter used for light wave regeneration, a multiplexer facility, a termination facility where long distance traffic is switched into local telephone network traffic, or a node information center (NIC) housing mainframe computers. Each site can have one or more structures. As shown in FIG. 10D, structures have the following associated fields.

1. Structure identification 1010a is the unique serial number that identifies a structure.
2. Site identification 1010b is a foreign key back to the parent site associated with the structure. Hence, this field identifies the parent site for the building.
3. Structure name text 1010c and descriptive text 1010d respectively identify and describe the building. Structure name text 1010c is a name associated with the site, i.e., for common usage. For example, at a certain site, there may be a building dedicated for storing radios, a building dedicated for storing generators, and a building dedicated for storing switches, respectively called "radio," "generator," and "switch." Descriptive text 1010d describes the building in greater detail.
4. Create user identification 1010e, create date 1010f, last update identification 1010g, and last update date 1010h are fields that respectively identify (1) the user that entered the record into the database, (2) the date the user inserted the identification, (3) the last user who updated the record, and (4) the last date the record was updated.

C. Floor

As depicted in FIG. 10D, floor table 1011 is a logical representation of the floors within the facility where the equipment is to be placed. Each structure has one or more floors. As shown in FIG. 10D, floors have the following associated fields.

1. Floor identification 1011a is the unique serial number that identifies a floor.
2. Structure identification 1011b is a foreign key back to the parent structure associated with the floor. Hence, this field identifies the parent building for the floor.

3. Floor name text 1011*c* and descriptive text 1011*d* respectively identify and describe the floor. Floor name text 1011*c* is a name associated with the particular floor, i.e., for common usage. Typically, the floor name text 1011*c* identifies the floor by a number. Descriptive text 1011*d* can be used to describe the floor in greater detail.

4. Floor plan drawing file name 1011*a* is the name of an optional architectural (civil) file that governs the physical outlay of the floor. The architectural file is produced by a CADD, such as for example Microstation CADD 117. The architectural file can, for example, represent the locations of fire escapes, physical columns for plumbing, wiring that provide electricity, etc.

5. Area quantity 1011*f* is the area associated with the floor. Placement tool 116 allows a user to use a mouse (or other input device) to graphically trace the layout of the floor. When the floor area is traced out, the CADD software or equivalent device can calculate the area associated with the floor in, for example, square inches, and store the information in this field.

6. Create user identification 1011*h*, create date 1011*i*, last update identification 1011*j*, and last update date 1011*k* are fields that respectively identify (1) the user that entered the record into the database, (2) the date the user inserted the identification, (3) the last user who updated the record, and (4) the last date the record was updated.

D. Floor Points

As depicted in FIG. 10D, floor points table 1012 is where graphical data regarding the floor are stored. A user can use the SiteVu placement tool application 116 to create a floor object. Placement tool 116 sends a command to Microstation 117 to set up a dialog (or session) with the user. Using the mouse or other input device, the user traces out the shape of the object, which Microstation 117 displays on workstation 104. When the user is finished the operation, Microstation 117 informs placement tool 116 that the user has completed making a graphical representation of the object. Placement tool 116 then translates the graphical information into non-graphical information, specifically as tabular point data in the floor points table 1012 in database 108.

When a user later uses the SiteVu placement tool 116 to view a graphical floor object, SiteVu placement tool 116 retrieves non-graphical information (representing the graphical floor objects) from the floor points table 1012 and directs Microstation CADD 117 to draw the floor. As shown in FIG. 10D, floor points have the following associated fields.

1. Floor identification 1012*a* is a 9-digit unique serial number that identifies the floor.

2. Point sequence number 1012*b* is a sequencing number for the points, identifying the order of the sequence of points that make up the floor area.

3. Horizontal coordinate number 1012*c* and vertical coordinate number 1012*d* are the coordinates of each of the points provided by the CADD software 117.

4. Create user identification 1012*f*, create date 1012*g*, last update identification 1012*h*, and last update date 1012*i* are fields that respectively identify (1) the user that entered the record into the database, (2) the date the user inserted the identification, (3) the last user who updated the record, and (4) the last date the record was updated.

E. Zone

As depicted in FIG. 10D, zone table 1013 restricts floor space based on an equipment type, which is also called a class type. For example, if telecommunications switches are identified by the user as an equipment class, then all equipment of the class labeled "telecommunications switch" can be restricted to a "telecommunications switch zone" on the floor. As one of ordinary skill will recognize, zones are limited only by the user's imagination. Examples of zones include collocation zones (where space for equipment owned by other vendors can be leased), furniture zones, multiplexer zones, computer zones, building support (e.g., HVAC) zones, etc. As shown in FIG. 10D, zones have the following associated fields.

1. Zone identification 1013*a* is the unique serial number that identifies a zone.

2. Floor identification 1013*b* is a foreign key back to the parent floor associated with the zone. Hence, this field identifies the parent floor for the zone.

3. Zone name text 1013*c* is a name associated with the zone, i.e., for common usage.

4. Equipment class code 1013*d* is a foreign key into the class table 1030 (FIG. 10I), which identifies the type or class of equipment that can be placed and stored in the zone. For example, a zone can be designated for storage of only switches, only transmission type equipment, only collocation type equipment, or any other type of equipment desired. This feature can be overridden by a user with special access, such as a "superuser." The field makes the zone an intelligent type of container in that a user can predesignate, very specifically, what type of equipment, or more generally, what class of equipment is allowed to be stored within a given zone.

5. Area quantity 1013*e* is the area associated with the zone. Placement tool 116 allows a user to use a mouse (or other input device) to graphically trace the outlay of the zone. When the zone area is traced out, the CADD software or equivalent device can calculate the area associated with the zone in, for example, square inches, and store the information in this field.

6. Create user identification 1013*g*, create date 1013*h*, last update identification 1013*i*, and last update date 1013*j* are fields that respectively identify (1) the user that entered the record into the database, (2) the date the user inserted the identification, (3) the last user who updated the record, and (4) the last date the record was updated.

F. Zone Points

As depicted in FIG. 10D, zone points table 1014 is where graphical data regarding the zone is stored. A user can use the SiteVu placement tool 116 to create a zone object. Placement tool 116 sends a command to Microstation 117 to set up a dialog (or session) with the user. Using the mouse or other input device, the user traces out the shape of the object, which Microstation 117 displays on workstation 104. When the user is finished the operation, Microstation 117 informs placement tool 116 that the user has completed making a graphical representation of the object. Placement tool 116 then translates the graphical information into non-graphical information, specifically as tabular point data in the zone points table 1014 in database 108.

When a user later uses the SiteVu placement tool 116 to view a graphical zone object, SiteVu placement tool 116 retrieves non-graphical information (representing the graphical zone objects) from zone points table 1014 and directs Microstation CADD 117 to draw the zone. As shown in FIG. 10D, zone points have the following associated fields.

1. Zone identification 1014*a* is a 9-digit unique serial number that identifies the zone.

2. Point sequence number 1014b is a sequencing number for the points, identifying the order of the sequence of points that make up the zone area.
3. Horizontal coordinate number 1014c, vertical coordinate number 1014d are the coordinates of the area calculated by the CADD software.
4. Create user identification 1014f, create date 1014g, last update identification 1014h, and last update date 1013i are fields that respectively identify (1) the user that entered the record into the database, (2) the date the user inserted the identification, (3) the last user who updated the record, and (4) the last date the record was updated.

G. Planning Unit

As depicted in FIG. 10E, planning unit table 1015 logically represents a planning unit. Planning units are divisions within a single zone. Planning units allow for multiple individuals to concurrently place rows, as represented graphically by Microstation CADD tool 117, into a single zone. The SiteVu placement tool 116 allows a single planner to work in a single planning unit, thereby locking out other planners from the planning unit. As shown in FIG. 10E, planning units have the following associated fields.

1. Planning unit identification 1015a is the unique serial number that identifies a planning unit.
2. Zone identification 1015b is a foreign key back to the parent zone associated with the planning unit. Hence, this field identifies the parent zone for the planning unit.
3. Planning unit name text 1015c and descriptive text 1015d respectively identify and describe the floor. Planning unit name text 1015c is a name associated with the planning unit, which is a subset of the zone name. Descriptive text 1015d can be used to describe the floor in greater detail.
4. Area quantity 1015e is the area associated with the planning unit, which is determined by placement tool 116.
5. Floor identification 1015f is a foreign key back to the floor associated with the planning unit. Hence, this field identifies the parent floor for the planning unit.
6. Floor load limit quantity 1015g indicates the amount of weight (e.g., per square inch) that the floor can withstand in the planning unit.
7. Create user identification 1015i, create date 1015j, last update identification 1015k, and last update date 1015l are fields that respectively identify (1) the user that entered the record into the database, (2) the date the user inserted the identification, (3) the last user who updated the record, and (4) the last date the record was updated.

H. Planning Unit Points

As depicted in FIG. 10E, planning unit points table 1016 is where graphical data regarding the planning unit are stored. A user can use SiteVu placement tool 116 to create a planning unit object. Placement tool 116 sends a command to Microstation 117 to set up a dialog (or session) with the user. Using the mouse or other input device, the user traces out the shape of the object, which Microstation 117 displays on workstation 104. When the user is finished the operation, Microstation 117 informs placement tool 116 that the user has completed making a graphical representation of the object. Placement tool 116 then translates the graphical information into non-graphical information, specifically as tabular point data in the planning unit points table 1016 in database 108.

When a user later uses SiteVu placement tool 116 to view a graphical planning unit object, SiteVu placement tool 116 retrieves the non-graphical information (representing the graphical planning unit objects) from planning unit points table 1016 and directs Microstation CADD 117 to draw the planning unit. As shown in FIG. 10E, planning unit points have the following associated fields.

1. Planning unit identification 1016a is a 9-digit unique serial number that identifies the planning unit.
2. Point sequence number 1016b is a sequencing number for the points, identifying the order of the sequence of points that make up the planning unit area.
3. Horizontal coordinate number 1016c and vertical coordinate number 1016d are the coordinates of the area calculated by the CADD software.
4. Create user identification 1016f, create date 1016g, last update identification 1016h, and last update date 1016i are fields that respectively identify (1) the user that entered the record into the database, (2) the date the user inserted the identification, (3) the last user who updated the record, and (4) the last date the record was updated.

I. Rows

As depicted in FIG. 10E, rows table 1017 logically represents a physical row where equipment is to be placed. Physical obstructions can make a row discontinuous, meaning that the row can stop at a column (indicated by an architectural diagram), and continue on the other side of the obstruction. For this reason, the row table is a logical (non-graphical) entity, storing information on the row without providing a graphical object. As shown in FIG. 10E, rows have the following associated fields.

1. Row identification 1017a is the unique serial number that identifies a row.
2. Planning unit identification 1017b is a foreign key back to the parent planning unit associated with the row. Hence, this field identifies the parent planning unit for the row.
3. Row name text 1015c is a name associated with the planning unit, i.e., for common usage. The row is typically represented as a number, although it can be identified by a descriptive name, such as the "radio" row, or "switch" row.
4. Create user identification 1017d, create date 1017e, last update identification 1017f, and last update date 1017g are fields that respectively identify (1) the user that entered the record into the database, (2) the date the user inserted the identification, (3) the last user who updated the record, and (4) the last date the record was updated.

J. Row Segments

As depicted in FIG. 10E, rows segments table 1018 represents graphical information for segments of the rows that are logically represented by row table 1017. Row segments are provided so that the floor space in a planning unit can be effectively utilized, despite the presence of physical obstructions (such as columns) indicated by an architectural diagram.

As with floor points table 1012, zone points table 1014, and planning units points table 1016, row segment table 1018 comprises graphical data regarding the row segments. A user can use SiteVu placement tool 116 to create a row segment object. Placement tool 116 sends a command to Microstation 117 to set up a dialog (or session) with the user. Using the mouse or other input device, the user traces out the shape of the object, which Microstation 117 displays on workstation 104. When the user is finished the operation, Microstation 117 informs placement tool 116 that the user has completed making a graphical representation of the object. Placement tool 116 then translates the graphical information into non-graphical information, specifically as tabular point data in row segment table 1018 in database 108.

When a user later uses SiteVu placement tool 116 to view a graphical row segment object, SiteVu placement tool 116 retrieves non-graphical information (representing the graphical row segment objects) from row segment table 1018 and directs Microstation CADD 117 to draw the row segment. As shown in FIG. 10E, row segment points have the following associated fields.

1. Row identification 1018*a* is a foreign key back to the logical parent, which is the row associated with the row segment. Hence, this field identifies the parent row for the row segment.
2. Row segment sequence number 1018*b* uniquely identifies the row segment within the parent row, using a 3-digit serialization quantity.
3. Floor identification 1018*d* is a foreign key back to the floor associated with the ancestor planning unit. Hence, this field identifies the ancestor floor for the row segment.
4. Zone identification 1018*e* is a foreign key back to the ancestor zone associated with the row segment. Hence, this field identifies the ancestor zone for the row segment.
5. Planning unit identification 1018*f* is a foreign key back to the ancestor planning unit associated with the row segment. Hence, this field identifies the ancestor planning unit for the row segment.
6. Start horizontal coordinate number 1018*g*, start vertical coordinate number 1018*h*, end horizontal coordinate number 1018*i*, and end vertical coordinate number 1018*j* are the coordinates of the non-graphical points representing the graphical row segment object to be drawn by the CADD software.
7. Length quantity 1018*k* identifies the length of the row segment.
8. Height limit quantity 1018*l* indicates the greatest possible height of equipment placed in the row segment.
9. Create user identification 1018*m*, create date 1018*n*, last update identification 1018*o*, and last update date 1018*p* are fields that respectively identify (1) the user that entered the record into the database, (2) the date the user inserted the identification, (3) the last user who updated the record, and (4) the last date the record was updated.

K. Footprints

As depicted in FIG. 10G, placement data for racks table 1061 represent footprints both graphically and logically. In the exemplary embodiment, a footprint is the union of a configured rack, which can be an article of manufacture or a piece of equipment, for example, and a space on the floor, specifically a row segment on the floor. Hence, the footprint refers to a space actually occupied by a piece of equipment in the site hierarchy, containing the most specific and abundant information in the hierarchy.

As per the graphical function, as described in section VIII.D.9 (step 804) the footprint graphical object is automatically placed once the user selects a row segment graphical object (or creates a row segment graphical object) and selects a configured rack from database 108. When a user later uses placement tool 116 to retrieve a graphical floor object, placement tool 116 retrieves the appropriate non-graphical information representing the graphical object from database 108 and directs Microstation CADD 117 to draw the footprint object. Logically, the footprint stores a great deal of non-graphical information regarding the equipment placed therein, including relevant dates. Specifically, as shown in FIG. 10G, footprints have the following associated fields.

1. Footprint instance identification 1061*a* is the unique number that identifies a footprint.
2. Row identification 1061*b* is a foreign key back to the parent row associated with the footprint. Hence, this field identifies the parent row for the footprint.
3. Row segment sequence number 1061*c* uniquely identifies the row segment within the parent row. Hence, this field identifies the parent row segment for the footprint.
4. Row segment position code 1061*d* is a name given to the position within the parent row segment within which the footprint resides.
5. Rack configuration identification 1061*e* is a foreign key into configured racks table 1062 (FIG. 10J), which identifies the list of configured racks that are available for placement at the footprint. It should be noted that the configured racks need not be limited to storing modules on shelves, especially where footprints are concerned. For example, a piece of furniture can be stored as a configured rack and have its own footprint. SiteVu placement tool 116 can take a configured rack that has already been built and logically attach it to a footprint in a row segment by placing it in this field.
6. Bayface direction indicator 1061*f* indicates whether the equipment faces the front or the back of the row.
7. Offset quantity 1061*g* is an offset in length from the row segment.
8. Start gap quantity 1061*h*, end gap quantity 1061*i*, and back gap quantity 1061*k* respectively represent the amount of room (in a distance measure) that is to be permitted to the left, to the right, and behind the equipment. This "envelope" provides room for cable, heat dissipation, and other necessities.
9. Back-to-back indicator 1061*j* indicates whether the piece of equipment is back-to-back with another piece of equipment in the same footprint.
10. Anchor point quantity 1061 indicates the length from the front of the row segment that the equipment is to be placed. In some circumstances, the equipment is bolted (affixed) to the floor space at this distance from the front of the row segment.
11. Facilities planned installation date 1061*m* stores the planned installation date when a generic footprint is to be replaced with a specific footprint as described below.
12. Planned installation date 1061*n* stores the date when a configured rack is going to be placed on the floor. When the engineers determine that an actual piece of equipment is to be placed, i.e., a generic footprint is to be replaced with a specific footprint, then this field is stored in the facilities planned installation date field 1061*m*. In other words, at the time, rackface tool 112 replaces the facilities planned installation date field 1061*m* with planned installation date field 1061*n*.
13. Actual installation date 1061*o* is the date that the equipment is actually installed onto the floor.
14. Installation project identification 1061*p* is the work project for which the equipment is installed.
15. Planned activation date 1061*q* is the date when the equipment (i.e., the configured rack) is made functional. For example, for telecommunications equipment, this refers to when traffic flows through the device. For some equipment, this date refers to when the equipment is simply supplied power. For other types of equipment, e.g., a piece of furniture, the equipment is never activated.

16. Actual activation date 1061r is when the equipment is actually turned on.
17. Planned decommission date 1061s is when the equipment is planned to be turned off.
18. Actual decommission date 1061t is when the equipment is actually turned off.
19. Planned removal date 1061u is when the equipment is to be physically removed from the floor.
20. Actual removal date 1061v indicates when the equipment is actually physically removed from the floor, such that the floor space is left open.
21. Removal project identification 1061w is the work project for which the equipment is removed.
22. Create user identification 1061y, create date 1061z, last update identification 1061aa, and last update date 1061bb are fields that respectively identify (1) the user that entered the record into the database, (2) the date the user inserted the identification, (3) the last user who updated the record, and (4) the last date the record was updated.
23. Floor identification 1061cc is a foreign key back to the floor associated with the footprint. Hence, this field identifies the ancestor floor for the footprint.
24. Zone identification 1061dd is a foreign key back to the ancestor zone associated with the footprint. Hence, this field identifies the ancestor zone for the footprint.
25. Planning unit identification 1061ee is a foreign key back to the ancestor planning unit associated with the footprint. Hence, this field identifies the ancestor planning unit for the footprint.

XI. Additional Applications of the Present Invention

The foregoing discussion has principally focused on the application of the present invention to site planning and facilities management in the telecommunications industry. However, as noted above in section I, the present invention is not limited to such applications, but is instead broadly applicable to the management of a collection of physical or virtual items in a modeled environment utilizing a hierarchical conceptual framework. Accordingly, the following discussion elaborates on additional applications of the present invention.

As would be expected, in the following discussion some different terms from those used above in the exemplary telecommunications application are employed to describe the various levels within the hierarchical conceptual framework. In particular, instead of a site hierarchy (i.e., site, building, floor, zone, planning unit, row segment, footprint) and a rack hierarchy (i.e., rack, rail, shelf, component), the hierarchical conceptual framework described below includes elements from an environmental hierarchy (of which a site hierarchy is an example), which the user can utilize to define regions of varying sizes within a physical or virtual environment of interest, and an item hierarchy specifying the hierarchical relationships, if any, that can exist between items from the product catalog that are located within the environment.

As will be appreciated by those skilled in the art, an environmental hierarchy can contain any number of environmental levels ($EL_1$–$EL_M$, where $M \geq 2$) that are deemed necessary or convenient to describe the environment of interest. Thus, when the present invention is applied to differing environments, it is expected that differing numbers of environmental levels may be defined. As discussed above, administrative tool 114 and placement tool 116 may be utilized to create and update information describing the environmental hierarchy. Such data are preferably stored in database 108 in tables, where each table contains graphical and non-graphical data describing a respective level of the environment, as discussed above with respect to the site tables, building tables, floor tables, etc., illustrated in FIGS. 10D–10E.

The item hierarchy can similarly include as many item levels ($IL_1$–$IL_N$, $N \geq 1$) as is deemed necessary or convenient to describe the spatial or logical relationship between items from product catalog 126 that are located within the modeled environment. Each type of item preferably has an associated table within database 108 that records graphical and non-graphical data relevant to that type of item, as discussed above with respect to tables 1020–1023. The user can construct instances of hierarchically configured items utilizing a SiteVu item hierarchy tool, such as the rackface tool 112 described above with reference to FIGS. 1D and 6. The resulting configured items are preferably stored in configuration library 128. As discussed above, after creating items in product catalog 126 and hierarchically configured items in configuration library 128, the user can model the environment of interest by placing one or more items at the highest level of the item hierarchy $IL_1$ at specified locations within the regions defined at the lowest level of the environmental hierarchy $EL_M$.

Given this introduction, several additional applications of the present invention will now be presented.

A. Retail Store

The SiteVu software of the present invention can advantageously be applied to the design and management of a retail store, such as department store or grocery store. In such an embodiment, the environmental hierarchy may be implemented as a site hierarchy similar to that utilized in telecommunications applications. For example, in a department store application, the highest environmental level $EL_1$ may be defined as the building or portion of the building occupied by the department store. Successive environmental levels $EL_2$–$EL_5$ may be defined as floors, departments (e.g., misses, juniors, sportswear, women's shoes, men's suits, housewares, etc.), planning units (e.g., in which goods may be grouped by manufacturer or type), and footprints (e.g., that contain display fixtures, counters, etc.).

The items populating product catalog 126 that may be placed in the environment can include both items for sale (i.e., retail goods such as clothing, housewares, furniture, etc.) and items not for sale (e.g., store fixtures, HVAC equipment and ducting, power cables and equipment, cash registers, dollies, etc.). The number of levels of item hierarchy associated with each type of item in product catalog 126 can be independently defined. Examples of items having multiple hierarchical layers (and therefore having entries in configuration library 128) include a suit ($IL_1$), which at a second level of item hierarchy ($IL_2$) may include a coat, a vest and a pair of trousers, or a counter ($IL_1$), which at one or more lower levels of the item hierarchy may include a display case for goods, a cash register, a machine to remove security tags, etc. As described above, items at $IL_1$, the highest level of the item hierarchy, can be united with a footprint (i.e., the lowest level in the environmental hierarchy) utilizing placement tool 116.

Thus, as discussed above, after constructing the environmental hierarchy, product catalog 126, and configuration library 128, a user is able to add items from product catalog 126 and configuration library 128 to particular locations within the environment modeled by the environmental hierarchy to create a graphical and intuitive view of an actual or proposed arrangement of items within the retail store. As described above in section X, each of the elements from the environmental hierarchy and items from product catalog 126 and configuration library 128 placed within the modeled environment have associated graphical and non-graphical data that can be created, stored in database 108, modified, and viewed by the user. These data describe various characteristics of interest that can be utilized not only for site planning and management, but also, by tracking the placement and movement of merchandise, for inventory control, loss management, sales forecasting, and profit optimization, among other uses.

For example, if an HVAC unit is one of the items placed within a modeled retail environment, the associated table in database 108 can be utilized to track installation, repair and planned replacement dates, power requirements, thermal capacity, efficiency rating, operating costs, etc. This information could be used, for example, by a building superintendent to accurately forecast maintenance and operating costs or to schedule selective maintenance and/or replacement of equipment. On the other hand, for items in the modeled environment that represent retail merchandise, the associated data in database 108 may specify a wholesale cost, projected profit margin, actual sale price, date of display, date of sale, associated footprint at time of sale, total number of units, etc. A store manager can periodically utilize report generator 119 or the graphical view filtering described above in section VIII.J to identify how well goods are selling (e.g., to determine a need to cancel orders or order additional merchandise), determine which locations and presentations of goods result in highest gross sales or profit, calculate total profit per square foot, improve loss control, etc.

To facilitate entry of data describing an environment and the placement of items within the environment, it is advantageous to employ automation to avoid manually entering each piece of data utilizing a keyboard or mouse of a workstation 104. In one preferred embodiment, such automation may be provided by a handheld scanner, such as that described in U.S. Pat. No. 5,959,275, which is incorporated herein by reference. Using such a scanner, which may communicate with the SiteVu tool running on exemplary computer system 901 via a wireless communication interface 924, the user may first specify a particular footprint by scanning a corresponding barcode either printed in a hardcopy printout of the floor layout or physically affixed to a display (e.g., hanging rack or shelving system) occupying that footprint. The user can then enter data specifying which goods are located within the specified footprint (or being added to the footprint from a stock room) by scanning the SKU barcodes typically utilized to identify goods. In this manner, a user can quickly perform the necessary data entry without engaging in the tedious task of manually keying in (or using a pointing device to enter) all of the information.

Also, as customers select goods off the floor for purchase, a scanner is often utilized as an input device to enter into a cash register the SKU barcode identifying the item being sold. This product identification information, which identifies an item being removed from a footprint, can also be provided to the SiteVu software to automatically update database 108 by removing one of the items having that SKU barcode from the modeled environment. In this manner, a real-time view of the goods presented for sale on the floor of the retail store (as well as goods in stock rooms) may be maintained.

As will be appreciated, this technique of data entry is applicable not only to the entry of data describing a retail environment, but also to the entry of numerous other types of data, as is clear from the descriptions of other applications provided below.

B. Warehouse

SiteVu can similarly be applied to a warehouse environment. A typical warehouse environment may include a plurality of rows of storage units (e.g., pallets, fixed or movable racks, refrigeration units) in which goods are temporarily stored.

In an exemplary warehouse application, the highest environmental level $EL_1$ may be defined as the building or portion of the building occupied by the warehouse. Successive environmental levels $EL_2$–$EL_5$ may be defined as floor, zone (e.g., perishables, durables, etc.), planning unit (e.g., in which goods may be grouped by manufacturer or type), row segment, and footprint (e.g., of a pallet, movable rack, fixed rack, bin, refrigeration unit, etc.).

As with the retail environment, the items populating product catalog 126 and configuration library 128 that may be placed in the modeled environment can include both warehoused items (e.g., wholesale goods) and warehouse fixtures (e.g., rack units, HVAC equipment and ducting, refrigeration units, power cables and equipment, packaging and loading equipment, etc.). The number of levels in the item hierarchy associated with each type of item can be defined independently. For example, a movable rack unit may be defined at the highest level of the item hierarchy ($IL_1$), with additional levels of item hierarchy ($IL_2$–$IL_4$) being respectively defined by shelves of the rack unit, bins supported by the shelves, and individual goods in the bins. Two layers of item hierarchy, on the other hand, may be utilized to define a pallet of goods: a pallet at $IL_1$ and individual goods at $IL_2$. As described above, items at $IL_1$, the highest level of the item hierarchy, can be united with a footprint (i.e., the lowest level in the environmental hierarchy) utilizing placement tool 116.

As discussed above, after constructing the environmental hierarchy, product catalog 126, and configuration library 128, a user is able to add items from product catalog 126 and configured items from configuration library 128 to particular locations within the modeled warehouse environment (optionally utilizing the scanning technology discussed above) to create a graphical view and associated database representation of an actual or proposed arrangement of a collection of items within the warehouse. The data within database 108 have a number of different uses for warehouse management in addition to site planning. For example, the data within database 108 and the graphical representation thereof can be utilized by humans or robots to identify a location in the warehouse at which to stock incoming items or remove outgoing items while maintaining a real-time inventory of the warehouse. In addition, database 108 may store in association with each warehoused item a date-in and a date-out, which together indicate duration of storage. This information may be utilized to fairly attribute warehousing fees to particular suppliers or retailers.

A specialized "warehouse" environment in which SiteVu may be utilized is a library. A library, at least conceptually, is an information warehouse of an inventory including books, periodicals, microfiche, electronic data, etc. Utilizing the techniques outlined above, SiteVu may be utilized to track the location of inventory lent to subscribers or other institutions, calculate and record fines, manage periodical subscriptions, plan floor layouts (e.g., to avoid exceeding the loading limits of shelving units or floors), record sources of rare materials, and many other uses. SiteVu may similarly be applied to other specialized "warehouse" environments such as police impound and towing yards for holding automobiles.

C. Offshore Platform

Another environment to which the SiteVu tool of the present invention may advantageously be applied is an offshore drilling or production platform. On offshore platforms, space is at a premium; accordingly, the SiteVu tool of the present invention can be utilized to perform both "floor" planning and vertical space planning (as well as many other functions) utilizing the principles set forth above.

The environmental hierarchy in platform applications can have at $EL_1$ the platform itself, with various types of platforms (e.g., fixed, floating, jack-up, etc.) being selectable from a picklist. Lower levels of the environmental hierarchy (i.e., $EL_2$–$EL_M$) can be defined as decks, bays, zones, row segments, footprints, etc., as is convenient. The items defined in product catalog 126 that can be placed in the modeled environment can include permanent and semi-permanent fixtures, such as generators and motors, a control room, living quarters, galley, piping, compressors, separators, etc., as well as movable equipment such as drill pipe, drill bits, down hole tools, drill rigs, work over equipment, etc.

The data in database 108 associated with the items from product catalog 126 that are placed within the modeled environment can be utilized in a number of ways. First, as noted above, the data may be utilized for floor and vertical space planning and design. Second, equipment managers can track scheduling and availability data for movable equipment such as downhole tools, workover equipment, platform rigs, test separators, and so on. The scheduling data for movable equipment may include, for example, request date, planned use date(s), in use indication, expected date of completion, and cumulative time in service. Third, for movable equipment as well as more permanent fixtures, it may also be helpful to track scheduling and completion of preventive maintenance and servicing (e.g., for separators, valves, motors and power generators) or safety inspections (e.g., ultrasonic testing of pipes for wall thickness). Fourth, data maintained in database 108 can be utilized to track dimensions of both movable and non-movable equipment placed in the modeled platform such as drill pipe, conductors on the production deck through which drilling is performed, tubing, casing, etc. This dimensional data can be accessed, for example, by on-shore drilling engineers to determine whether equipment required for upcoming procedures is available on the platform.

As will be appreciated from the foregoing, SiteVu has similar applicability to petroleum refineries, chemical processing plants, oil field services organizations and the like.

D. Manufacturing, Processing, and Power Plants

SiteVu can also be advantageously applied to the design, planning, and operation of manufacturing plants (e.g., aircraft or automobile), processing plants (e.g., ore, food or beverage processing) and power generation and transmission plants. In such environments, as with many of the other applications of SiteVu, optimization of the placement of tools, equipment and parts in the finite amount of available space in the plant environment is an important advantage of the present invention. As described above, SiteVu database 108 can also be utilized to conveniently record and display information about plant infrastructure and production equipment such as installation date, service and maintenance scheduling and history, scheduled replacement date, equipment sizes and capacities, etc. This information can be utilized, for example, not only by maintenance and engineering personnel, but also by financial and accounting personnel needing to compute depreciation on fixed assets, cost estimation, etc.

In addition, SiteVu can be utilized to track the incorporation of component parts into an assembled product. For example, in the context of aircraft manufacturer, multiple aircraft are typically in production concurrently. Each of these aircraft can be represented in configuration library 128 of SiteVu database 108 by a corresponding "generic" aircraft object at the highest level of the item hierarchy ($IL_1$) that can be placed at a particular footprint on the production floor. Similarly, generic objects representing other important components such as wings, engines, tails, avionics, etc., can be placed at other footprints at which these major components are pre-assembled. Then, as each component occupying a lower level of the item hierarchy (i.e., $IL_2$–$IL_N$) is assembled with a component at a higher level of the item hierarchy (i.e., $IL_1$–$IL_{N-1}$), details regarding the component and its installation can be tracked in SiteVu database 108.

For example, a wing, which may be defined as an item at item hierarchy level $IL_2$, may have a number of component systems, such as engines, flaps, lights and deicers, modeled at lower levels of the item hierarchy. As these components are added to the wing, a wing table within database 108 can be linked via pointers (referred to above as a "foreign keys") to other tables in database 108 that each describe a respective one of the installed components. Each of the tables representing a component can detail such information as the manufacturer, assembly information (e.g., planned assembly date, actual assembly date, employee ID of assembler), and quality control verification. Thus, with SiteVu a user can readily obtain very detailed information about an assembled or partially assembled aircraft by selecting graphical objects representing various components of interest, which causes SiteVu to display non-graphical data associated with the objects, as detailed above. In addition, by requesting reports summarizing actual and planned assembly dates from report generator 119, a project manager can readily detect, project and address production delays on the aircraft assembly or portions thereof.

E. Construction

As will be appreciated upon reference to the foregoing description of the application of SiteVu to manufacturing, SiteVu can also be applied to the design, planning, and construction of buildings and other structures (e.g., office complexes, malls, bridges, dams, hospitals, airports, housing developments, spacecraft, etc.).

In construction applications, it is typical that the highest level of the environmental hierarchy ($EL_1$) represents the parcel of land on which construction will occur, the second level of the environmental hierarchy ($EL_2$) represents various subdivisions of the parcel, the third level $EL_3$ represents construction site(s) within the subdivisions, and so on until the lowest level of the environmental hierarchy ($EL_M$) is reached. As noted above, electronic data files, such as CADD files containing architectural drawings and electronic governmental deed records, can be utilized to provide graphical and non-graphical data to the SiteVu tool to facilitate accurate development of the environmental hierarchy. Importantly, the tabular data within database 108 associated with the various objects in the environmental hierarchy can include not only dimensional information (e.g., a legal description of the parcel and/or dimensions of buildings), but also additional information, such as the location of easements and utilities, applicable building codes (e.g., setback requirements), and environmental protection information (e.g., required protective measures, use restrictions, and required remediation). In this manner, a user can determine all information relevant to the construction site through an intuitive graphical interface.

The items defined in product catalog 126 and configuration library 128 can represent construction equipment (e.g., bulldozers, cranes, on-site trailers, etc.) and construction materials (e.g., rebar, masonry, bridge supports, HVAC equipment, building fixtures, landscape plants and materials, etc.), as well as one or more structures to be constructed and their component parts. For example, a building may be defined as one of the items at the highest level in the item hierarchy ($IL_1$) that can be united with the lowest level of the environmental hierarchy ($EL_M$). Successively lower levels of the item hierarchy can be utilized to represent building wings, floors, suites, rooms, fixtures, etc. The tabular data in database 108 associated with these items can include dimensions, weight/mass, projected construction/installation date, man-hours or hours required to perform construction/installation, cost, and other information of interest.

With the SiteVu tool applied in this manner, a construction firm can not only prepare a detailed proposal for a construction project that includes cost, time, staffing and materials estimates, but also can track construction progress and scheduling as described above with respect to the manufacturing environment. In this manner, the construction management firm can anticipate delays, improve scheduling of subcontractors and materials delivery, verify that loading limitations are not exceeded by requesting appropriate reports from report generator 119, track damaged goods and equipment, record change orders, and perform many other useful functions utilizing a single software tool.

F. Staffing and Provisioning

In some environments to which SiteVu is applicable, staffing and provisioning are important concerns. For example, in a health care facility or amusement park, it may be crucial for safety or efficient operation that different locations within the facility have appropriate equipment or provisions and/or appropriate staffing.

SiteVu can be applied to such environments to ensure adequate provisioning and/or staffing. For example, to efficiently provision a new hospital (the construction of which may be managed utilizing SiteVu as discussed above), certain equipment and/or personnel may be associated with selected levels of the environmental or item hierarchy. Assume that hospital policy (or government regulation) requires that each floor be equipped with two external cardiac defibrillators, each patient room have a thermometer and sphygmomanometer, and that the cardiac care unit (CCU) be staffed with at least ten nurses. If, for instance, successively lower levels of the environmental or item hierarchy describing the hospital are utilized to represent a building, wing, floor, unit, and room, a user can utilize placement tool 116 to place at least two objects representing cardiac defibrillators within one or more rooms of each floor and to place thermometers and sphygmomanometer in each room designated by an attribute in database 108 as a patient room. The tabular data within database 108 associated with each of these objects preferably has a "present" field indicating whether or not the item is inventoried as being physically present at the designated location. In this manner, a report by report generator 119 or graphical view based upon the value of the "present" field can be generated to ascertain the additional equipment needed, if any. Of course, as equipment is moved or removed, database 108 is preferably updated so that an accurate picture of available equipment is given.

Staffing levels may similarly be managed by defining personnel as objects within product catalog 126 and placing graphical objects representing personnel at appropriate locations within the modeled environment. Staffing levels can be monitored in real time by providing inputs to SiteVu from an electronic time stamp system to monitor the arrival and departure of employees. In addition, prospective staffing levels may be projected through defining calendaring fields in the tables within database 108 associated with each personnel object. The calendaring fields can specify each date (and, if appropriate, hours) for which a person is needed at the associated location and the employee name(s) or ID(s) scheduled to staff each such date. Thus, an employer can ensure adequate staffing (and project hiring needs) by recording in the calendaring fields in database 108 the work schedules of employees assigned to the various staff positions. This is particularly useful in situations in which multiple part-time or seasonal employees are utilized to fill individual staff positions.

G. Waste Removal

In remediation of hazardous waste sites, such as Superfund cleanup sites, offshore oil spills, or buildings having asbestos tiles, the cleanup process typically entails developing a cleanup strategy for the site and then tracking progress as waste is removed and remediation activities are performed. SiteVu is an ideal tool for both development of a cleanup strategy and tracking removal or cleanup of hazardous waste.

When SiteVu is applied to hazardous waste removal, the environmental hierarchy may be implemented as a site hierarchy similar to that utilized in telecommunications applications. For example, the highest environmental level $EL_1$ may be defined to represent a cleanup site, and the second highest environment level $EL_2$ may be utilized to define equal area tracts of land, which may conveniently be arranged in a grid. Lower levels of the environmental hierarchy $EL_3$–$EL_M$ may be utilized to represent specific treatment areas in the tracts. Of course, if the hazardous waste site includes buildings or other structures, natural subdivisions of the structures (e.g., floor, room, etc.) may also be defined in the environmental hierarchy.

The items populating product catalog 126 that may be placed in the modeled environment can include waste to be removed (e.g., crude oil, lead-acid batteries, asbestos or contaminated soil) and equipment (e.g., earth moving machinery) or personnel utilized to perform the waste removal. As described above, items at $IL_1$, the highest level of the item hierarchy, can be united with the lowest level of the environmental hierarchy utilizing placement tool 116.

As described above, each of the levels of the environmental hierarchy and items from product catalog 126 placed within the modeled environment have associated graphical and non-graphical data that can be created, stored in database 108, modified, and viewed by the user. These data describe various characteristics of interest such as the type of waste, associated safety precautions, governmental regulations governing the handling and disposal of the waste, waste removal date, remediation measures, and estimated removal time. By requesting reports from report generator 119 and/or filtered graphical views based upon selected data within database 108, a logical waste removal plan including cost and time estimates can be developed, and progress toward remediation can be tracked.

H. Agriculture/Logging

SiteVu can also be utilized to great advantage in the management of resources such as farmland, crops, timber, and livestock. In such applications, the levels in the environmental hierarchy can be utilized, for example, to represent a regional operation (e.g., the north Texas operation) at $EL_1$, various tracts of land belonging to the regional operation at $EL_2$, and footprints of plantings or structures (e.g., barns, silos, etc.) within the tracts at $EL_3$. The tabular data within database 108 associated with the various levels of the environmental hierarchy can indicate legal descriptions of the property, whether the property is leased or owned, rents (if leased), previous yields (e.g., bushels, board-feet, or pounds of meat per acre), current and previous usage (e.g., type of planting and number of years planted, type of livestock and duration of grazing, etc.), land use incentives (e.g., tax and subsidy information) and other pertinent information.

As will be appreciated, the items in product catalog 126 that may be graphically placed in the environment modeled utilizing the environmental hierarchy can include standing or harvested crops, livestock, farming equipment (e.g., trucks, combines, tractors, etc.), and structures (e.g., silos, barns, sheds, living quarters and processing facilities), among others. The tabular data within database 108 associated with the items in the item hierarchy can include total and current capacities of storage facilities, current and prospective estimated sale price per unit for crops and livestock, maintenance, price and ownership information for farming equipment, and descriptions and schedules of prior and planned cultivation and processing regimens (e.g., the use of fertilizers, insecticides, inoculations, feed supplementation, cutting undergrowth from managed forests, etc.).

Through appropriate use of report generator 119 to generate reports from database 108, a user can determine optimum times to harvest and sell crops based upon the availability of storage and projected pricing, ensure that crop and grazing rotation plans are followed, analyze yields based on location and/or cultivation regimen, manage use of storage facilities, manage expense and servicing of equipment, etc.

I. Community and Regional Planning

SiteVu may also be utilized in the development, implementation and management of community and regional plans and infrastructure. In community and regional planning (CRP), a governmental entity, for example, a city council or a county commissioner's court, is often tasked with developing and implementing a "smart growth" plan to ensure that future growth is directed in a way that enhances (or at least does not diminish) the quality of life of the community and does not outstrip the growth of infrastructure (e.g., roadways, utilities, public recreation areas, public transportation, school, etc.). Utilizing the techniques outlined above, SiteVu can simplify these tasks.

As an example, an environmental hierarchy can be defined that has as its highest level $(EL_1)$ a geographic region (e.g., a state, county or city) for which a plan is to be developed and has at lower levels $(EL_2-EL_M)$ logical or governmental subdivisions of the larger geographic region. Each of these levels of the environmental hierarchy preferably has associated tabular and graphical data within database 108, which may include legal or geographic descriptions, area, current and/or planned uses, current and/or planned development restrictions (e.g., zoning or environmental restrictions), ownership, tax valuation (if privately held), estimated fair market value for purposes of condemnation and so on.

Items from product catalog 126 that may be graphically and logically placed within areas defined at the lowest level of the environmental hierarchy $(EL_M)$ can represent utilities and the like (e.g., telephone and data cables, gas, water, sewer and power lines, etc.), transportation infrastructure (e.g., sidewalks, bike paths, roadways, rail lines and airports), residential and commercial zones, public parks, schools, cultural centers, government buildings, hospitals, etc. SiteVu database 108 can be utilized to store and display a myriad of useful data associated with these items. Such data may include whether an item presently exists or is planned, planned installation dates, code and zoning compliance for items representing structures, planned and past maintenance dates for utility lines, whether an item complies with a planned use, ownership, distances from city centers, airports, nearest similar item or other locations of interest, etc.

Because SiteVu provides a conceptual framework in which all these data can be logically arranged, viewed (especially on a time-dependent basis), and easily updated, SiteVu is an ideal tool for CRP applications.

J. Data Networks

SiteVu may also be advantageously applied to the design, modeling and maintenance of data networks, including data storage environments. Much like the telecommunications application discussed above, SiteVu can be utilized for space planning and the placement of equipment (e.g., servers, network equipment such as routers and bridges, network interface cards, or disk farms) in particular physical footprints on a floorplan or as components of items so placed. In addition, SiteVu can be utilized to graphically place particular data (e.g., executable software such as SiteVu components 110, 112, 114 and 116 or a database such as database 108), logical drives, and the like within equipment connected to the network. Thus, with SiteVu, a network administrator can easily create, view and modify a model of not only the physical components of the network, but also data and software constructs within the network.

L. Virtual Reality

As a final note, those skilled in the art will appreciate from the foregoing that SiteVu is not limited in application to the modeling of physical environments, but also is also applicable to modeling the two or three-dimensional virtual reality environments and virtual objects located therein. By employing such modeling, for example, in a gaming or simulation context, the effects of time and other variables on items in the virtual environment can be easily and accurately depicted.

For example, in a gaming context, an environmental hierarchy can be defined that has at its highest level $(EL_1)$ an environment representing a simulated structure (e.g., as utilized in many "first person" adventure games) or a simulated geographic region (e.g., as utilized in many role-playing and societal simulation games). Depending upon the type of game, lower levels of the environmental hierarchy $(EL_2-EL_M)$ may be utilized to represent structures, floors of a structure, rooms in a structure, and footprints at which simulated objects may be placed. The items populating product catalog 126 and configuration library 128 that may be placed in the model environment of a "first person" game include articles that may be retrieved by the game's protagonist, pre-programmed opponents of the protagonist, hazards to the protagonist, etc.

Alternatively, in a simulation context, the highest level $(EL_1)$ of the environmental hierarchy may comprise, for example, a vehicle control station (e.g., aircraft cockpit or automobile dashboard) and the next lower level $EL_2$ may comprise footprints for individual indicators or controls. Accordingly, the simulated items populating product catalog 126 and configuration library 128 that may be placed in the model environment may include steering and other controls as well gauges and other indicators.

As described above, SiteVu database 108 can be utilized to organize and store useful data associated with the items placed within the modeled enviromnent. For example, the data associated with hazards, opponent, and other items placed within the modeled environment for a "first person" game can indicate the effect of the items on the protagonist's "health" or abilities. Alternatively, for a simulation, the data may include a life cycle and/or cost of a component, so that equipment failure and expense over time can be realistically modeled and trainee response to failures and other problem situations can be assessed.

XII. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of modeling an environment containing a collection of items, said method comprising:
   providing an environmental hierarchy describing a modeled environment;
   providing a product catalog that includes data describing a plurality of items that may be utilized to populate the modeled environment;
   providing a configuration library that includes data describing a spatial relationship between first and second items among said plurality of items in said product catalog; and
   permitting population of said modeled environment by storing, in a database, data representative of the spatial relationship between said environmental hierarchy and a collection of items including said first item.

2. The method of claim 1, wherein said step of providing a product catalog comprises specifying values for attributes associated with said plurality of items and storing said values in said product catalog.

3. The method of claim 2, wherein said step of providing a product catalog comprises permitting a user to define at least one of said attributes.

4. The method of claim 2, wherein said step of providing a configuration library comprises selecting said first and second items from said product catalog, specifying said spatial relationship between said first and second items in which said second item is within an area defined by said first item, and storing an indication of said spatial relationship in said configuration library.

5. The method of claim 1, wherein providing said environmental hierarchy comprises providing an environmental hierarchy including at least higher and lower levels each having an associated dataset describing a respective one of first and second regions, wherein the second region is within the first region.

6. The method of claim 5, wherein at least one of said higher level and said lower level represents an area of land.

7. The method of claim 6, wherein said area of land comprises one of a construction site, hazardous waste site, and agricultural site.

8. The method of claim 6, wherein said area of land comprises a jurisdiction of a governmental entity.

9. The method of claim 5, wherein at least one of said higher level and said lower level represents at least a portion of a structure.

10. The method of claim 9, wherein said structure comprises one of a retail sales facility and a warehouse facility.

11. The method of claim 9, wherein said structure comprises one of a manufacturing facility, a processing facility, and a production facility.

12. The method of claim 9, wherein said structure comprises a structure under construction.

13. The method of claim 1, wherein providing a product catalog comprises storing non-graphical data describing one or more attributes of said plurality of items and graphical data specifying a graphical representation of at least one of said plurality of items.

14. The method of claim 13, wherein at least one of said one or more attributes is time-dependent.

15. The method of claim 1, and further comprising displaying within a display of a data processing system a graphical representation of said modeled environment, said graphical representation including at least a first graphical object representing said first item and at least a second graphical object representing said environmental hierarchy.

16. The method of claim 15, wherein displaying comprises displaying a graphical object representing fewer than all items in said collection of items populating said modeled environment.

17. The method of claim 1, wherein permitting population of said modeled environment comprises allowing entry of at least a portion of said data representative of the spatial relationship utilizing a scanner.

18. The method of claim 1, wherein providing a product catalog comprises storing non-graphical data describing one or more attributes of said plurality of items and graphical data specifying a graphical representation of at least one of said plurality of items.

19. The method of claim 1, wherein:
   said modeled environment comprises a retail environment;
   said product catalog includes data describing at least one item for sale; and
   said method further comprises permitting removal of said item for sale from said modeled environment by removing data representative of a spatial relationship between said at least one item for sale and said environmental hierarchy or another item in said product catalog.

20. The method of claim 19, and further comprising permitting generation of a report reflecting correlation of sales of items with subsets of said modeled environment for which spatial relationships with said items have been defined.

21. The method of claim 1, wherein at least one item in said product catalog represents a human belonging to an organization, wherein providing a product catalog includes associating said item representing a human with a calendaring attribute representing a schedule of the human.

22. The method of claim 1, wherein said modeled environment comprises a data network and providing a product catalog comprises providing a product catalog including at least one item representing a dataset.

23. The method of claim 2, wherein at least one attribute associated with a particular item among said plurality of items comprises a procedure attribute, and an attribute value of said procedure attribute tracks performance of a procedure associated with the particular item.

24. The method of claim 14, and further comprising permitting generation of a time-dependent view of items from said product catalog populating said modeled environment.

25. A data processing system, comprising:
a processor;
data storage coupled to the processor;
a modeling tool stored in said data storage and executable by said processor,
said modeling tool including:
   means for creating an environmental hierarchy describing a modeled environment;
   means for creating a product catalog for containing data describing a plurality of items that may be utilized to populate the modeled environment;
   means for creating a configuration library for containing data describing a spatial relationship between first and second items among said plurality of items in said product catalog; and
   means for populating said modeled environment by storing, in a database, data representative of the spatial relationship between said environmental hierarchy and a collection of items including said first item.

26. The data processing system of claim 25, wherein said means for creating a product catalog comprises means for specifying values for attributes associated with said plurality of items and storing said values in said product catalog.

27. The data processing system of claim 26, wherein said means for creating comprises means for permitting a user to define at least one of said attributes.

28. The data processing system of claim 26, wherein said means for creating a configuration library comprises:
   means for selecting said first and second items from said product catalog;
   means for specifying said spatial relationship between said first and second items in which said second item is within an area defined by said first item; and
   means for storing an indication of said spatial relationship in said configuration library.

29. The data processing system of claim 25, wherein said means for creating said environmental hierarchy comprises means for creating an environmental hierarchy including at least higher and lower levels each having an associated dataset describing a respective one of first and second regions, wherein the second region is within the first region.

30. The data processing system of claim 29, wherein at least one of said higher level and said lower level represents an area of land.

31. The data processing system of claim 30, wherein said area of land comprises one of a construction site, hazardous waste site, and agricultural site.

32. The data processing system of claim 30, wherein said area of land comprises a jurisdiction of a governmental entity.

33. The data processing system of claim 29, wherein at least one of said higher level and said lower level represents at least a portion of a structure.

34. The data processing system of claim 33 wherein said structure comprises one of a retail sales facility and a warehouse facility.

35. The data processing system of claim 33, wherein said structure comprises one of a manufacturing facility, a processing facility, and a production facility.

36. The data processing system of claim 33, wherein said structure comprises a structure under construction.

37. The data processing system of claim 25, wherein said means for creating a product catalog comprises means for storing non-graphical data describing one or more attributes of said plurality of items and graphical data specifying a graphical representation of at least one of said plurality of items.

38. The data processing system of claim 37, wherein at least one of said one or more attributes is time-dependent.

39. The data processing system of claim 25, and further comprising:
a display; and
means for displaying within the display a graphical representation of said modeled environment, said graphical representation including at least a first graphical object representing said first item and at least a second graphical object representing said environmental hierarchy.

40. The data processing system of claim 39, wherein said means for displaying comprises means for displaying graphical object representing fewer than all items in said collection of items populating said modeled environment.

41. The data processing system of claim 25, wherein said means for populating comprises means for receiving from a scanner and entering into the database at least a portion of said data representative of the spatial relationship.

42. The data processing system of claim 25, wherein:
said modeled environment comprises a retail environment;
said product catalog includes data describing at least one item for sale; and
said modeling tool further comprising means for removing said item for sale from said modeled environment by removing data representative of a spatial relationship between said at least one item for sale and said environmental hierarchy or another item in said product catalog.

43. The data processing system of claim 42, said modeling tool further comprising means for generating a report reflecting correlation of sales of items with subsets of said modeled environment for which spatial relationships with said items have been defined.

44. The data processing system of claim 25, wherein said means for creating a product catalog comprises means for creating a product catalog including at least one human item representing a human belonging to an organization, said human item having a calendaring attribute representing a schedule of the human.

45. The data processing system of claim 25, wherein said means for creating a product catalog comprises means for creating a product catalog representing a data network, said product catalog including at least one item representing a dataset.

46. The data processing system of claim 26, wherein at least one attribute associated with a particular item among said plurality of items comprises a procedure attribute, and an attribute value of said procedure attribute tracks performance of a procedure associated with the particular item.

47. The data processing system of claim 38, said modeling tool further comprising means for generating of a time-dependent view of items from said product catalog populating said modeled environment.

48. A program product, comprising:
a computer usable medium; and
a modeling tool encoded within said computer usable medium and executable by a computer system, said modeling tool including:
   means for creating an environmental hierarchy describing a modeled environment;
   means for creating a product catalog that contains data describing a plurality of items that may be utilized to populate the modeled environment;
   means for creating a configuration library that contains data describing a spatial relationship between first and second items among said plurality of items in said product catalog; and means for populating said modeled environment by storing, in a database, data representative of the spatial relationship between said environmental hierarchy and a collection of items including said first item.

49. The program product of claim 48, wherein said means for creating a product catalog comprises means for specifying values for predefined attributes associated with said plurality of items and storing said values in said product catalog.

50. The program product of claim 49, wherein said means for creating a product catalog comprises means for permitting a user to define at least one of said attributes.

51. The program product of claim 49, wherein said means for creating a configuration library comprises:

means for selecting said first and second items from said product catalog;

means for specifying said spatial relationship between said first and second items in which said second item is within an area defined by said first item; and means for storing an indication of said spatial relationship in said configuration library.

52. The program product of claim 48, wherein said means for creating said environmental hierarchy comprises means for creating an environmental hierarchy including at least higher and lower levels each having an associated dataset describing a respective one of first and second regions, wherein the second region is within the first region.

53. The program product of claim 52, wherein at least one of said higher level and said lower level represents an area of land.

54. The program product of claim 53, wherein said area of land comprises one of a construction site, hazardous waste site, and agricultural site.

55. The program product of claim 53, wherein said area of land comprises a jurisdiction of a governmental entity.

56. The program product of claim 52, wherein at least one of said higher level and said lower level represents at least a portion of a structure.

57. The program product of claim 56, wherein said structure comprises one of a retail sales facility and a warehouse facility.

58. The program product of claim 56, wherein said structure comprises one of a manufacturing facility, a processing facility, and a production facility.

59. The program product of claim 56, wherein said structure comprises a structure under construction.

60. The program product of claim 48, wherein said means for creating a product catalog comprises means for storing non-graphical data describing one or more attributes of said plurality of items and graphical data specifying a graphical representation of at least one of said plurality of items.

61. The program product of claim 60, wherein at least one of said one or more attributes is time-dependent.

62. The program product of claim 48, and further comprising means for displaying within a display of a computer system a graphical representation of said modeled environment, said graphical representation including at least a first graphical object representing said first item and at least a second graphical object representing said environmental hierarchy.

63. The program product of claim 62, wherein said means for displaying comprises means for displaying a graphical object representing fewer than all items in said collection of items populating said modeled environment.

64. The program product of claim 48, wherein said means for populating comprises means for receiving from a scanner and entering into the database at least a portion of said data representative of the spatial relationship.

65. The program product of claim 48, wherein:

said modeled environment comprises a retail environment;

said product catalog includes data describing at least one item for sale; and said modeling tool further comprising means for removing said item for sale from said modeled environment by removing data representative of a spatial relationship between said at least one item for sale and said environmental hierarchy or another item in said product catalog.

66. The program product of claim 55, said modeling tool further comprising means for generating a report reflecting correlation of sales of items with subsets of said modeled environment for which spatial relationships with said items have been defined.

67. The program product of claim 48, wherein said means for creating a product catalog comprises means for creating a product catalog including at least one human item representing a human belonging to an organization, said human item having a calendaring attribute representing a schedule of the human.

68. The program product of claim 48, wherein said means for creating a product catalog comprises means for creating a product catalog representing a data network, said product catalog including at least one item representing a dataset.

69. The program product of claim 49, wherein at least one attribute associated with a particular item among said plurality of items comprises a procedure attribute, and an attribute value of said procedure attribute tracks performance of a procedure associated with the particular item.

70. The program product of claim 61, said modeling tool further comprising means for generating of a time-dependent view of items from said product catalog populating said modeled environment.

* * * * *